Oct. 28, 1969   R. J. SCOVILL   3,475,754
AIRCRAFT NAVIGATION COMPUTER APPARATUS
Filed Feb. 1, 1968   11 Sheets-Sheet 2

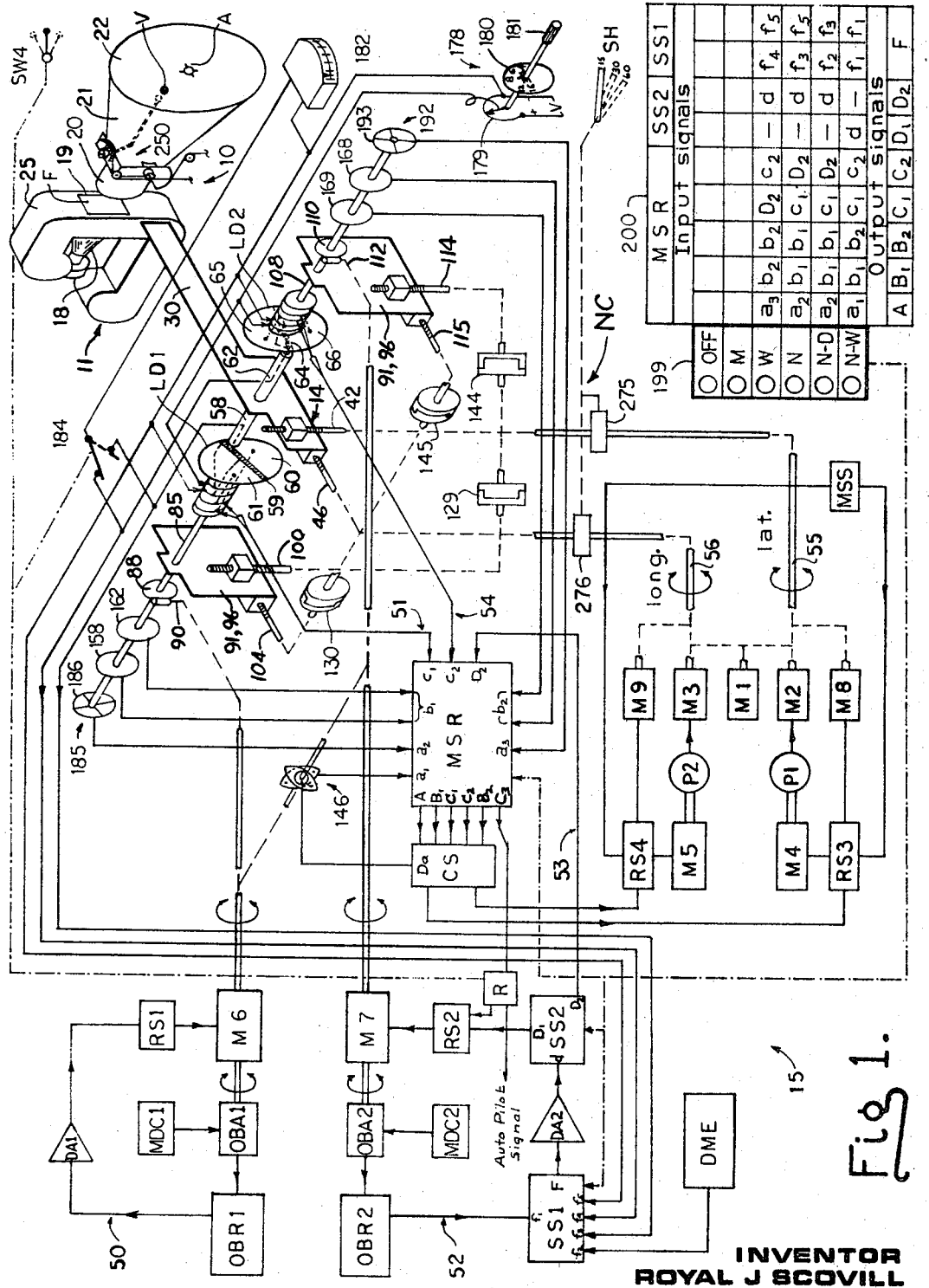

INVENTOR
ROYAL J SCOVILL
BY: Wolfe, Hubbard, Voit & Osann ATTYS

Oct. 28, 1969          R. J. SCOVILL          3,475,754
AIRCRAFT NAVIGATION COMPUTER APPARATUS
Filed Feb. 1, 1968                   11 Sheets-Sheet 5

INVENTOR
ROYAL J SCOVILL
BY: Wolfe, Hubbard, Voit & Osann ATTYS

Oct. 28, 1969  R. J. SCOVILL  3,475,754
AIRCRAFT NAVIGATION COMPUTER APPARATUS
Filed Feb. 1, 1968  11 Sheets-Sheet 6
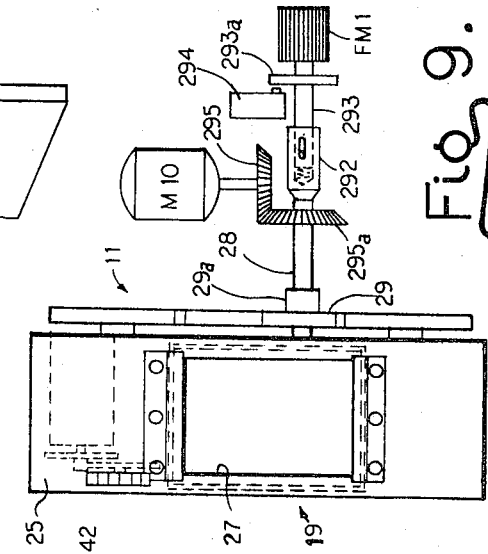
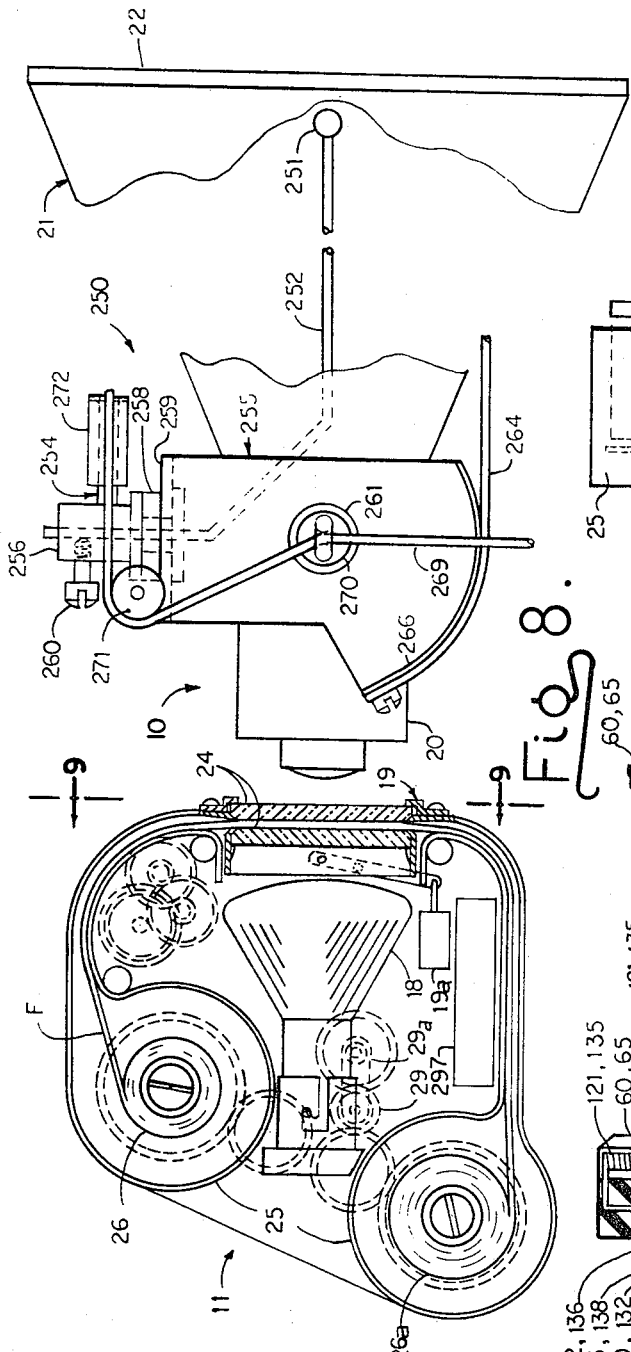
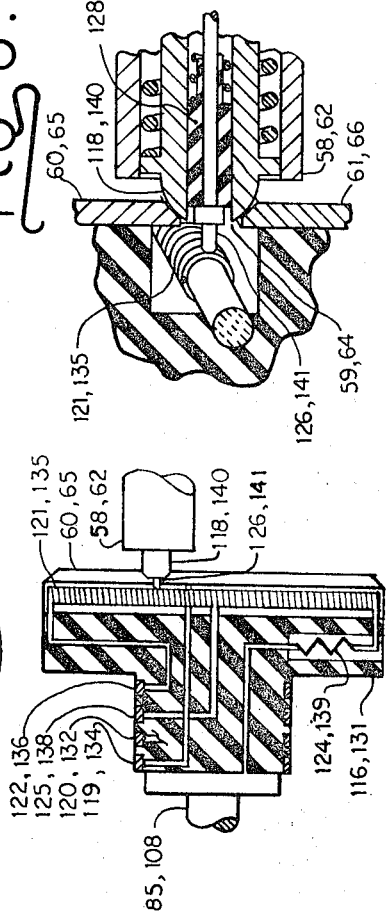
INVENTOR
ROYAL J SCOVILL
BY: Wolfe, Hubbard, Voit & Osann ATTYS

DUAL OMNI MODE

SINGLE OMNI-DME MODE
and
NAV STATION DISC POSITIONING

WAY STATION DISC POSITIONING

INVENTOR
ROYAL J. SCOVILL
by: Wolfe, Hubbard,
Voit & Osann
ATTYS.

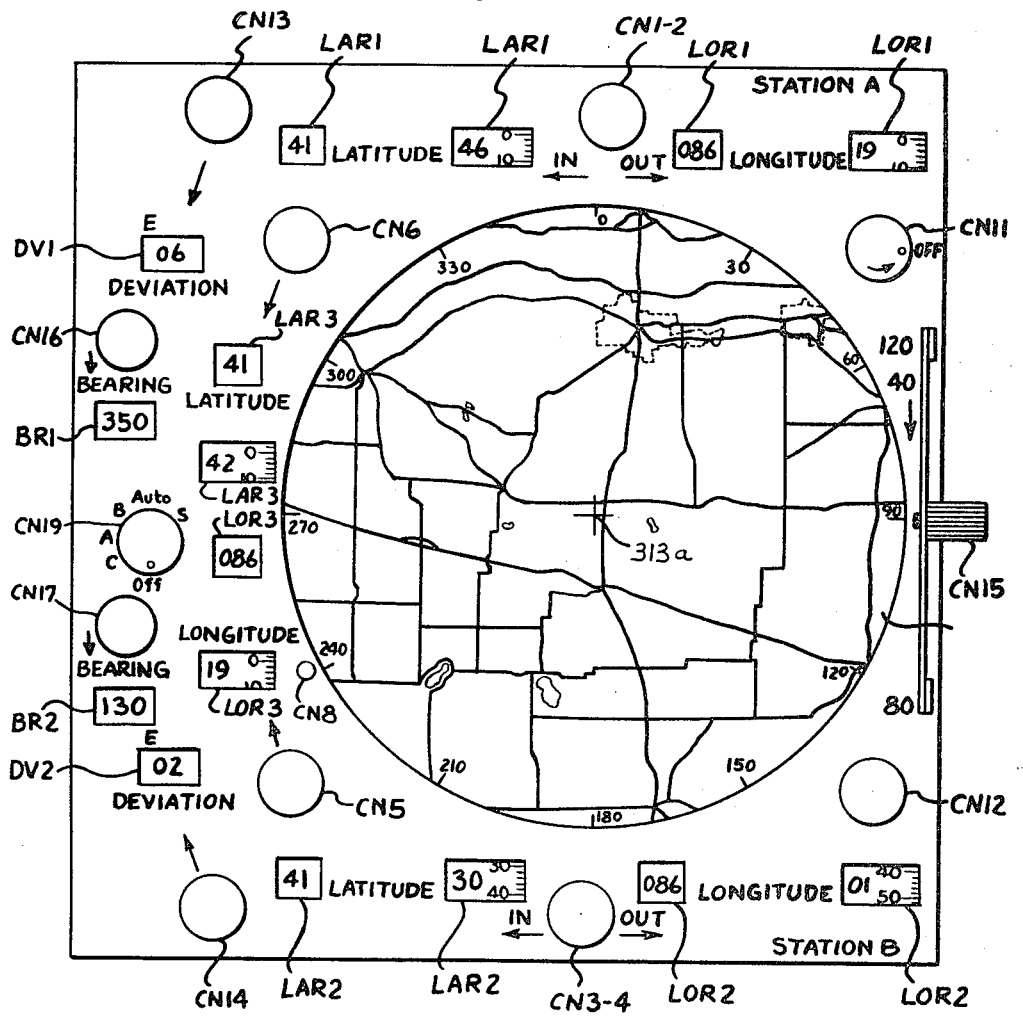

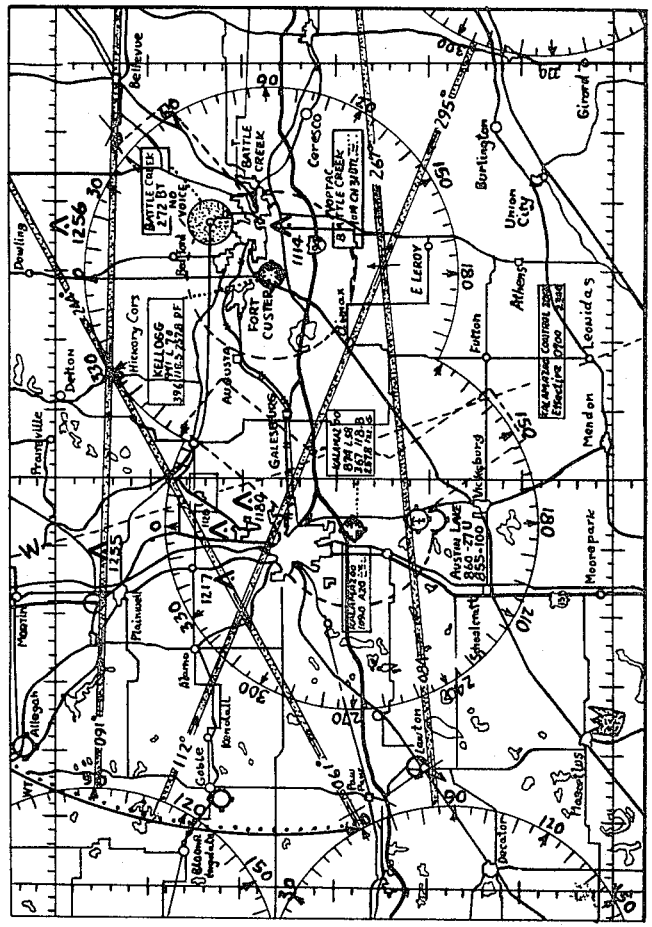

United States Patent Office 3,475,754
Patented Oct. 28, 1969

3,475,754
AIRCRAFT NAVIGATION COMPUTER
APPARATUS
Royal J. Scovill, Box 1059, Ogden Dunes, Ind. 46368
Continuation-in-part of application Ser. No. 456,455,
May 17, 1965. This application Feb. 1, 1968, Ser.
No. 702,393
Int. Cl. G01s 3/02
U.S. Cl. 343—112          36 Claims

ABSTRACT OF THE DISCLOSURE

A navigation computer apparatus which determines the position of a vehicle such as an aircraft with respect to a fixed point on the earth's surface and provides a continuous pictorial display of such position, utilizing output information from an omnibearing navigation system either alone or in conjunction with a distance measuring equipment system. The apparatus may include in the pictorial display the instantaneous heading and speed of the aircraft relative to ground, and may also indicate bearing and distance to a navigation station, way station, or destination point.

TABLE OF CONTENTS

| | Column |
|---|---|
| Abstract of the Disclosure | 1 |
| Related Application | 1 |
| Purposes and Objects of the Invention | 1 |
| Summary of the Invention | 3 |
| Outline of the Drawings | 5 |
| Reference Data Sources | 5 |
| General Description of Apparatus, Embodiment of FIGS. 1 through 12 | 6 |
| Detailed Description of Apparatus, Embodiment of FIGS. 1 through 12 | 7 |
|    Projection Means | 7 |
|    Movable Support Means | 8 |
|    Adjustable Control Means | 8 |
|    (A) Dual Onmi Mode | 9 |
|       (a) Dual Omni Servo Loops | 9 |
|       (b) Latitude and Longitude Servo Drives | 11 |
|       (c) Locator Disc Support | 12 |
|       (d) Positioning the Locator Discs | 13 |
|       (e) Command Signal Selection and Routing—Dual Omni Mode | 15 |
|    (B) Single Omni-DME Mode | 17 |
|       (a) Single Omni-DME Servo Loops | 18 |
|       (b) Distance Sensing and Signaling | 19 |
|       (c) Command Signal Selection and Routing—Omni-DME Mode | 21 |
|       (d) Destination or Way Station Navigation | 22 |
|    (C) Mode Switching Relay System and Command Switch | |
|    (D) Magnetic Deviation Adjustment | 27 |
|    (E) Speed and Direction Indication | 28 |
|    (F) Latitude-Longitude Coordinate Reference | 29 |
|    (G) Chart Selection and Adjustment | 31 |
| Synopsis of Operation, Embodiment of FIGS. 1 through 12 | 33 |
|    (A) Dual Omni Operation | 33 |
|    (B) Single Omni-DME Operation | 34 |
|    (C) Destination and Way Station | 35 |
| General Description of Apparatus, Embiodment of FIGS. 13 through 16 | 35 |
| Detailed Descripton of Apparatus, Embodiment of FIGS. 13 through 16 | 40 |
| Synopsis of Operation, Embodiment of FIGS. 13 through 16 | 47 |

RELATED APPLICATION

This application is a continuation-in-part of my prior copending application Ser. No. 456,455, filed May 17, 1965, now abandoned.

PURPOSES AND OBJECTS OF THE INVENTION

The present invention relates to navigation computer apparatus adapted to present a continuous visual indication of the position, speed and heading of a vehicle with respect to a chart or map of the earth's surface, as well as bearing and distance to a navigation station, way station, or destination point. The invention finds particular but not exclusive utility in aircraft for solving the navigational problems of the pilot.

It is a general aim of the present invention to provide a new and improved navigation computer apparatus which may, for example, be mounted in an aircraft cockpit for presenting a continuous visual indication of the aircraft position in response to signals from an omnibearing navigation system either alone or in conjunction with a distance measuring equipment system.

A more specific object is to provide such apparatus which is adapted to be coupled to two radio receivers capable of indicating bearing with respect to the stations tuned such as omnibearing receivers, or which may be coupled to one radio receiver capable of indicating the bearing of a tuned station while simultaneously coupled to a distance measuring equipment receiver capable of indicating distance to the tuned station whereby, in either case, a positive reference of the aircraft's position with respect to fixed ground points is obtained.

Another object of the invention is to provide apparatus of the foregoing character which also presents an indication of: (1) speed and direction of travel relative to the ground, (2) the bearing and distance of each fixed ground located radio station being used for position reference when operating in response to dual omni signals, (3) the bearing and distance of the fixed ground located radio station being used for position reference when operating in response to omni and distance measuring equipment signals, (4) deviation of magnetic north from true north at each radio station used for reference, (5) bearing, magnetic or true, and distance to a way station or destination point as selected by the pilot.

A further object of the present invention is to provide vehicle position indicating apparatus of the above type for presenting a pictorial display of a section of the earth's surface on a screen and having a simplified means for setting up the ground positions of (1) the radio stations used for reference, and (2) the way or destination stations which might be selected by the pilot, from visual observation of the display on the screen.

A further object of the present invention is to provide an apparatus of the type set forth above including means to generate an output signal for automatic pilot equipment to guide the aircraft to its destination.

Still another object of the invention is to provide apparatus of the foregoing nature which is adaptable to charts of any desired scale within wide limits and wherein any selected chart may be held in the projection system without regard to a specific location or orientation.

A further object is to provide such apparatus wherein the charts are incorporated in a strip of film of sufficient length to contain complete navigation information for a considerable area of operation, for example, all of the United States, each frame of the strip film having a different chart of the earth's surface and/or navigation information thereon and adjacent charts including adequate overlap to allow for local maneuvering at the borders thereof and to allow time for changing charts when the vehicle is passing from the area covered by one strip chart to the area covered by the next chart. A related object is to provide means in the apparatus whereby the strip film may be selectively positioned in random increments and projected upon the screen.

Another object is to provide apparatus as set forth above wherein the strip film is mounted within a storage magazine in the apparatus in such manner that a portion of the film, or the complete magazine, may be changed readily and as frequently as necessary to insure that current data is available to the pilot.

A further object is to provide an apparatus of the foregoing character which presents an indication of (1) speed and direction of travel relative to the ground (2) digital indication of the latitude and longitude of the vehicle, (3) digital indication of the bearing, and latitude and longitude of the radio station facilities being used for position reference and (4) digital indication of deviation of magnetic north from true north at each radio station facility used for reference.

Still another object is to provide a means to automatically compensate for curvature of the chart as depicted in the Lambert Conformal Conic projection.

A further object of the invention is to position the film in the reference frame with regard to exact latitude, longitude, location and orientation, thus providing a means to insert reference navigation station location into the computer by digital input of latitude and longitude.

Other objects and advantages of the invention will become apparent as the following description proceeds, taken in conjunction with the accompanying drawings.

SUMMARY OF THE INVENTION

A navigation computer apparatus for aircraft and other vehicles exemplifying the invention comprises an analog system which refers to fixed ground radio locations and utilizes filmed charts to present a continuous pictorial display of vehicle position, speed, and direction of travel relative to the ground. This navigational information is projected upon a viewing area which may, for example, be a rear lighted screen approximately 5 inches in diameter. Vehicle position is represented by a center reference mark on the screen. Speed and direction of travel are represented by the displacement of a target image or dot from the center mark. Radial orientation of the dot about the center of the screen indicates direction of travel while displacement from the center indicates speed. Readout devices to indicate distance and bearing to the reference radio facilities and a selected way or destination point are associated with the screen. The apparatus also generates input signals for automatic pilot equipment to guide the craft to such selected way or destination point. The apparatus includes a magazine of film which may be changed frequently for updating of information and the magazine has substantial film storage capacity.

A portion of a desired filmed chart is projected on the rear lighted screen. The filmed chart is fixed to a movable carriage on which are mounted two followers fixed with respect to each other and to the film mount. Means to move the film carriage in latitude and longitude coordinates with respect to the axis of projection is provided. Such movement is directed by the analog system which duplicates in miniature the space relationship of the radio navigation aids, simulated by locator discs, and the vehicle, simulated by one follower related to each locator disc. Each locator disc is a bearing duplicating device and comprises a pair of conductive segments separated by a space diameter which normally engages a follower on the film carriage. Each disc is mounted for rotation about an axis normal to the filmed chart displayed on the screen and may be adjusted laterally so as to position its rotational axis at any given point relative to the displayed chart. Where the reference data to the apparatus is supplied by a pair of selected spaced apart omnibearing radio transmitting stations, referred to herein as the dual omni mode of operation, one locator disc is adjustably positioned so that its axis corresponds to the position of the first omnibearing station, while the second locator disc is adjustably positioned so that its axis corresponds to the position of the second omnibearing station. The bearing line between each omni radio station and the vehicle is simulated by a line of electrical balance between the two conductive segments of the corresponding locator disc. These lines are continuously repositioned by the computer in response to changes in bearing signals from the two radio bearing receivers. The instantaneous intersection of the bearing lines from the two reference omni radio stations in the simulation is sought out by the followers mounted on the film carriage. Thus in the dual omni mode of operation, from bearing references to two fixed ground located radio facilities, the film is continuously driven to project the location of the vehicle at the center mark of the screen.

Placement of each tuned omni station, represented by a respective locator disc, in proper relation in the simulation for the dual omni mode, is accomplished in two steps. The first consists of automatic centering of one follower on its associated locator disc. The second consists of manual slewing of the picture so that the position on the projected chart of the corresponding reference radio station appears at the center locating mark on the screen. During this slewing action following the automatic centering, mechanical connections are made within the apparatus so that the selected locator disc remains centered on its follower and is thus placed at the location of the tuned radio reference station with respect to the particular chart displayed. Selection of a subsequent mode of operation causes this driving mechanical link to be severed and the selected locator disc remains at the location of the tuned reference radio station as its follower subsequently moves off to assume the location of the vehicle in the simulation. In the dual omni mode of operation, reference to a second radio bearing transmitter may be set up with the second locator disc by following the same procedure of automatic centering and then manual slewing of the picture.

Mounted along the simulated bearing line between the conductive segments of each locator disc is a slide wire resistance over which an electrical potential is applied. Thus a gradient of voltage from the axis of rotation toward the periphery may be detected along this wire by the distance sensing pin located on the center axis of the follower. This gradient may be calibrated to read on a meter in miles of distance. For example, distance from the omni station to the vehicle. Means to vary the total potential applied to the resistance is provided and thus a means to adjust the distance calibration to correspond with the scale of the chart displayed.

Where reference data to the apparatus is supplied by one omnibearing radio transmitting station and its associated distance measuring equipment, referred to herein as the single omni-DME mode of operation, one locator disc is prepositioned as described above so that its rotational axis corresponds to the location of the reference omni radio station on the displayed portion of the chart. A comparison in the simulation between the distance (i.e. voltage) detected by the distance sensing pin mounted in the center of the follower with a distance (i.e. voltage) indicated by the distance measuring equipment at the reference station provides a distance input to the computer. Utilizing this input, means are provided to continuously position the axis of projection (i.e. follower) in the simulation at the distance indicated by the distance measuring equipment from the reference radio facility. Such means likewise causes the bearing line to be continuously repositioned in response to signals from the radio (i.e. omni) bearing receiver while also causing the axis of projection (i.e. follower) to continuously seek a position on this bearing line from the reference radio facility. Thus in the omni-DME mode of operation, from an input of distance and bearing from a fixed ground located radio facility, the film chart is continuously driven to project the location of the vehicle at the center mark of the screen.

The apparatus includes switching means for controlling the assignment of signals generated between the followers and the segiments of the locator discs, as well as between the distance sensing pins, the slide wire and DME. These signals produce the latitude and longitude coordinate movement of the film to cause the followers to center themselves as indicated. Such switching means comprise a series of commutators, cams and their associated followers. These means automatically switch the signals generated with respect to increase-decrease assignment and latitude-longitude assignment as bearing to the reference radio facilities changes, The rate of movement of the intersection of the two bearing lines in the dual omni mode and the rate of movement of the point of distance and bearing in the omni-DME mode is generated by the computer in latitude and longitude increments responsive to changes in bearing or bearing and distance when such changes are indicated to the computer by the associated radio bearing and distance indicating equipment. The computer automatically moves the film support means to reposition the followers. These rates in latitude and longitude are used to position a target which casts an image on the screen. The distance of the image or "dot" from the center mark is indicative of speed while its radial orientation signifies direction of travel of the vehicle from the center mark of the screen.

In the omni-DME mode in which only one radio facility simulating device (i.e., locator disc) is used for positioning, the other such device provided in the apparatus may be positioned with respect to the displayed chart over a destination or way station location and thus it may be utilized to indicate bearing and distance from the vehicle to such way station or destination point. Switching means permits the routing of off-course signals for auto pilot guidance of the vehicle to such way station or destination point.

OUTLINE OF THE DRAWINGS

FIGURE 1 is a functional diagram of one illustrative navigation computer apparatus exemplifying the present invention.

FIG. 2 is a perspective schematic diagram of the apparatus of FIG. 1.

FIG. 2A is an enlarged detail view of one of the differential gear clusters shown in FIG. 2.

FIGS. 6 and 7 are further enlarged detailed sectional views showing certain of the components of FIG. 5.

FIG. 8 is an elevational view of the projection system incorporated in the apparatus, with certain parts broken away to illustrate details.

FIG. 9 is a front elevational view of the film magazine of the illustrative apparatus, taken from the plane of the line 9—9 in FIG. 8.

FIG. 15 is a front elevational view of the housing for the apparatus of FIG. 13 showing the viewing screen and manual controls; and FIG. 16 illustrates a portion of the typical information contained in a selected film frame utilized in the apparatus of the present invention.

Figure 3:
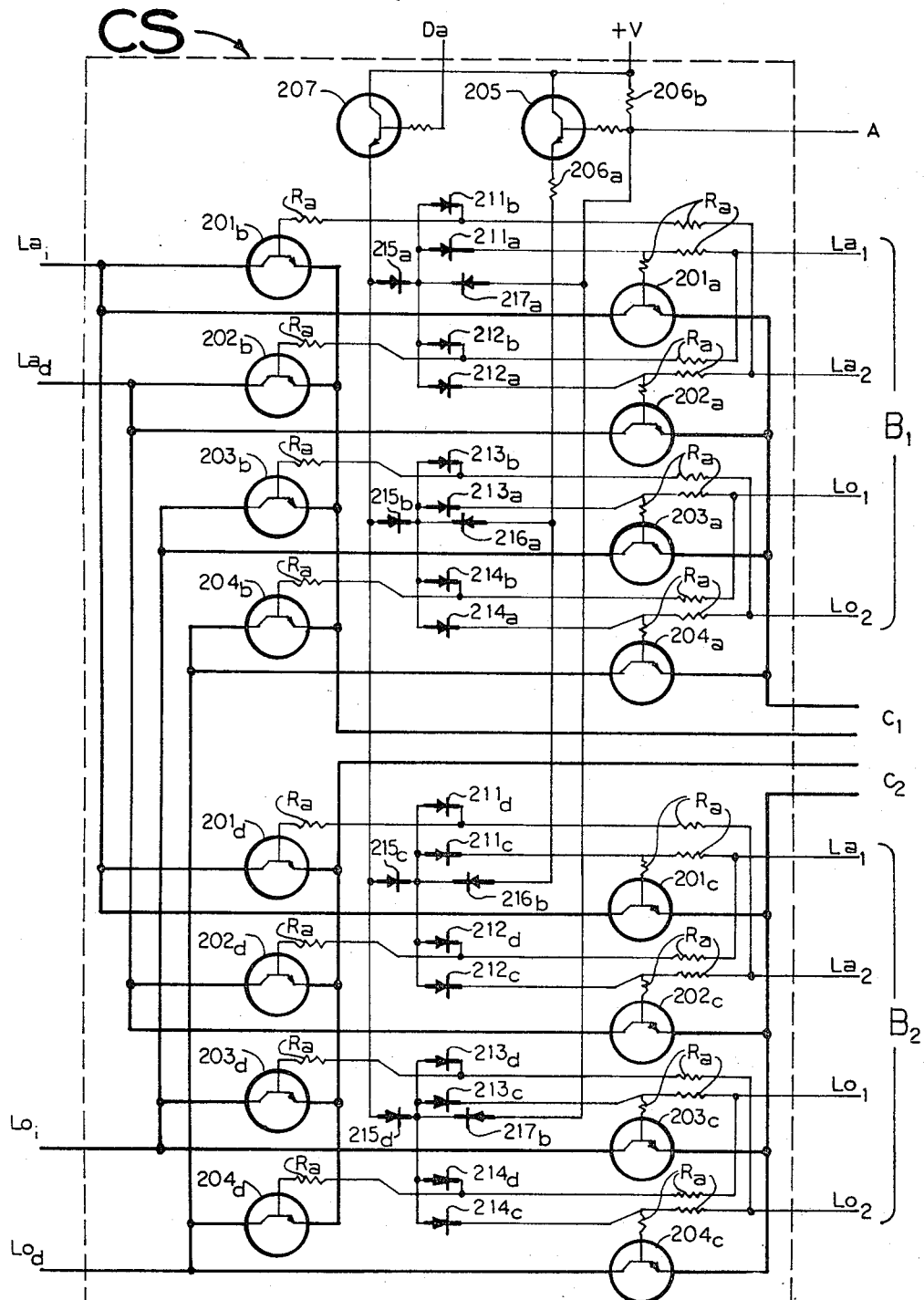
FIG. 3 is a schematic wiring diagram of a transistorized sixteen circuit selector switch utilized in the apparatus.

While the invention has been shown and will be described in some detail with reference to particular exemplary embodiments thereof, there is no intention that it be limited to such details. On the contrary, it is intended here to embrace all modifications, alternatives, and equivalents falling within the spirit and scope of the invention as defined by the appended claims.

REFERENCE DATA SOURCES

A navigation computer apparatus NC exemplifying the present invention is shown in FIGS. 1 and 2, along with certain associated radio receiving equipment used as sources of reference data. In the present instance, the apparatus NC is adapted for use in aircraft and takes advantage of existing radio receiving equipment already on board.

Such existing equipment may consist of a pair of radio receivers OBR1 and OBR2 situated in the cockpit and which are capable of producing indications of the bearings of transmitting stations to which they are tuned. In the exemplary arrangement, the receivers OBR1 and OBR2 are omnibearing receivers which, when tuned to selected omni transmitting stations, indicate the respective bearings of these stations. When the pilot desires to check his bearing with respect to a given omni transmitting station, he tunes one of the omni receivers to the frequency of the selected station and the receiver translates the received bearing signal into a voltage signal. The voltage signal is then used by the pilot to set a bearing adjustment device which denotes the bearing of the aircraft from the station, or vice versa, with respect to magnetic north.

The existing on board equipment also includes a radio receiver DME situated in the aircraft cockpit. In the exemplary arrangement, the receiver DME is an interrogation receiver which indicates the distance of the aircraft from the transmitting station to which it is tuned. As those skilled in the art will appreciate, such omni transmitting and distance measuring equipment radio stations are scattered throughout the country. Such stations are commonly referred to as "VOR" for omnibearing reference only, and "TA-VOR" for omnibearing and Tacan distance interrogation equipment.

A further source of reference data for the apparatus NC is a series of navigational charts and related information reproduced in compact form, as by means of film, and accessible by use of a projection system. For example, standard aviation charts such as World Aeronautical, Sectional, Local Area, Radio Facility, and Approach Procedure charts may be photographed on 35 millimeter color film. Such other navigation information as desired may likewise be filmed. It has been determined that a film scale of, for example, 240 miles per inch of film when photographing WAC and Radio Facility charts, results in adequate detail and clarity of projected image for viewing. At this scale, 57,600 square miles of chart area may be carried on one square inch of film. The film storage means of the apparatus NC may hold, for example, 500 square inches of film. It is practicable, therefore, to obtain coverage of 10,000,000 square miles of the earth's surface using the WAC or Radio Facility chart scale. Moreover, such film, with allowance for overlap at the borders of the strip, would occupy approximately one-half of the available storage space, thus allotting the remaining half of the storage space to film devoted to sectional, local and other detailed navigation information.

GENERAL DESCRIPTION OF APPARATUS, EMBODIMENT OF FIGS. 1 THROUGH 12

Figure 4:
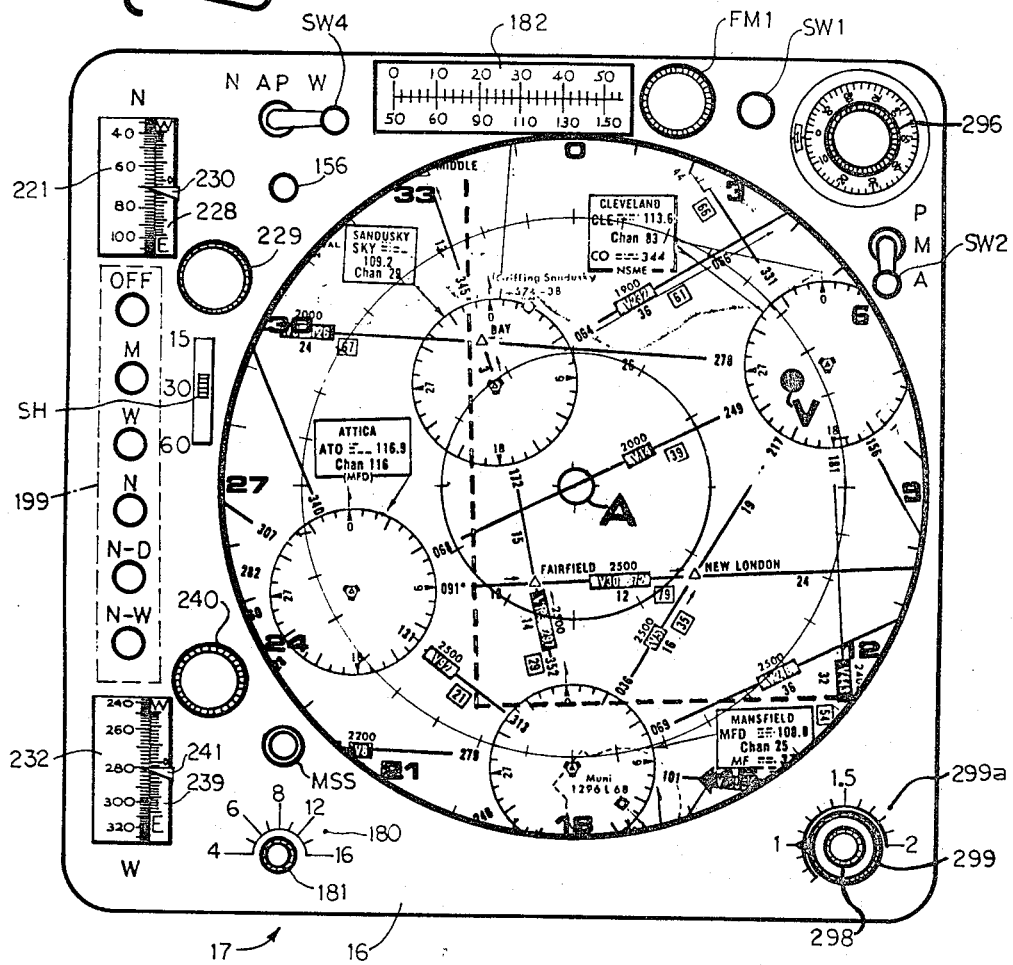
FIG. 4 is a front elevational view of the apparatus showing the viewing screen with typical chart information presented thereon and the manual operating controls.

Referring more particularly to FIGS. 1, 2 and 4, the invention is there exemplified in an illustrative navigational computer apparatus NC for use in a vehicle such as an aircraft. The apparatus NC is adapted to display a portion of the earth's surface, as shown on a selected navigational chart or filmed reproduction thereof, on a screen having a center reference mark A which represents the position of the aircraft. The displayed portion of the earth's surface is moved relative to the Mark A so that the mark continuously represents the instantaneous position of the aircraft. In addition to the Mark A, a speed-direction vector represented by a small circular image V is displayed on the screen and moved to indicate continuously the instantaneous speed and direction of travel of the aircraft.

The reference data for the apparatus NC may be derived from the voltage output of omnibearing receivers OBR1 and OBR2 tuned respectively to omni transmitting stations separated by substantial latitude and longitude differences, or by the output of one omnibearing receiver, for example, OBR1, and distance measuring radio receiver DME adapted to produce a signal indicative of the distance of the aircraft from the station to which receiver OBR1 is tuned.

In order to utilize the voltage output of the omnibearing receivers, the apparatus NC contains duplicate bearing adjustment devices OBA1 and OBA2 connected respectively with the receivers OBR1 and OBR2. The bearing adjustment devices OBA1 and OBA2 are coupled directly into the circuitry of the receivers OBR1 and OBR2 and produce variable output voltages indicative of bearing in a manner similar to that of the course setting bearing adjustment devices of the receivers OBR1 and OBR2.

The apparatus NC broadly comprises a projection means 10 for displaying a selected filmed chart, including a screen and a film holding means; a chart handling means 11, including means for storage, selection and retrieval of the filmed charts; a movable support means 14 for the film holding and handling means; and an adjustable control means 15, including a feedback means, for effecting precise relative movement between the movable support means and the screen so as to duplicate the horizontal motion of the aircraft at the scale of the filmed chart. The adjustable control means 15 is coupled to the bearing adjustment circuitry of the receivers OBR1 and OBR2, or to the output of the distance measuring receiver DME and the bearing adjustment circuitry of one of the receivers OBR1, OBR2. The control means 15 includes a series of interconnected servo loops which act to continuously reposition the filmed chart relative to the aircraft locating reference Mark A on the screen so as to indicate the instantaneous position of the aircraft.

The screen and the various controls and indicating devices of the apparatus NC are conveniently situated on its front face 16 (FIG. 4). The entire apparatus NC is compactly arranged within a self-contained modular enclosure 17 which may, for example, be approximately 6 inches square and 14 inches in depth so as to fit readily into the instrument panel in the cockpit.

DETAILED DESCRIPTION OF APPARATUS EMBODIMENT OF FIGS. 1 THROUGH 12

Projection means

The projection means 10 (FIGS. 1, 2 and 8) is adapted to provide a visual indication of the position of the aircraft relative to a portion of the earth's surface, as represented on a selected filmed navigational chart. The projection means comprises a projection lamp 18, a film holder 19, a projection lens 20, a hood 21, and a rear lighted fixed screen 22 with aircraft locating reticle A situated at the center thereof. A speed-direction vector indicator may also be included in the projection means, producing on the screen 22 the small circular image V which represents direction of a vehicle travel by its angular location relative to the center and speed of travel by its distance from the center.

In the present instance, the screen 22 may have a diameter on the order of 5 inches. The projection lens 20 may be of the "zoom" type and adjustable so that the displayed portion of the selected area of film may be varied in size and thus viewed in greater or lesser detail depending upon the coverage desired. Such a lens will effectively project a film area varying between approximately $3/16$ inch and $1/2$ inch in diameter on a 5 inch diameter screen. Therefore, film having a scale of 240 miles per inch may be projected on the screen 22 so as to display portions of the earth's surface varying between forty and one hundred and twenty miles in diameter.

The chart handling means 11 (FIGS. 1, 2, 8 and 9) comprises a film storage magazine 25 containing film reels 26, $26_a$ adapted to hold a strip of 35 millimeter color film containing all the navigation charts and related information necessary for operation of the apparatus NC. As indicated earlier herein, the magazine 25 may hold 500 square inches of film. This is sufficient to provide coverage of all of continental United States including navigational charts and related detailed navigational information. The film F is threaded between the reels past a viewing aperture 27 and film holder 19. It may be transported in either direction between the reels by means of reversible motor M10 which may be connected alternatively to the reel 26 or the reel $26_a$ via shaft 28 and shiftable gear 29. The film holder 19 includes provision for clamping the viewing area of the film between two pieces of glass 24 and thus fixes the frame to be viewed with respect to the film magazine in any random selected position of the film strip. Consequently, the charted features depicted on the selected frame may be accurately located with respect to the axes of projection.

The chart handling means 11 also includes an appropriate film frame selection and retrieval device. This may be a manually operated device, or a power-actuated device such, for example, as disclosed and claimed in my copending application Ser. No. 606,960, filed Jan. 3, 1967, now abandoned.

Movable support means

The movable support means 14 (FIGS. 2 and 5) for film holder 19 and film magazine 25 is adapted to accurately shift the film area being viewed with respect to the axis of projection and the screen 22. The means 14 comprises a film carriage 30 rigidly fixed to the magazine 25 and film holder 19. The carriage 30 is also fixed to a vertical or latitude slide 31 movable in vertical guideways 32 and 34. Ball elements 35 may be interposed between the opposed faces of the slide 31 and guideways 32, 34, which may be suitably V grooved, to minimize friction therebetween. The guideways 32, 34 of the slide 31, in turn, are rigidly fixed to horizontal or longitude slide 36. The latter is movable in horizontal guideways 38 and 40 which are fixed to the base plate 41 of the apparatus NC. Ball elements 35 may be interposed between the opposed V grooved faces of the slide 36 and guideways 38, 40 to minimize friction therebetween.

The latitude slide 31 may be driven vertically in either direction along its guideways 32, 34 through lead screw 42 which threadedly engages nut 44 fixed to the slide. The lead screw 42 is journaled in a thrust bearing 45 fixed to the guideway 32 and which permits the screw 42 to rotate but restrains it against axial movement. Rotation of lead screw 42 produces corresponding vertical movement in unison of the slide 31, film carirage 25, film holder 19 and the projected portion of the film F.

The longitude slide 36 may be driven horizontally in either direction along its guideways 38, 40 through lead screw 46 which threadedly engages nut 48 fixed to the slide. The lead screw 46 is journaled in a thrust bearing 49 fixed to the guideway 40 and which permits the screw 46 to rotate but restrains it against axial movement. Rotation of lead screw 46 produces corresponding horizontal movement in unison of the slide 36, slide 31, film carriage 30, film holder 19 and the projected portion of the film F.

Adjustable control means

The adjustable control means 15 (FIG. 1) has two modes of operation. One mode utilizes as reference data the voltage output signals of both omnibearing receivers OBR1 and OBR2 which are indicative of the bearing from each reference omnibearing station to the aircraft. The other mode utilizes the voltage output signal of one omnibearing receiver, for example OBR1, along with the voltage output of distance measuring receiver DME tuned to the Tacan equipment of reference omnibearing station OBR1.

(A) DUAL OMNI MODE

To set up this mode of operation, the omnibearing receivers OBR1 and OBR2 are tuned respectively to the omnibearing radio transmitting stations selected for reference. The bearing duplicating devices in the apparatus NC are respectively prepositioned to points corresponding to the locations of the reference stations on the projected portion of the filmed chart. A correction for magnetic deviation at each reference station is also introduced and the apparatus is then switched into automatic operation.

(a) *Dual omni servo loops.*—Starting with the first or dual omni receiver mode of operation, it will be noted that the control means 15 comprises four servo loops 50, 51, 52 and 54. These loops interact to effect continuous repositioning of the filmed chart relative to the aircraft locating reticle A on the screen so that the instantaneous position of the aircraft relative to the earth's surface is continuously indicated.

The servo loop 50 comprises omni receiver OBR1, differential amplifier DA1, reversing switch RS1, bearing drive motor M6, and bearing adjustment device OBA1. Voltage output signals indicative of the bearing to the omni station to which the receiver OBR1 is tuned are produced by the latter and directed to differential amplifier DA1. The amplifier DA1 directs these signals to reversing switch RS1 which in turn controls bearing drive motor M6 for operation in a forward or reverse direction. The mechanical output of the motor M6 is, in turn, connected to bearing adjustment device OBA1 which is thereby adjusted to transmit a feedback signal to receiver OBR1 indicative of the bearing of the tuned station.

Since the bearing signal produced by omni receiver OBR1 is related to magnetic north, provision is made for compensating the mechanical output of bearing adjustment motor M6 for magnetic deviation so that its bearing output relates to true north. For this purpose, magnetic deviation compensator MDC1 is connected to bearing adjustment device OBA1, relating the bearing output of motor M6 to true north while receiver OBR1 will still be receiving signals related to magnetic north.

The mechanical output of bearing drive motor M6, related to true north, is further utilized as a source of command signals which are impressed upon related servo loop 51. The latter is adapted to drive the film carriage 30 along either the latitude or longitude axis in response to these bearing command signals.

The servo loop 51 (FIG. 1) comprises a bearing duplicating device which in this instance is in the form of locator disc LD1, a mode switching relay system MSR, a command switch CS, latitude servo drive 55 and longitude servo drive 56 connected to the film carriage 30, and follower 58 which moves in unison with the film carriage while engaging the disc LD1. In this mode of operation, the disc serves as a bearing reponsive device.

The locator disc LD1 is rotatably mounted and rotatably driven by bearing drive motor M6. The disc LD1 has a diametrical slot 59 defined by a pair of spaced apart insulated segments 60, 61 of conductive material. The projecting end of the follower 58 is adapted to yieldably engage the slot 59, producing signals as it contacts either or both segments 60, 61. The position of locator disc LD1 relative to the filmed chart displayed on the screen 22 may be adjusted in a plane normal to the rotational axis of the disc so as to center its rotational axis on the omnibearing station to which receiver OBR1 is tuned. The angular position of the disc LD1 thus represents the bearing between the aircraft and that omni station and the output signals from the disc represent the rate of change of the bearing.

With this arrangement, voltage output signals indicative of the bearing to which the disc LD1 is being driven by the bearing drive motor M6 are directed to mode switching relay system MSR and thence to the command switch CS. The switch CS, in turn, selectively directs these signals to the latitude servo drive 55 or to the longitude servo drive 56, whichever can be most advantageously controlled in view of the angular position of the disc at that time. The mechanical output of the selected servo drive operates the latitude or longitude lead screw 42 or 46 of the film carriage 30. The resulting motion imparted to the carriage is transmitted back to the disc LD1 by the follower 58.

The servo loop 52 (FIG. 1) comprises omni receiver OBR2, differential amplifier DA2, reversing switch RS2, bearing drive motor M7, and bearing adjustment device OBA2. Selector switches SS1 and SS2, associated with amplifier DA2, are also included but in this mode of operation they have no effect on the servo loop 52. Voltage output signals indicative of the bearing to the omni station to which the receiver OBR2 is tuned are produced by the latter and directed to differential amplifier DA2. The amplifier DA2 directs these signals to reversing switch RS2 which controls bearing drive motor M7 for operation in a forward or reverse direction. The mechanical output of the motor M7 is, in turn, connected to bearing adjustment device OBA2 which is thereby adjusted to transmit a feedback signal to receiver OBR2 indicative of the bearing of the tuned station. Magnetic deviation compensator MDC2, similar to the device MDC1, is connected to bearing adjustment device OBA2, relating the bearing output of motor M7 to true north while receiver OBR2 receives signals related to magnetic north.

The mechanical output of bearing drive motor M7, related to true north, is further utilized as a source of command signals which are impressed upon related servo loop 54. The latter is adapted to drive the film carriage 30 along either the latitude or the longitude axis in response to these bearing command signals.

The servo loop 54 (FIG. 1) comprises a bearing responsive device in the form of a locator disc LD2, mode switching relay system MSR, command switch CS, latitude servo drive 55 and longitude servo drive 56 connected to the film carriage 30, and follower 62 which moves in unison with the film carriage while engaging the disc LD2. The disc LD2, like the disc LD1, is rotatably mounted but driven rotatably by bearing drive motor M7. The disc LD2 has a diametrical slot 64 defined by a pair of spaced apart insulated segments 65, 66 of conductive material. The projecting end of the follower 62 is adapted to engage the slot 64, producing signals as it contacts either or both segments 65, 66. The position of locator disc LD2 relative to the filmed chart displayed on the screen 22 may be adjusted in a plane normal to the rotational axis of the disc so as to center its rotational axis on the omni bearing station to which receiver OBR2 is tuned. The angular position of the disc LD2 thus represents the bearing between the aircraft and that omni station and the output signals from the disc represent the rate of change of the bearing.

With this arrangement, voltage output signals indicative of the bearing to which the disc LD2 is being driven by the bearing drive motor M7 are directed to the mode switching relay system MSR and thence to the command switch CS. The switch CS, in turn, selectively directs these signals to the latitude servo drive 55 or to the longitude servo drive 56, whichever can be most advantageously controlled in view of the angular position of the disc LD2 at that time. Because of the relative angular relationship between the discs LD1 and LD2, when one is effective to control the latitude servo drive the other is effective to control the longitude servo drive, and vice versa. The mechanical output of the servo drive then controlled by disc LD2 operates the latitude or longitude lead screw 42 or 46 of the film carriage. The resulting motion imparted to the carriage is transmitted back to the disc LD2 by the follower 62.

(b) *Latitude and longitude servo drives.*—The latitude and longitude servo drives 55, 56 (FIGS. 1 and 2) are adapted respectively to shift the film carriage 30 and the displayed chart in a vertical or latitudinal direction and in a horizontal or longitudinal direction relative to the axis of projection on the screen 22. For this purpose, the output of the latitude servo drive 55 is connected to carriage lead screw 42, while the output of the longitude servo drive 56 is connected to the carriage lead screw 46.

The servo drive 55 comprises constant speed motor M1, variable speed motor M2, control potentiometer P1 and its adjusting motor M4, reversing switch RS3 and slew motor M8. Switch RS3 is adapted to respond to command signals from command switch CS or, alternatively, to signals from manually actuated joy stick switch MSS on the front panel of the apparatus. The servo drive 55 has a normal operating speed range in which it moves the carriage 30 and the displayed chart at the rate of change of latitude of the aircraft relative to the ground. The drive 55 also has a high-speed range in which it rapidly traverses or slews the carriage 30 and displayed chart to effect a radical change in latitude.

When working at its normal operating speed range, the servo drive 55 utilizes the combined outputs of constant speed motor M1 and variable speed motor M2 (FIGS. 1 and 2). The motor M1 is connected as by bevel gears 67 to a constant speed shaft 68. The shaft 68 is connected at its right-hand end (as viewed in FIG. 2) to a differential gear cluster 69, shown in detail in FIG. 2A. The variable speed motor M2 is also connected to differential gear cluster 69. The resulting rotational output of differential gear cluster 69 drives intermediate shaft 70. The latter is drivingly connected to differential gear cluster 71, substantially identical with the cluster 69. Drive motor M8, also connected to the cluster 70, serves under these conditions to restrain its input gearing from rotating. Consequently, the output shaft of the differential gear cluster 70, through bevel gears 72, serves to drive shaft 73 which is directly connected to the latitude lead screw 42 of carriage slide 31. By means of this arrangement, variation of the rotational speed of the motor M2 can be utilized to vary the vertical or latitudinal movement of the carriage 30 and displayed chart from increasing latitude through zero to decreasing latitude, and vice versa.

For the purpose of varying the speed of motor M2 a potentiometer P1 is provided which adjusts the resistance in series with the armature circuit of motor M2, the latter in this instance being a permanent magnet type D.C. Motor. This variation of resistance in series with the motor armature produces a variation in speed of rotation of the motor which is proportional to the voltage applied to the motor. Potentiometer P1 is a linear type potentiometer in which the resistance from the fixed terminal to the movable arm 74 is directly proportional to the amount of rotation of the movable arm. Thereby the rotational speed of motor M2 may be varied as the position of the movable arm 74 is adjusted relative to the fixed terminal of the potentiometer. Movable arm 74 of potentiometer P1 is fixed to shaft 75 which is rotated by motor M4, a permanent magnet type D.C. motor controlled by reversing switch RS3, command switch CS, and mode switching relay system MSR.

When working at its high speed range, the servo drive 55 utilizes primarily the output of slew motor M8 which may, for example, have a rotational speed on the order of one hundred times that of the motors M1 and M2. Thus rotation of slew motor M8 causes a rotational output of differential gear cluster 71 to latitude drive shaft 72 and lead screw 42 whereby the slide 31, carriage 30, and displayed chart are rapidly traversed in an increasing or a decreasing latitudinal direction, depending upon the rotational direction of motor M8. This is accomplished manually through the four way joy stick control switch MSS. It is also accomplished as an incident to automatic control under high rates of change of reference data signals.

The servo drive 56 comprises constant speed motor M1, variable speed motor M3, control potentiometer P2 and and its adjusting motor M5, reversing switch RS4 and slew motor M9. Switch RS4 is adapted to respond to command signals from command switch CS, or alternatively, to signals froms manually actuated joy stick switch MSS on the front panel of the apparatus. The servo drive 56 has a normal operating speed range in which it moves the carriage 30 and the displayed chart at the rate of change of longitude of the aircraft relative to the ground. The drive 56 also has a high speed range in which it rapidly traverses or slews the carriage 30 and displayed chart to effect a radical change in longitude.

In its normal operating speed range, the servo drive 56 utilizes the combined outputs of constant speed motor M1 and variable speed motor M3 (FIGS. 1 and 2). The motor M1 is connected as by bevel gears 67 and constant speed shaft 68 to a differential gear cluster 76 identical to the cluster 69 at the opposite end of the shaft 68. Variable speed motor M3 is also connected to the cluster 76 and the resulting output of the latter drives intermediate shaft 78. The latter is drivingly connected to differential gear cluster 79 substantially identical to the cluster 76. Drive motor M9, also connected to the cluster 79, remains stationary under these conditions and serves to restrain its input gear from rotating. As a result, the output shaft of the gear cluster 79, through bevel gears 80, serves to drive shaft 81 which is directly connected to longitude lead screw 46 of carriage slide 36. With this arrangement, variation of the rotational speed of the motor M3 can be utilized to vary the horizontal or longitudinal movement of the carriage 30 and the displayed chart from increasing longitude through zero to decreasing longitude and vice versa.

The motor M3 is substantially identical with the motor M2 and its speed may be varied in a similar manner. To this end, a linear type potentiometer P2 similar to the potentiometer P1 is adapted to vary the resistance in series with the armature of the motor M3. Potentiometer P2 has a movable arm 82 fixed to shaft 84 which is adjustably rotated by motor M5. The latter, a permanent magnet D.C. motor like the motor M4, is controlled by reversing switch RS4, command switch CS, and mode switching relay system MSR.

In its high-speed range, the servo drive 56 utilizes primarily the output of slew motor M9 substantially identical with the motor M8. In this instance, rotation of slew motor M9 causes a rotational output of differential gear cluster 79 to longitude drive shaft 81 and lead screw 46 whereby the slide 36, carriage 30, and displayed chart are rapidly traversed in an increasing or decreasing longitudinal direction, depending upon the rotational direction of motor M9. This, as in the case of the motor M8, is accomplished manually through the four-way joystick control switch MSS.

(c) *Locator disc support.*—In the dual omni mode of operation, the locator discs LD1 and LD2 are used as bearing duplicating devices. Each disc may be adjusted in a plane normal to its rotational axis so as to position the latter at any given point relative to the filmed chart displayed on the screen 22. The disc LD1 may, for example, be selectively positioned with its rotational axis centered on the omnibearing station to which the receiver OBR1 may be tuned. In like manner, the disc LD2 may be selectively positioned so that its rotational axis is centered on the omnibearing station to which receiver OBR2 may be tuned. Each of the discs LD1 and LD2 remains centered on the location of its respective omnibearing station as long as that station is being used as a navigational reference.

Figure 5:
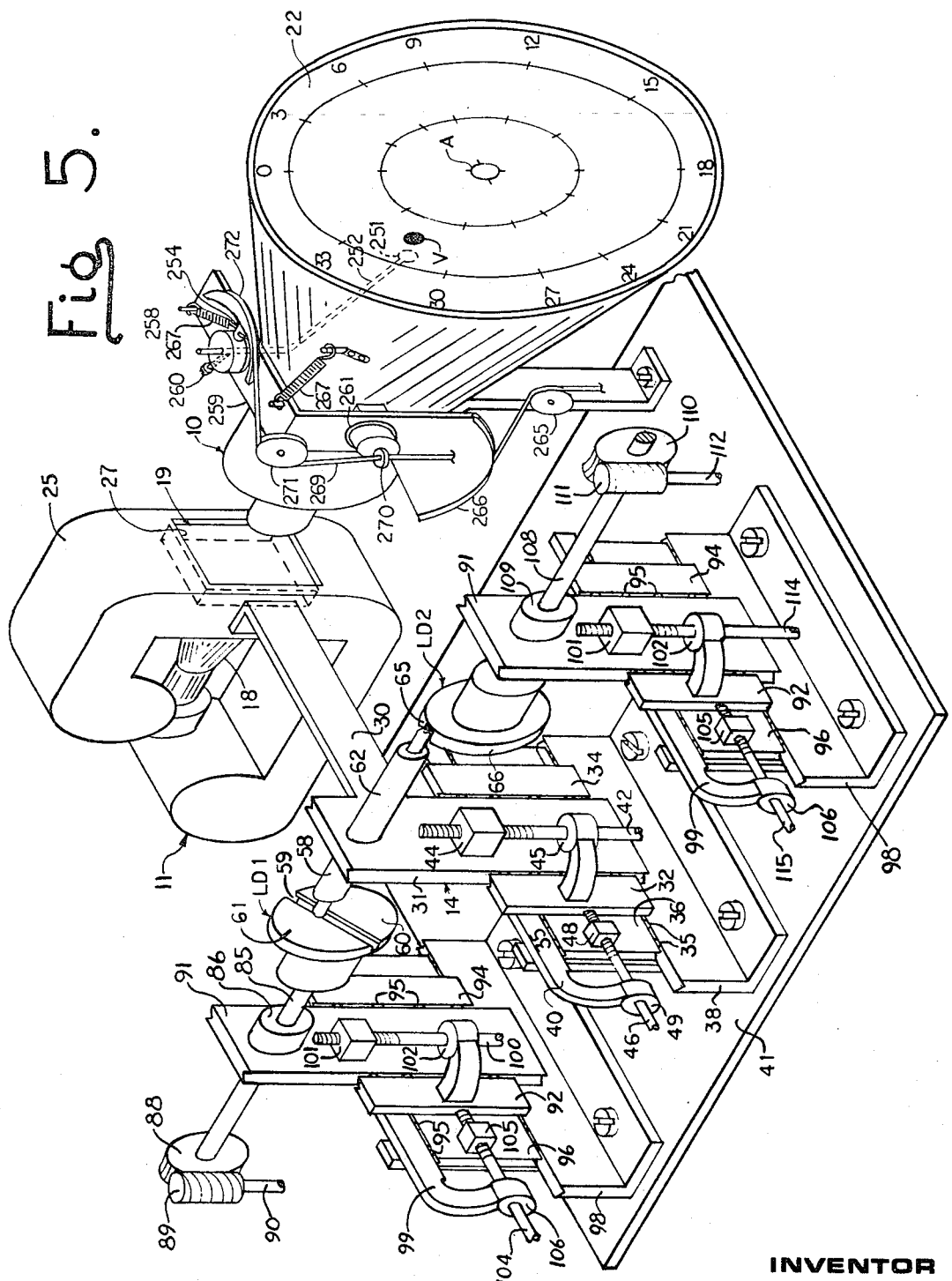
FIG. 5 is an enlarged fragmentary perspective view illustrating the mechanical components of the apparatus used for bearing and distance duplication.

As shown in FIGS. 1, 2 and 5, the disc LD1 is fixed to one end of a shaft 85 journaled in bearing 86 which permits rotation but precludes axial movement of the shaft. The opposite end of the shaft 85 has a gear 88, in this instance a worm wheel, fixed thereon. The worm wheel 88 is driven by means of worm 89 and shaft 90 which, in turn, are driven by bearing drive motor M6.

The disc LD1 and its associated shaft 85 and bearing 86 are mounted on a vertical or latitude slide 91 similar to the latitude slide 31 of the film carriage. The slide 91 is mounted for vertical sliding movement in guideways 92, 94. Ball elements 95 may be interposed therebetween to reduce friction. The guideways 92, 94 are rigidly fixed to a horizontal or longitude slide 96 similar to the longitude slide 36 of the film carriage. The slide 96 is movable in horizontal guideways 98, 99 fixed to the apparatus base plate 41. Ball elements 95 may also be interposed between the slide 96 and its guideways.

The latitude slide 91, shaft 85 and disc LD1 may be driven vertically in unison by means of lead screw 100 which threadedly engages nut 101 fixed to the slide 91. The lead screw 100 is journalled in a thrust bearing 102 fixed to the guideway 92 and which permits the screw 100 to rotate but restrains it against axial movement.

The longitude slide 96, guideways 92, 94, latitude slide 91, shaft 85 and disc LD1 may be driven horizontally in unison by means of lead screw 104 which threadedly engages a nut 105 fixed to the slide 96. The lead screw 104 is journalled in a thrust bearing 106 fixed to the guideway 99. The bearing 106 permits rotation but precludes axial movement of the lead screw 104.

In like manner, the locator disc LD2 is fixed to one end of a shaft 108 journaled in a bearing 109 which permits rotation but not axial movement thereof. Gear 110, in this case a worm wheel, is fixed to the opposite end of the shaft 108 and driven by worm 111. The latter is fixed to shaft 112 driven by bearing drive motor M7.

The disc LD2 and its associated shaft 108 and support bearing 109 are mounted for vertical and horizontal movement on slides 91 and 96 identical with those associated with the disc LD1. Like reference numerals will, accordingly, be applied to the slide mechanism associated with the disc LD2 except for the lead screws. Latitude slide 91 of disc LD2 is driven by lead screw 114, while longitude slide 96 is driven by lead screw 115. The lead screws 114, 115 are similar in construction and operation to the lead screws 100, 104 described above.

(d) *Positioning the locator discs.*—In order to condition the apparatus NC for operation in the dual omni mode, a presetting mode must first be initiated. To accomplish this, provision is made for adjusting the position of each of the locator discs LD1 and LD2 relative to the filmed chart displayed on the screen 22 so that the rotational axis of each disc may be centered on the omnibearing station to which its corresponding receiver is tuned. In the case of the disc LD1, actuation of push-button switch N (FIGS. 1 and 4) sets up mode switching relay system MSR to carry out this presetting operation by using the signals produced between the follower 58 and the two segments 60, 61 of the disc, and an additional signal indicative of the distance between the follower 58 and the rotational axis of the disc LD1. In the case of the disc LD2, actuation of push-button switch W (FIGS. 1 and 4) sets up mode switching relay system MSR to carry out such presetting by using the signals produced between the follower 62 and the segments 65, 66, and an additional signal indicative of the distance between the follower 62 and the rotational axis of the disc LD2. Before discussing disc positioning in detail, it would be helpful to describe below certain additional structural features of the discs.

As illustrated in FIGS. 1, 6 and 7, the locator disc LD1 comprises a generally cylindrical body 116 of insulating material. The body 116 has fixed thereto conductive segments 60, 61 separated by diametrical slot 59. The edges of the segments 60, 61 defining the slot 59 are beveled to facilitate engagement with contact plunger 118 of the follower 58 which is adapted to make electrical contact with either or both segments. To permit the necessary amount of relative movement between the disc segments 60, 61 and the plunger 118 to accommodate all operating conditions, the plunger 118 is mounted for axial movement in the follower 58 and resiliently biased toward the segments 60, 61. In order to couple the segments 60, 61 to the control circuitry of the device NC, the segments are respectively connected to slip rings 119, 120 on the body 116. The slip rings 119, 120 are, in turn, connected to the mode switching relay system, producing a signal identified as $c_1$.

Mounted in the body 116 of the disc LD1 and extending longitudinally of the slot 59 is a resistor 121 which in this case happens to be of the cylindrical wire-wound type. One end of the resistor 121 is connected to a slip ring 122 and its other end is grounded to the shaft 85 through a fixed resistor 124 of substantially lower value than that of the resistor 121. The center of the resistor 121, which physically coincides with the rotational axis of the disc LD1 and shaft 85, is connected to a slip ring 125. Cooperating with the resistor 121 is a slide wire contact pin 126 carried in an insulated sleeve 128 at the center of the follower 58. The pin 126 and its sleeve 128 are yieldably biased toward resistor 121 so as to maintain good electrical contacts between the latter and the pin. A voltage is applied across the resistor 121 producing a gradient from end to end. The voltage sensed by the contact pin 126 on the resistor 121 is proportional to the distance of the pin 126 from the rotational axis of the disc LD1. The contact pin 126 is connected to the selector switch SS1 and produces a signal therein identified as $f_3$. The center of the resistor 121 is also connected, via the slip ring 125, to the selector switch SS1 and produces a signal therein identified as $f_5$.

Figure 11:
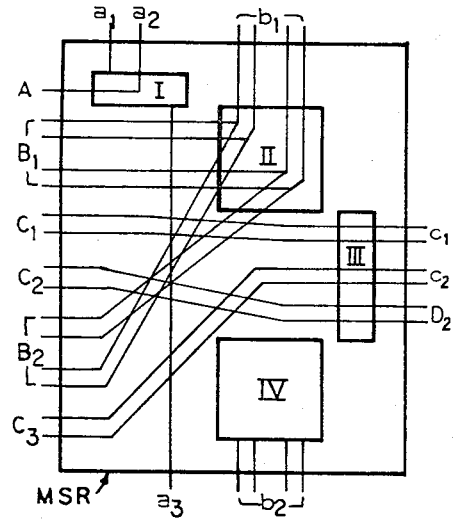

The variable difference F between the signals $f_3$ and $f_5$ is impressed upon a differential amplifier DA2 which produces a signal $d$ on selector switch SS2. The latter in response produces a signal $D_2$ which is routed to mode switching relay system MSR. The signal $D_2$, in combination with the signal $c_1$ from the segments 60, 61 and their associated slip rings 119, 120 is routed to the command switch CS and drives the film carriage in latitude and/or longitude so as to transport the follower 58 to the center or rotational axis of the disc LD1. When contact pin 126 is touching either disc segment, the voltage on the pin is at zero potential and signal $d$ is interrupted until contact with a positive voltage on resistor 121 is re-established. Resistor 124 is interposed in the distance sensing circuit to insure a positive voltage at all points on resistor 121. Referring to FIGS. 1 and 11, it may be seen that sensing signal $a_2$ provides the latitude-longitude selection while sensing signal $b_1$ provides the increase-decrease orientation to the command switch CS for this presetting mode.

When the follower 58 has reached the center of the disc LD1, the latitude and longitude clutches 129, 130 associated with the disc LD1 are automatically engaged through an appropriate electrical control and the manual joystick switch MSS is automatically connected for manual operation. At this point, the reticle A at the center of the screen 22 will show the location of the disc LD1 on the displayed portion of the chart. Up to this point, however, the disc LD1 remained in a physically fixed position and the film carriage, together with the displayed portion of the chart, was moved relative to the disc LD1 and to the screen 22. Due to the fact that the latitude and longitude clutches are now engaged, further movement of the film carriage 30 and the displayed portion of the chart under the control of manual switch MSS will result in simultaneous translational movement of locator disc LD1. Such translational movement is depicted as movement of the chart relative to the reticle A which still represents the position of the disc LD1. The disc LD1 may then be positioned so as to be centered on any selected navigational station shown on the displayed portion of the chart simply by use of the joystick switch MSS and visual observation of the displayed portion of the chart.

The disc LD2 is identical in construction to the disc LD1 and, in the dual omni mode of operation as well as in positioning, has identical circuitry associated therewith. The disc LD2 thus comprises body 131; conductive segments 65, 66 separated by slot 64; slip rings 132, 134 connected respectively to segments 65, 66; resistor 135 extending longitudinally of the slot 64; slip rings 136, 138 connected respectively to one end and the center of resistor 135, and fixed resistor 139 between the other end of the resistor 135 and disc shaft 108. Operatively associated with the disc LD2 are contact plunger 140 in follower 62, slide wire contact pin 141 centrally mounted in insulated sleeve 142 within the plunger 140; latitude clutch 144 and longitude clutch 145 identical to the clutches 129, 130.

Signals are generated by the disc LD2 and its associated follower 62 in a manner identical to those generated by the disc LD1 and its follower 58. Such signals are likewise used for positioning of the film carriage 30 to center the follower 62 on the rotational axis of disc LD2. These are the signal $c_2$ from the disc segments 65, 66 impressed on the mode switching relay system, the signal $f_4$ from the contact pin 141 applied to selector switch SS1; the signal $f_5$ from the center or the resistor 135 applied to the selector switch SS1. The variable difference F between the signals $f_4$ and $f_5$ is impressed upon differential amplifier DA2 which produces a signal $d$ on selector switch SS2. The latter produces a corresponding signal $D_2$ which is routed to mode switching relay system MSR. The signal $D_2$ in combination with signal $c_2$ from the segments 65, 66 and their associated slip rings 132, 134 is routed to the command switch CS and drives the film carriage in latitude and/or longitude so as to transport the follower 62 to the center, or rotational axis, of the disc LD2. When contact pin 126 is touching either disc segment, the voltage on the pin is a zero potential and signal $d$ is interrupted until contact with a positive voltage on resistor 121 is re-established. Resistor 124 is interposed in the distance circuit to insure a positive voltage at all points on resistor 121. As indicated in FIGS. 1 and 11, sensing signal $a_3$ provides the latitude-longitude selection while sensing signal $b_2$ provides the increase-decrease orientation to the command switch CS for this presetting mode.

When the follower 62 has reached the center of the disc LD2, the latitude and longitude clutches 144, 145 associated with the disc LD2 are automatically engaged through an appropriate electrical control and the manual joystick switch MSS is automatically connected for manual operation. By means of this arrangement, the disc LD2 may readily be positioned on the second selected navigational station through use of the manual joystick switch MSS and visual observation of the displayed portion of the chart.

(e) *Command signal selection and routing—dual omni mode.*—Signals generated by rotation of locator disc LD1 result from contact of follower 58 and one or both of the insulated segments 60 or 61. When the diametrical slot 59 is oriented in a north-south direction, indicating a bearing of 0° or 180°, rotation of locator disc LD1 in response to bearing change creates signals indicative of pure longitudinal change of direction. Likewise, when the diametrical slot 59 is oriented in an east-west direction indicating a bearing of 90° or 270°, rotation of locator disc LD1 in desponse to bearing change creates signals indicative of pure latitudinal change of direction. As locator disc LD1 rotates from 0° to 90°, signals generated through the insulated segments in contact with the follower 58 are most advantageous to control the longitudinal servo drive 56 when in the vicinity of 0°. In the vicinity of 90°, they are most advantageous to control the latitudinal servo drive 55.

With the foregoing in mind, means has been provided for effecting the most advantageous signal selection for controlling the respective latitude and longitude servo drives 55, 56 in view of the angular orientation of the locator discs LD1 and LD2. In the present instance, such means comprises a dual cam mechanism 146 (FIGS. 1 and 2). This includes cam 148, angularly positioned by bearing drive motor M6 as the latter operates in servo loop 50, and cam 149, angularly positioned by bearing drive motor M7 as the latter operates in servo loop 52. Such positioning occurs in response to signals received through omnibearing receivers OBR1 and OBR2 and the action of servo loops 50 and 52. Cam 148 may, for example, be conductive to ground while cam 149 is non-conductive to ground. Follower 150, adapted to engage the periphery of each of the cams 148, 149 is connected electrically to the mode switching relay system MSR and generates signal $a_1$ as shown in FIG. 1. Mode switching relay system MSR, in the dual omni mode, directs signal $a_1$ to command switch CS. Cams 148 and 149 are substantially elliptical in shape and are oriented with respect to the true bearing indication of the respective omnibearing receivers OBR1 and OBR2 so that the highest points of each cam are in contact with follower 150 when on bearing indication of 90° and 270° and the lowest points are in contact at 0° and 180°. Thus follower 150 will touch one cam 148 or 149, namely the one which is positioned by its omnibearing receiver at a bearing indication which is nearest to 90° or 270° orientation. Thus when locator disc LD1 is nearest to a 90° or 270° orientation, a grounded signal will be produced at $a_1$ and command switch CS will route signals from locator disc LD1, shown as $c_1$ in FIG. 1, to actuate servo drive 55, the latitude control drive. Simultaneously, servodrive 56 will be controlled by signals $c_2$ to position in longitude. Likewise, when locator disc LD2 is nearest to 90° or 270° orientation, a non-grounded signal will be produced at $a_1$ and command switch CS will route signals from locator disc LD2, shown as $c_2$ in FIG. 1, to actuate latitude control servodrive 55. Simultaneously, longitude control servodrive 56 will be actuated by signal $c_1$.

When the bearings from the selected omni transmitting stations to the aircraft and the bearing lines between the locator disc slots are both approaching a parallel position, the location of the intersection of these lines becomes inaccurate. For the purpose of deactivating input information during such period of operation, two contacts 151, 152 positioned on grounded cam 148 will touch mating contact 154 on cam 149 when the bearing to the omni transmitting station tuned by OBR1 is within, for example, ±5° of the bearing or ±5° of the reciprocal bearing to the omni transmitting station tuned by OBR2. Such signal, designated $D_a$, is transmitted directly to the command switch CS via slip ring 155 and slip ring contact 153 to deactivate automatic positioning, i.e., functioning of servo loops 51 and 54, and to energize a lamp 156 on the control panel to indicate such deactivation to the pilot.

Provision is made for selectively assigning the function of locator disc segment 60 and locator disc segment 61 to signal either latitude increase-latitude decrease, or longitude increase-longitude decrease, depending upon the bearing orientation of the locator disc LD1. This is accomplished by use of an assignment selecting means including longitude cam 158 and latitude cam 162. Cam 158 is mounted on shaft 85 and causes follower 159 to make contact with contact point 160 or 161. Cam 158 is positioned so that it reverses the assignment of locator disc segment 60 and locator disc segment 61 for longitude increase-longitude decrease, this assignment reversal being made when the bearing from the station is at 90° and 270°. In a similar manner, latitude cam 162 is mounted on shaft 85 and causes follower 164 to engage contact point 165 or 166 thus reversing the assignment of latitude increase-latitude decrease for locator disc segments 60 and 61. This assignment reversal is made when the bearing from the station is 0° and 180°.

Similar means is utilized for selective assignment of the function of locator disc segments 65 and 66 to signal either latitude increase-latitude decrease, or longitude increase-longitude decrease, depending upon the bearing orientation of locator disc LD2. Such assignment selecting means includes longitude cam 168 and latitude cam 169. Cam 168 is mounted on shaft 108 and causes follower 170 to make contact with contact point 171 or 172. Cam 168 is positioned so that it reverses the assignment of locator disc segment 65 and locator disc segment 66 for longitude increase-longitude decrease, this assignment reversal being made when the bearing from the station is at 90° and 270°. In a similar manner, cam 169 is mounted on shaft 108 and causes follower 174 to engage contact point 175 or 176 thus reversing the assignment of latitude increase-latitude decrease for locator disc segments 65 and 66. This assignment reversal is made when the bearing from the station is 0° and 180°.

The control signals thus generated are transmitted to the mode switching relay system MSR. The signals from locator disc LD1 are shown in FIG. 1 as $b_1$ and the signals from locator disc LD2 are shown in FIG. 1 as $b_2$. Thus for the dual omni receiver mode of operation, the pair of signals shown as $c_1$ generated by locator disc LD1 in servo loop 51 is switched by the command switch CS to latitude drive 55 or longitude drive 56 as determined by signal $a_1$ generated by the latitude-longitude assignment cam system described above. The signal $a_1$ likewise will deactivate the appropriate signal received as $b_1$, i.e., a latitude assignment for LD1 will deactivate increase-decrease signals at $b_1$ for longitude. The remaining signal at $b_1$ will thus switch the proper segment of locator disc LD1 to increase and decrease according to the orientation of locator disc LD1 with respect to latitude as previously described. In like manner, the pair of signals shown as $c_2$ generated by locator disc LD2 in servo loop 54 is switched by the command switch CS to longitude drive 56 or latitude drive 54 as determined by signal $a_1$ from the latitude-longitude assignment cam system already described. The signal $a_1$ will also deactivate the appropriate signal received as $b_2$, i.e., a longitude assignment for LD1 will deactivate increase-decrease signals at $b_2$ for latitude. The remaining signal at $b_2$ will thus switch the proper segment of locator disc LD2 to increase and decrease according to the orientation of locator disc LD2 with respect to longitude as previously described.

In the dual omni mode of operation, the instantaneous position of the aircraft is defined by the intersection of the bearing lines from the two tuned reference stations. As noted above, locator disc LD1 provides signals for positioning the follower 58 on the bearing line to its reference omnibearing station, the disc LD1 having been previously centered or positioned on that station. Simultaneously, locator disc LD2 provides signals for positioning its follower 62 on the bearing line to its reference omnibearing station, disc LD2 having been previously centered or positioned on that station. The followers 58, 62 are located on the film carriage in a fixed position with respect to the selected chart or film frame being projected. Thus when each follower is positioned on its respective bearing line, the position depicted at the reticle A is the instantaneous position of the aircraft.

(B) SINGLE OMNI-DME MODE

As indicated earlier herein, in this mode of operation the reference data for the apparatus NC is derived from an omnibearing radio transmitting station together with its associated Tacan distance measuring equipment. This data consists of signals indicative of the bearing from the selected station to the aircraft and additional signals indicative of the distance between the selected station and the aircraft. To set up this mode, one omnibearing receiver, for example OBR1, is tuned to the selected transmitting station and then the on board distance measuring equipment DME is tuned to the compatible Tacan equipment of that omni transmitting station. The bearing duplicating device LD1 associated with receiver OBR1 is prepositioned to a point corresponding to the location of the reference station on the projected portion of the filmed chart. A correction for magnetic deviation at the omnibearing transmitting station is introduced and the apparatus is then switched to automatic operation.

(a) *Single omni-DMF servo loops.*—In this case, the control means 15 utilizes three interacting servo loops 50, 51 and 53 which interact to effect continuous repositioning of the film chart relative to the aircraft locating reticle A on the screen so that the instantaneous position of the aircraft relative to the earth's surface is continuously indicated.

The servo loop 50, described earlier herein, comprises omni receiver OBR1, differential amplifier DA1, reversing switch RS1, bearing drive motor M6, and bearing adjustment device OBA1. Servo loop 51, also described earlier herein, comprises locator disc LD1, mode switching relay system MSR, command switch CS, latitude or longitude servodrives 55, 56 connected to the film carriage 30, and follower 58 which moves in unison with the film carriage while engaging the disc LD1.

As in the case of the dual omni mode of operation, the position of locator disc LD1 relative to the filmed chart displayed on the screen 22 may be adjusted in a plane normal to the rotation axis of the disc so as to center its rotational axis on the omnibearing station to which receiver OBR1 is tuned. The angular position of the disc LD1 thus represents the bearing between the aircraft and that omni station and the output signals from the disc represent the rate of change of the bearing.

Voltage output signals indicative of the bearing to which the disc LD1 is being driven by the bearing drive motor M6 are directed to mode switching relay system MSR and then to the command switch CS. The switch CS, in turn, selectively directs these signals to the latitude servodrive 55 or to the longitude servo drive 56, whichever can be most advantageously controlled in view of the angular position of the disc at that time. The mechanical output of the selected servo drive operates the latitude or longitude lead screw 42 or 46 of the film carriage 30. The resulting motion imparted to the carriage is transmitted back to the disc LD1 by the follower 58.

The servo loop 53 comprises distance measuring equipment DME which furnishes a reference signal to selector switch SS1, differential amplifier DA2, selector switch SS2, mode switching relay system MSR, command switch CS, latitude or longitude servo drive 55 or 56, and distance sensing potentiometer DP associated with the locator disc LD1.

The potentiometer DP comprises the resistor 121, mounted in the slot 59 of the disc LD1, and cooperating slide wire contact pin 126 mounted in an insulating sleeve at the center of the follower 58. As indicated earlier herein, a voltage is applied across the resistor 121, producing a gradient, and the magnitude of the voltage sensed by the contact pin 126 is proportional to the distance of the pin 126 from the rotational axis of the disc LD1. The pin 126 is connected to the selector switch SS1 and applies a signal thereto identified as $f_3$.

(b) *Distance sensing and signaling.*—The on board distance measuring equipment DME produces a signal voltage the magnitude of which is proportional to the distance of the aircraft from the tuned station. This signal, identified as $f_2$, is applied to selector switch SS1, along with the signal $f_3$ received from slide wire contact pin 126 of the distance sensing potentiometer DP. This latter signal is proportional to the distance between contact pin 126 and the axis of rotation of locator disc LD1. The variable difference F between the signals $f_2$ and $f_3$ is impressed upon differential amplifier DA2, which produces a signal $d$ applied to selector switch SS2. The latter, in response, produces a signal $D_2$ which in turn is impressed upon mode switching relay system MSR as signal $c_3$. The signal $c_3$, produces an output signal $C_2$ from the mode switching relay system MSR and the signal $C_2$ is impressed upon the command switch CS. The command switch CS causes the film carriage to be driven in latitude or longitude so as to transport the follower 58 to a distance from the center or rotational axis of the disc LD1 corresponding to the distance indiacted by the signal from the distance measuring equipment DME. At this point the voltage signals $f_2$ and $f_3$ are equal and the servo loop 53 is in balance. However, as the distance measuring equipment DME signals a change in distance to the reference station, the resulting imbalance in the servo loop 53 causes an appropriate corrective adjustment in the position of the follower 58 relative to the center of the disc LD1.

In order to match the output signal $f_3$ from the distance sensing potentiometer DP to the scale of the chart being projected, a calibrating device 178 is utilized (FIGS. 1 and 4). This device comprises potentiometer 179, indicating dial 180, adjusting knob 181, and a suitable constant voltage source. The device 178 is connected between the center and high voltage end of the resistor 121 of the potentiometer DP via the slip rings 122, 125 and is adapted to apply a predetermined voltage increment to the resistor 121. This shifts the slope of the voltage gradient on the resistor 121 and adjusts the output signal $f_3$ from slide wire contact pin 126 to match the particular scale of the projected chart.

Operatively associated with the calibrating device 178 is a distance indicator 182. In this case, the indicator 182 happens to be a voltmeter connected to indicate the magnitude of the signal voltage $f_3$. The scale of the indicator 182 is calibrated in miles and the reading thereon is the distance from the aircraft to the reference omni Tacan station. As shown in FIG. 1, one terminal of the indicator 182 is connected to the center of the resistor 121 via slip ring 125, while the other terminal is connected to the silde wire contact pin 126 via one pole 184 of selector switch SW4.

(c) *Command signal selection and routing—omni-DME.*—To effect the most advantageous signal selection for controlling the respective latitude and longitude servo drives 55, 56 in this mode, selector means responsive to bearing from the tuned station is provided. In the embodiment illustrated, such means comprises a rotary switching device 185 (FIGS. 1 and 2) fixed to shaft 85 and disc LD1 for rotation in unison therewith. The device 185 is adapted to assign the bearing signal $c_1$ from segments 60, 61 of locator disc LD1 to control of the latitude servo drive 55, for example, while at the same time assigning distance signal $D_2$ from distance sensing potentiometer DP and DME to control of the longitude servo drive 56, or vice versa.

The device 185 in this instance comprises a commutator disc 186 divided into four segments, 187, 188, 189, and 190 (FIG. 2). Segments 187, 188 are opposing segments and electrically non-conductive, while segments 189, 190 are likewise opposing segments but electrically conductive. A sliding contact 191 supported on a resilient arm is adapted to follow the periphery of the commutator 186. As the commutator 186 rotates about the points of the compass in unison with the disc LD1, appropriate signals are produced for assignment of the disc segments 60, 61 to latitude control, for example, and for assignment of the distance sensing potentiometer DP and distance measuring equipment DME to longitude control, or vice versa. In practice, locator disc segments 60, 61 are assigned to latitude control when bearing from the reference station is 45° to 135° or 225° to 315°, and distance sensing potentiometer DP and distance measuring equipment DME are assigned to longitude control in these angular ranges. The assignment is reversed as to latitude and longitude control when the bearing from the reference station is in the angular range of 135° to 225° or 315° to 45°.

In this mode, as in the dual omni mode, the same means is utilized for selectively assigning the function of locator disc segments 60 and 61 to signal either latitude increase-latitude decrease, or longitude increase-longitude decrease, depending upon the bearing orientation of the locator disc. Such assignment selecting means, described earlier herein, comprises longitude cam 158, follower 159, and contacts 160, 161, together with latitude cam 162, follower, 164, and contacts 165, 166. As in the dual omni mode, longitude-increase-longitude decrease reversal is effected when the bearing from the reference station is at 90° and 270°, while latitude increase-latitude decrease reversal is effected when the bearing from the station is at 0° and 180°.

Assignment of the combined signal from distance sensing potentiometer DP and distance measuring equipment DME to latitude or longitude control, as indicated above, depends upon the assignment of locator disc segments 60, 61 by commutator 186. Thus when the segments 60, 61 are assigned to latitude control, the combined DP and DME signal is assigned to longitude control, and vice versa.

Assignment of the combined DP and DME signal, which is actually a differential voltage, to indicate latitude increase-latitude decrease, or longitude increase-longitude decrease, is controlled by the same cam means used for assigning the function of disc segments 60, 61 to indicate latitude increase-latitude decrease or longitude increase-longitude decrease. Since the axis of the distance sensing potentiometer DP is displaced 90° from the common axis of the two segments 60, 61 (taken in the plane of the segments 60, 61) the function of the longitude and latitude cams is reversed in this situation. Thus longitude cam 158, follower 159, and contacts 160, 161 control the assignment of the combined DP and DME signal to indicate latitude increase-latitude decrease, while latitude cam 162, follower 164, and contacts 165, 166 control the assignment of the combned DP and DME signal to indicate longitude increase-longitude decrease.

The differential voltage between the voltage sensed by the distance sensing potentiometer DP and the voltage signal from the distance measuring equipment DME is positive when the DME is indicating a greater distance from the reference station than slide wire contact pin 126 is indicating by its position along the resistor 121 from the axis of rotation of the disc LD1. When the bearing from the reference station is in the angular range of 315° to 45°, this positive differential voltage signal and the increase-decrease cam signal produced by follower 159 and contact 160 cause movement of the follower 58 and slide wire contact pin 126 in the *increase* latitude direction and null out the differential voltage signal when the follower 58 and contact pin 126 reach the distance indicated by the DME. When the bearing from the reference station is in the angular range of 135° to 225°, and when the DME is indicating a greater distance from the reference station that the contact pin 126 is indicating by its position along the resistor 121 from the axis of rotation of the disc LD1, a positive differential voltage also exists between the DP and DME outputs. In this instance, the positive differential voltage and the increase-decrease cam signal produced by follower 159 and contact 161 cause movement of the follower 58 and contact pin 126 in the *decrease* latitude direction and null out the differential voltage signal when the follower 58 and contact pin 126 reach the distance indicated by the DME. This reversal of direction of the latitude servo drive 55 for the same differential voltage signal is caused by the additional signal produced when follower 159 moves from contact 160 in the 315° to 45° angular range to contact 161 in the 135° to 225° angular range.

When the bearing from the reference station is in the angular range of 45° to 135°, and when the DME is indicating a greater distance from the reference station than slide wire contact pin 126 is indicating by the position along the resistor 121 from the axis of rotation of the disc LD1, a positive differential voltage exists between the DP and DME outputs. In this case, the positive differential voltage and the increase-decrease cam signal produced by follower 164 and contact 165 cause movement of the follower 58 and slide wire contact pin 126 in the *decrease* longitude direction and null out the differential voltage signal when the follower 58 and contact pin 126 reach the distance indicated by the DME. When the bearing from the reference station is in the angular range of 225° to 315°, and when the DME is indicating a greater distance from the reference station than the contact pin 126 is indicating by its position along the resistor 121 from the axis of rotation of the disc LD1, a positive differential voltage also exists between the DP and DME outputs. In this instance, the positive differential voltage and the increase-decrease cam signal produced by follower 164 and contact 166 cause movement of the follower 58 and contact pin 126 in the *increase* longitude direction and null out the differential voltage signal when the follower 58 and contact pin 126 reach the distance indicated by the DME. This reversal of direction of the longitude servo drive 56 for the same differential voltage signal is caused by the additional signal produced when followed 164 moves from contact 165 in the 45° to 135° angular range to contact 166 in the 225° to 315° angular range.

In the single omni-DME mode of operation, the instantaneous position of the aircraft is defined by the bearing line from the tuned reference station and a point on that line at a distance indicated by the distance measuring equipment DME. As stated earlier herein, locator disc LD1 provides signals for positioning the follower 58 on the bearing line from its reference omni-bearing station, the disc LD1 having been previously centered or positioned on that station. Simultaneously, distance measuring potentiometer DP on the disc LD1, together with the distance measuring equipment DME, provide signals for positionings the follower 58 and contact pin 126 along the bearing line at a distance from the tuned station indicated by the distance measuring equipment DME. The follower is located on the film carriage in a fixed position with respect to the selected chart or film frame being projected. Accordingly, when follower 58 is positioned on the bearing line and at the measured distance from the tuned station to the aircraft, the position depicted at reticle A is the instantaneous position of the aircraft.

(d) *Destination or way station navigation.*—When operating in the single omni-DME mode, the apparatus NC is adapted to furnish continuous bearing and distance information with respect to any selected way station or destination point on the displayed chart. The way station or destination point may be any selected point on the displayed chart and need not be the situs of a reference radio station. Locator discs LD2, which is otherwise uncommitted in the single omni-DME mode, is utilized in carrying out the foregoing nagivational function.

As noted earlier herein, locator disc LD2 is substantially identical in construction to locator disc LD1. The signal sensing devices associated with the disc LD2 are likewise substantially identical to those of the disc LD1. These sensing devices comprise longitude cam 168, latitude cam 169, and their associated followers and contacts, previously described. They also include rotary switching device 192 identical to the device 185 described above. The device 192 includes commutator disc 193, non-conductive disc segments 194, 195, conductive disc segments 196, 197, and sliding contact 198 mounted on a resilient arm.

To set up the destination or way station function, the initial step is to position the locator disc LD2 at the selected geographical point on the displayed chart. Such positioning is accomplished in the same manner as that previously described for positioning the locator disc LD2 in the dual omni mode of operation. This involves actuation of push-button switch W (FIGS. 1 and 4) which sets up the mode switching relay system MRS to carry out the presetting operation involved in positioning disc LD2. Under these conditions, the follower 62 will seek the center or rotational axis of the disc LD2. When the follower 62 has reached the center of disc LD2, the joystick switch MSS is automatically connected for manual operation. The disc LD2 may then be positioned on the selected geographical point through use of the joystick switch MSS and visual observation of the displayed portion of the chart.

After the disc LD2 is positioned on the way station or destination point, the apparatus NC may then be returned to operation in the single omni-DME mode by actuating the push-button switch N-D. The apparatus will then move the chart so that reticle A again shows the instantaneous position of the aircraft. At this point, switch SW4 may be shifted to its W position, wherein signals $c_3$ from mode switching relay system MSR which originate from the disc segments 65, 66 of disc LD2 are routed to reversing switch RS2 (FIG. 11) by relay R. Reversing switch RS2 will actuate bearing drive motor M7 so as to rotate disc LD2 until its follower 62 is positioned in the slot 64 and drive signal $c_2$ is nulled out by contact of the follower 62 with both disc segments 65, 66. At this time, bearing indicator W (FIGS. 2 and 4) will indicate the bearing of the selected way station or destination point. With the follower 62 in the slot 64, slide wire contact pin 141 engages the resistor 135 and senses the voltage at the point of contact. This voltage appears on distance indicator 182 as a distance in miles from the center of rotation of disc LD2. Because the disc LD2 was positioned at the selected way station or destination point and left there, the distance shown on the indicator 182 represents the distance of the aircraft from the way station or destination point. As the aircraft changes position, and with the switch SW4 left in the W position, the bearing and distance indicating mechanism just described will adjust correspondingly and present a continuous readout of bearing and distance to the way station or destination point.

A further use of the mechanism just described is the generation of a reliable autopilot signal to guide the aircraft on a course to the way station or destination point. To accomplish this, the switch SW4 is shifted to its AP position, wherein signals $c_2$ from the disc segments 65, 66 of disc LD2 are routed by relay R for external connection to autopilot equipment. The signals thus made available will indicate left or right off course movement of the aircraft with respect to a fixed course on the bearing line indicated to the way station or destination point with no further adjustment of bearing indication.

(C) MODE SWITCHING RELAY SYSTEM AND COMMAND SWITCH

The mode switching relay system MSR (FIGS. 1, 10, 11 and 12) comprises a plurality of relays adapted to route the command signals from the signal generating components to the command switch CS which governs the latitude and longitude servo drives 55, 56. The relays of the system MSR may assume a variety of conventional forms and operate in groups, in this case designated I, II, III and IV, to effect the required signal routing for the presetting modes and operating mode of the apparatus NC.

The appropriate relays for each of the presetting and operating modes are activated by mode selector switch 199 (FIGS. 1 and 4). The selector switch 199 in this instance comprises a series of conventional momentary contact push-button switches designated, respectively, "Off, M, W, N, N–D, and N–W." For convenience, it might be noted that the functions of these push-button switches are as follows:

Off—disconnects all relay circuits of the apparatus NC.
M—makes electrical connections for selecting a desired chart, projecting a given area of the selected chart on the screen 22, and shifting the selected chart under manual control.
W—programs the mode switching relay system for the presetting mode in which locator disc LD2 is positioned relative to the chart displayed.
N—programs the mode switching relay system for the presetting mode in which locator disc LD1 is positioned relative to the chart displayed.
N–D—programs the mode switching relay system for automatic operation of the apparatus in the single omni-DME mode, and for destination and way station navigation.
N–W—programs the mode switching relay system for automatic operation of the apparatus in the dual omni mode.

The mode switching relay system input and output signals for the various presetting and operating modes are indentified in tabe 200 of FIG. 1.

Figure 10:
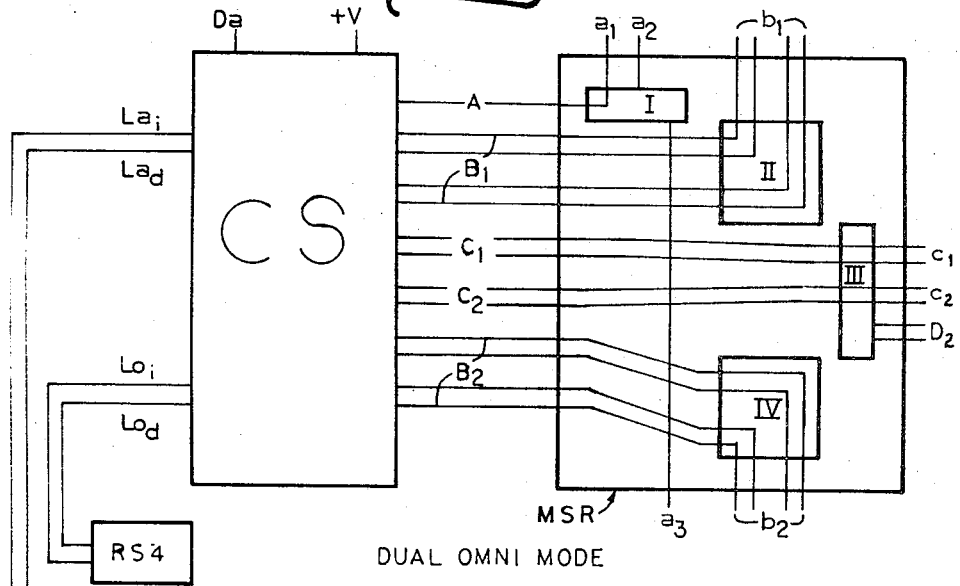
FIGS. 10, 11 and 12 are diagrammatic views illustrating the routing of the command signals of the exemplary apparatus by the mode switching relay system thereof.

It will be helpful at this point to note that the latitude and longitude servo drives 55, 56 are operated through treir respective reversing switches RS3 and RS4 (FIGS. 2 and 10). Each of the switches RS3 and RS4 has two ground-actuated external control circuits. The control circuits for the switch RS3 have been designated $LA_i$ and $LA_d$ while those for the switch RS4 have been designated $LO_i$ and $LO_d$. Completion of the electrical path to ground of the circuit $LA_i$ will actuate the latitude servo drive 55 in the increase direction, while completion of the electrical path to ground the control circuit $LA_d$ will actuate the latitude servo drive 55 in the decrease direction. Simultaneous grounding of both control circuits $LA_i$ and $LA_d$ will cancel each other out and no movement of the latitude servo drive 55 will occur. In like manner, completion of the electrical path to ground of the control circuit $LO_i$ will actuate the longitude servo drive 56 in the increase direction, while completion of the electrical path to ground of the control circuit $LO_d$ will actuate the longitude servo drive 56 in a decrease direction. Simultaneous grounding of both circuits $LO_i$ and $LO_d$ will cancel each one out and no movement of the longitude servo drive 56 will occur.

The drive signals produced by the signal generating components, namely locator disc segments 60, 61 and follower 58, disc segments 65, 66 and follower 62, and differential amplifier DA2 in response to the DP–DME differential voltage, are completions of appropriate ground paths for the circuits $LA_i$, $LA_d$, $LO_i$, $LO_d$ enabling the reversing switches RS3 and RS4 to actuate the latitude and longitude servo drives 55, 56. The selection of these paths designated generally as $c_1$, $c_2$ and $D_2$ together with the selection of the sensing signals designated generally as $a_1$, $a_2$ and $a_3$ governing the routing of the paths for latitude and longitude control, and the selection of the sensing signals designated generally as $b_1$ and $b_2$ governing increase-decrease orientations of the drive signals, is made by the mode switching relay system MSR. The appropriate command signals and sensing signals are thus connected to the command switch CS for the presetting or operating mode selected.

Figure 12:
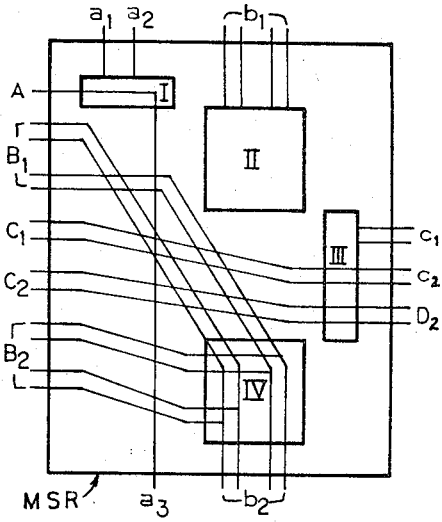

Referring more specifically to FIGS. 10–12, the routing of signals by the system MSR is there shown diagrammatically. Starting with FIG. 10, representing the dual omni mode of operation, it will be noted that the system MSR in this instance routes two of the signals $c_1$, $c_2$ out of three input signals $c_1$, $c_2$ and $D_2$ to provide the basic latitude and longitude servo drive control signals $C_1$, $C_2$. It may be observed that the signal $a_1$ of three input signals $a_1$, $a_2$, $a_3$ is routed in this mode to provide the latitude-longitude assignment of the two drive signals $c_1$, $c_2$. Further, it may be noted that the signals $b_1$, $b_2$ are both routed to the command switch CS to provide the latitude increase-latitude decrease and longitude increase-longitude decrease orientation of the two drive signals $c_1$, $c_2$.

Turning to FIG. 11, representing the single omni-DME mode of operation, as well as the presetting mode for positioning navigational station disc N, it will be noted that the system MSR routes the signals $c_1$ and $D_2$ of the three $c_1$, $c_2$ and $D_2$ to provide the basic latitude and longitude servo drive control signals $C_1$, $C_2$. Out of the three $a_1$, $a_2$, $a_3$, the signal $a_2$ is routed to provide the latitude and longitude assignment of the two signals $c_1$, $D_2$. In this mode, the signal $b_1$ provides the latitude increase-latitude decrease longitude increase-longitude decrease for signals $c_1$ while signal $b_1$ reversed provides the latitude increase-latitude decrease longitude increase-longitude decrease orientation of the selected drive signal pair $D_2$.

Referring next to FIG. 12, representing the presetting mode for way station disc positioning, the system MSR routes the signals $c_2$ and $D_2$ of the three $c_1$, $c_2$ and $D_2$ to provide the basic latitude and longitude servo drive control signals $C_1$, $C_2$. Of the three, $a_1$, $a_2$, $a_3$, the signal $a_3$ is routed to provide the latitude and longitude assignment of the signals $c_2$, $D_2$ selected. For this presetting mode, the signal $b_2$ provides the latitude increase-latitude decrease longitude increase-longitude decrease sense for signal pair $c_2$ while signal $b_2$ reversed provides the latitude increase-latitude decrease longitude increase-longitude decrease sense of the drive signal pair $D_2$.

The command switch CS, as noted earlier herein, selectively directs the signals from the mode switching relay system MSR to the latitude servo drive 55 or to the longitude servo drive 56. In the exemplary apparatus NC, as shown more specifically in FIG. 3, the command switch CS comprises a plurality of transistors, 18 in number, together with appropriate connections for routing the signals involved.

The sixteen transistors designated as $201a$–$b$–$c$–$d$, $202a$–$b$–$c$–$d$, $203a$–$b$–$c$–$d$ and $204a$–$b$–$c$–$d$ are of the PNP type. Such a transistor offers a blocking resistance to current flow from the emitter terminal toward the collector terminal when no flow of current occurs from the base terminal to a point at the voltage of the collector terminal. The resistance to current flow from emitter to collector of the transistor will change to a value approaching zero when a slight control current flows from the base to a point at the collector voltage level. This characteristic is used to selectively connect the control circuits of reversing switches RS3 and RS4 to the proper movement signals $c_1$, $c_2$ in response to the sensing signals received.

As indicated in FIGS. 3 and 10, the command switch CS in the dual omni mode utilizes movement signals $C_1$, $C_2$ routed thereto by mode switching relay system MSR. It applies the sensing signals A, $B_1$, $B_2$ to connect the appropriate movement signal paths to the proper control circuits $LA_i$, $LA_d$, $LO_i$, and $LO_d$ of reversing switches RS3 and RS4. Following the path of the control current in circuit $LA_i$ to ground to accomplish latitude increase movement, for example, it may be seen that this current could travel through transistor $201_a$, $201_b$, $201_c$ or $201_d$ to any one of the four movement signal circuits of the pairs designated $C_1$ or $C_2$. Likewise it may be seen that the path to ground for the control current in circuit $LA_d$ for latitude decrease movement, could travel through transistor $202_a$, $202_b$, $202_c$, or $202_d$ to any one of the four movement signal circuits of the pairs designated $C_1$ or $C_2$. Further the longitude increase control current in circuit $LO_i$ may pass through transistors $203_a$, $203_b$, $203_c$, or $203_d$ to any one of four movement signal circuits of the pairs $C_1$ or $C_2$ and the longitude decrease control current in circuit $LO_d$ may pass through transistors $204_a$, $204_b$, $204_c$ or $204_d$ to any one of the four movement signal circuits of the pairs $C_1$, $C_2$.

Sensing signal $a_1$ in the dual omni mode, may provide a path to ground for the base current of transistor 205, likewise a PNP type transistor. This path to ground is created by double cam and follower mechanism 146 previously described. Transistor 205 thus conducts and applies the operating control voltage from source $+V$ through resistor $206_a$, a current limiting resistance, to diodes $216_a$, $213_a$, $213_b$, $214_a$, $214_b$, $216_b$, $211_c$, $211_d$, $212_c$ and $212_d$ thus raising the voltage level at the base terminals of transistors $203_a$, $203_b$, $204_a$, $204_b$, $201_c$, $201_d$, $202_c$ and $202_d$ so that no control current can flow therefrom. Thus, the blocking resistance of these transistors will not permit flow of the signal current. The circuits of signal $C_1$ may not be used to cause longitude movement since their only connection to reversing switch RS4 to control longitude movement is through transistors $203_a$, $203_b$, $204_a$, and $204_b$ which are by this means non-conductive, and the circuits of signal $C_2$ may not be used to cause latitude movement since their only connection to reversing switch RS3 to control latitude movement is through transistors $201_c$, $201_d$, $202_c$, and $202_d$ which are by this means non-conductive. Thus, the $C_2$ signal circuits are assigned by command switch CS to control the longitude servo drive 56 while the $C_1$ signal circuits are assigned to control the latitude servo drive 55.

When sensing signal $a_1$ is not connected to ground through cam mechanism 146, voltage from source $+V$ is applied through resistor $206_b$, a current limiting resistance, to diodes $217_a$, $211_a$, $211_b$, $212_a$, $212_b$, $217_b$, $213_c$, $213_d$, $214_c$ and $214_d$ raising the voltage level at the base of transistors $201_a$, $201_b$, $202_a$, $202_b$, $203_c$, $203_d$, $204_c$ and $204_d$ so that no control current can flow therefrom. Thus, the blocking resistance of these transistors will not permit flow of the signal current. The circuits of signal $C_1$ may be used to cause latitude movement since their only connection to reversing switch RS3 to control latitude movement is through transistors $201_a$, $201_b$, $202_a$, $202_b$ which are by this means nonconductive and the circuits of signal $C_2$ may not be used to cause longitude movement since their only connection to reversing switch RS4 to control longitude movement is through transistors $203_c$, $203_d$, $204_c$, and $204_d$ which are by this means non-conductive. Thus the circuits of signal $C_2$ are assigned by command switch CS to control the latitude servo drive 55 while the circuits of signal $C_1$ are assigned to control the longitude servo drive 56.

Referring again to FIGS. 2 and 3, increase-decrease circuit $LA_1$ of sensing signal $B_1$ may, for example, be connected through contact 165 to follower 164 which is connected to electrical ground. The base terminals of transistors $201_a$ and $202_b$ are thereby at a zero voltage level except when a voltage is supplied via diodes $211_a$, $212_b$. These two transistors will offer substantially no resistance to the signal current from the circuits of movement signal $C_1$ when the base terminal is at a zero voltage level. Transistor $201_a$ will connect latitude increase to one circuit of movement signal $C_1$, while transistor $202_b$ will connect latitude decrease to the other circuit of movement signal $C_1$. When the above sensing signal at $LA_1$ is connected through contact 165 to follower 164 and thus to ground, contact 166 which is connected to circuit $LA_2$ is not grounded and there can be no flow of control current from the base terminal of transistor $202_a$ and $201_b$. This will cause these transistors to present a blocking resistance to the movement signal current. As the sensing signal circuits $LA_1$, $LA_2$ at $B_1$ for latitude increase-decrease alternate in their connection to ground through contacts 165, 166 as prevously described when the bearing from the reference station changes, the two circuits of movement signal $C_1$ are correspondingly connected one to latitude increase and the other to latitude decrease, and vice versa, by the alternate paths through transistors $201_a$, $202_b$ while transistors $202_a$, and $201_b$ are non-conductive, and then via transistors $202_a$, $201_b$ while transistors $201_a$, $202_b$ are non-conductive.

In the same manner sensing signal circuits $LO_1$, $LO_2$ at $B_1$ for longitude increase-decrease alternate in their connection to ground through contacts 161, 160 and the two circuits of movement signal $C_1$ are correspondingly connected one to longitude increase and the other to longitude decrease, and vice versa, by the alternate paths through transistors $203_a$, $204_b$ while transistors $204_a$, $203_b$ are non-conductive and then via transistors $204_a$, $203_b$ when transistors $203_a$, $204_b$ are non-conductive.

Increase-decrease circuit $LA_1$ of sensing signal $B_2$ may, for example, be connected through contact 175 to follower 174 which is connected to electrical ground. The base terminals of transistors $202_c$ and $201_d$ are thereby at a zero voltage level except when a voltage is supplied via diodes $212_c$, $211_d$. These two transistors will offer substantially no resistance to the signal current from the circuits of movement signal $C_2$ when the base terminal is at a zero voltage level. Transistor $201_d$ will connect latitude increase to one circuit of movement signal $C_2$, while transistor $202_c$ will connect latitude decrease to the other circuit of movement signal $C_2$. When the above sensing signal at $LA_1$ is connected through contact 175 to follower 174 and thus to ground, contact 176 which is connected to circuit $LA_2$ is not grounded. Therefore there can be no flow of control current from the base terminal of transistor $201_c$ and $202_d$. This will cause these transistors to present a blocking resistance to the movement signal current. As the sensing signal circuits $LA_1$, $LA_2$ at $B_2$ for latitude increase-decrease alternate in their connection to ground through contacts 175, 176 as previously described when the bearing from the reference station changes, the two circuits of movement signal $C_2$ are correspondingly connected one to latitude increase and the other to latitude decrease, and vice versa, by the alternate paths through transistors $202_c$, $201_d$ while transistors $201_c$, and $202_d$ are non-conductive, and then via transistors $201_c$, $202_d$ while transistors $202_c$, $201_d$ are non-conductive.

In the same manner, sensing signal circuits $LO_1$, $LO_2$ at $B_2$ for longitude increase-decrease alternate in their connection to ground through contacts 171, 172 and the two circuits of movement signal $C_2$ are correspondingly connected one to longitude increase and the other to longitude decrease, and vice versa, by the alternate paths through transistors $203_d$, $204_c$ while transistors $204_d$, $203_c$ are non-conductive, and then via transistors $204_d$, $203_c$ while transistors $203_d$, $204_c$ are non-conductive.

When a voltage is supplied via the diodes associated with each transistor as previously described for latitude-longitude assignment, such transistor thereby becomes non-conductive and the increase-decrease signal will be non-effective.

In view of the foregoing, it will be appreciated that command switch CS applies the sensing signals A, $B_1$ and $B_2$ in each mode to connect the circuits of the movement signal paths $C_1$, $C_2$ to the reversing switch control circuits $LA_i$, $LA_d$, $LO_i$, $LO_d$ in a sequence determined by the bearing of the vehicle from the selected navigation stations used for vehicle position determination, so that each movement signal will cause motion of the film carriage to null out said movement signal. Thus the followers 58, 62 in the dual omni mode will seek a position on the bearing lines to their respective reference omni bearing stations and the position of the vehicle at the intersection of these bearing lines will be represented at reticle A on the projected chart. In the omni DME mode follower 58 will seek a position on the bearing line to the selected reference omnibearing station and at a distance as indicated by DME. Thus the position of the vehicle will be represented at reticle A on the projected chart.

Resistances $R_a$ shown in the circuits of command switch CS are for the purpose of limiting current flow only. The diodes previously mentioned are for the purpose of circuit isolation to eliminate feedback of control voltage. Likewise diodes 215a, b, c and d permit a current to flow in one direction but not in the reverse direction and thus provide isolation.

Current through the diodes 215a, b, c, d results in deactivation of all 16 transistors and thus the latitude and longitude servo drives. Such deactivation is effected in the dual omni mode when bearings from both omni stations are parallel or within ±5° of being parallel, as previously mentioned. To accomplish such deactivation, a grounded path signal $D_a$ is generated by dual cam system 146 and applied to the base terminal of transistor 207, a PNP type transistor. Transistor 207 therefore conducts current to the diodes 215a, b, c, d deactivating the drive and energizing an indicating lamp 156 on the control panel.

(D) MAGNETIC DEVIATION ADJUSTMENT

The apparatus NC, as noted above, includes devices MDC1 and MDC2 to correct for magnetic deviation at the selected omnibearing transmitting stations used for references (FIGS. 1, 2 and 4). Magnetic deviation compensator MDC1 is connected to bearing adjustment device OBA1, relating the bearing output of motor M6 to true north while associated omnibearing receiver OBR1 still receives signals related to magnetic north. Magnetic deviation compensator MDC2 is connected to bearing adjustment device OBA2, relating the bearing output of motor M7 to true north while associated omnibearing receiver OBR2 receives signals related to magnetic north.

Referring more specifically to FIG. 2, it will be noted that the bearing adjustment device OBA1 has a feedback shaft 220 with a bearing dial 221 fixed to the outer end thereof. A gear 222 is fastened to the body of bearing adjustment device OBA1 and meshes with a gear 224 fixed to adjustment shaft 225. A gear 226, also fixed to the shaft 225, drivingly meshes with deviation indicating dial 228 which is freely journaled on shaft 220. A manual control in the form of adjusting knob 229 (FIGS. 2 and 4) is fixed to the shaft 225 and may be used to adjust the deviation indicating dial 228 to show the correct magnetic deviation at the reference station. The deviation is read on the dial 228 at fixed pointer 230. With this arrangement, magnetic bearing from the reference omnibearing transmitting station may be read on the bearing dial 221 opposite the zero point of the deviation dial 228, while true bearing from the station may be read on dial 221 at the pointer 230. Thus by adjustment of deviation adjusting means MDC1, the pilot may offset the body of bearing adjustment device OBA1 an amount equivalent to magnetic deviation at the selected reference station so that locator disc LD1 is positioned with respect to true north.

In like manner, feedback shaft 231 of bearing adjustment device OBA2 has a bearing dial 232 fixed to the outer end thereof. A gear 234 is fastened to the body of bearing adjustment device OBA2 and meshes with a gear 235 fixed to adjustment shaft 236. The latter has fixed thereon a gear 238 which drivingly meshes with deviation indicating dial 239 freely journaled on the shaft 231. Adjusting knob 240 fixed to shaft 236 may be used to adjust the deviation indicating dial 239 to show correct magnetic deviation at the reference station associated with receiver OBR2 and bearing adjustment device OBA2. Deviation is read on dial 239 at fixed pointer 241. Magnetic bearing from this second reference omnibearing transmitting station may be read on the bearing dial 232 opposite the zero point of the deviation dial 239, and true bearing from the station may be read on dial 232 at the pointer 241. Adjustment of deviation adjusting means MDC2 offsets the body of bearing adjustment device OBA2 an amount equivalent to magnetic deviation at its associated reference station and thus locator disc LD2 is positioned with respect to true north.

It might be noted here that the latitude-longitude assignment cam mechanism 146, described earlier herein, is in this instance physically associated with the magnetic deviation adjustment devices although it is functionally separate therefrom. As shown in FIG. 2, cam 148 of the device 146 is fixed to and driven by feedback shaft 220 of bearing adjustment device OBA1 and thus rotates in unison with bearing drive motor M6. By the same token, cam 149 of the device 146 is fixed to a sleeve 242 journaled on shaft 220. The cam 149 is driven in unison with bearing drive motor M7 via feedback shaft 231 of bearing adjustment device OBA2, sprocket 244 fixed to the shaft 231, positive drive belt 245, and sprocket 246 fixed to the sleeve 242.

(E) SPEED AND DIRECTION INDICATION

For the purpose of depicting speed and direction of travel relative to the ground in a meaningful manner, the apparatus has incorporated therein a speed-direction indicating mechanism 250 (FIGS. 2, 5 and 8). The mechanism 250 is adapted to display on the screen a speed-direction vector in the form of a small circular image V. The distance of the image V from the center of the screen indicates ground speed, and the radial position of the image V indicates direction of travel. The image V is moved by the mechanism 250 so as to indicate continuously the instantaneous speed and direction of travel of the aircraft relative to the ground.

The mechanism 250, as shown in FIG. 8, in this case comprises a bead 251 disposed within the hood 21 in relatively closely spaced relation behind the screen 22 and adapted to cast a shadow thereon designated as the image V. The bead 251 is located at one end of a rod or wire 252 mounted for limited universal movement about the axis of projection, thus giving its image V movement about the latitude and longitude coordinate axes and any axis intermediate of these. The rod 252 is supported adjacent its other end by means of a pair of quadrant arms 254, 255 mounted on the hood 21.

The quadrant arm 254 is formed with a hub 256 rotatably secured in a swivel bearing 258 on a lateral extension 259 of the quadrant arm 255. The inner end portion of the rod 252 is upturned, passed through a clearance opening (not shown) in the hood, and mounted axially within the hub 256 where it is retained as by means of set screw 260. The quadrant arm 254 and the rod 252 are thus disposed for pivotal movement about a generally vertical axis intersecting the axis of projection. The quadrant arm 255 is rotatably secured in a swivel bearing 261 on hood 21 for pivotal movement about a horizontal axis transverse to and intersecting the axis of projection. When it swivels about the bearing 261, the arm 255 and its lateral extension 259 carry with them the quadrant arm 254 and the rod and bead 252, 251. The length of the rod and the distance of its center of swivel movement from the screen 22 are so proportioned that the speed indication of the image V will be linear throughout the viewing area on the screen.

Actuation of the quadrant arms 254, 255 to move the bead 251 and its image V along general plane of the screen is effected in this instance by direct mechanical connections to the speed controls of the latitude and longitude servo drives 55, 56. It will be noted upon reference to FIG. 2 that shaft 75 of potentiometer P1, controlled by motor M4, has a cable drum 262 fixed thereto. Cable 264 which may be any suitable type of flexible tensile member, has one end fixed to the drum 262 and is wrapped at least partially around the drum. The cable 264 extends from the drum 262 over guide sheave 265 journaled on the frame and thence to arcuate segment 266 fixed to the lower end of the quadrant arm 255. Movement of the cable 264 in a downward direction will rotate the arms 255, 254 and the rod and bead 252, 251 in a counterclockwise direction as viewed in FIGS. 2 and 8. Tension may be maintained in the cable 264 by means of a suitable biasing spring 267 interposed between the arm 255 and the hood 21 so as to oppose such counterclockwise rotational movement.

In like manner, shaft 84 of potentiometer P2, driven by motor M5, has a cable drum 268 fixed thereto. The drum 268 has a cable 269 anchored thereon at one end and wrapped thereabout. The cable 269, which may also be any suitable type of flexible tensile member, extends from the drum 268 through a fixed guide 270 secured to the hood 21 through bearing 261, over guide sheave 271 journaled on the quadrant arm 255, and thence to arcuate segment 272 fixed to the quadrant arm 254. Movement of the cable 269 in a downward direction will rotate the arm 254 and the rod and bead 252, 251 in a clockwise direction when viewed from the top. Tension is maintained in the cable 269 by means of a suitable biasing spring 267 interposed between the arm 254 and the arm extension 259 so as to oppose such clockwise rotational movement.

As described earlier herein the speed of variable speed motor M2 of the latitude servo drive 55 is controlled by potentiometer P1 and adjusting motor M4. When the motor M2 is operating at a rotational speed that offsets the rotational speed of constant speed motor M1, the shaft of servo drive 55 and the lead screw 42 do not rotate and there is no vertical or latitude movement of the carriage 30 and displayed portion of the chart. The drum 262, segment 266, and rod 252 are so proportioned, and the cable 264 is so adjusted, that under these conditions the shadow image V cast on the screen by the bead 251 will be located on a horizontal line through the center of the screen, thus indicating zero speed on the vertical coordinate axis.

Similarly, as noted earlier, the variable speed motor M3 of the longitude servo drive 56 is controlled by potentiometer P2 and adjusting motor M5. When the motor M5 is operating at a rotational speed that offsets the rotational speed of constant speed motor M1, the shaft of servo drive 56 and lead screw 46 do not rotate and there is no horizontal or longitude movement of the carriage 30 and displayed portion of the chart. The drum 268, segment 272, and rod 252 are so proportioned, and the cable 264 is so adjusted, that under these conditions the image V cast on the screen will be situated on a vertical line through the center of the screen, thus indicating zero speed on the horizontal coordinate axis.

With the mechanism 250 thus constructed and adjusted, it will be appreciated that, various combinations of latitude and longitude movement will position the image V on the screen 22 in such a manner that the distance of the image from the center of the screen will indicate ground speed, while its radial or angular position about the center will indicate direction of travel.

In order to show ground speed and direction of travel by the image V at a scale which is meaningful to the pilot throughout the operating speed range of the aircraft, and to keep the apparatus NC adequately responsive over the operating speed range, the apparatus may include a shift mechanism SH (FIGS. 1 and 4). This simply involves interposing a change speed transmission 275 in the latitude servo drive 55 and a similar transmission 276 in the longitude servo drive 56. In the present instance, the transmission 275, 276 are of the three speed type and may be shifted in unison by a suitably calibrated shift lever SH on the front panel of the apparatus.

(F) LATITUDE-LONGITUDE COORDINATE REFERENCE

The apparatus NC includes means for producing a latitude-longitude coordinate reference between the aircraft and a selected navigational reference point which may be an omnibearing station or any selected geographical point on the chart being displayed on the screen (FIG. 2). The omnibearing station at which the locator disc LD1 is set may advantageously be used as the reference point for the coordinate reference. However, the omnibearing station or other navigational reference point at which the disc LD2 is set may also be utilized for this purpose. In either event, the coordinate reference is obtained by measuring the respective latitude and longitude displacements of the aircraft from the selected navigational reference point.

Assuming that the selected reference point is the omnibearing station to which the disc LD1 is set, in both modes of operation the disc LD1 remains centered on the reference station and its latitude and longitude drives remain stationary. The follower 58 and film carriage 30, on the other hand, are moved in unison by their latitude and/or longitude servo drives to reflect the latitude and/or longitude displacements of the aircraft. To measure these displacements as to magnitude and direction, a differential gear cluster 278 is interposed between the latitude drive for the disc LD1 and the latitude drive for the follower 58 and carriage 30, and another differential gear cluster 279 is interposed between the longitude drive for the disc LD1 and the longitude drive for the follower 58 and carriage 30. As the follower 58 and carriage 30 move in latitude and longitude relative to the position of locator disc LD1, reflecting changes in the position of the aircraft relative to the reference omnibearing station, output shafts 280, 281 of differential clusters 278, 279 will be rotated proportionately to such movements and in a corresponding rotational direction.

The differential gear cluster 276 is substantially identical in construction to the cluster 69, shown in FIGS. 2 and 2A. Shaft 282, corresponding to the shaft 68 of the cluster 69, is drivingly connected to the latitude lead screw 100 of disc LD1. Shaft 284, corresponding to shaft 70 of the cluster 69, is drivingly connected to the shaft 73 which drives the latitude lead screw 42 of the carriage 30. Since the shaft 282 remains stationary, the latitude displacements corresponding to motions of the shafts 73 and 284 will be reflected in corresponding motions of the output shaft 280.

To convert the movements of output shaft 280 into appropriate electrical signals, a transducer is provided which in this instance happens to be a center tap potentiometer P3. One terminal of the resistance element of potentiometer P3 is connected to a suitable power source, which in this case is the output of calibrating device 178, and the other terminal is grounded. Movable arm 285 of the potentiometer P3 is driven by differential output shaft 280. The initial position of the arm 285 is so adjusted that when follower 58 of locator disc LD1 is positioned on the center of rotation of disc LD1, the arm 285 will be at the center tap position. As the follower 58, carriage 30, and displayed area of the chart are displaced in latitude from the locator disc position at the reference point incident to depicting the position of the aircraft, the arm 285 will be displaced correspondingly from the center tap position. The voltage increment sensed by the arm 285 with respect to the center tap terminal 286 is thus indicative of the latitude displacement of the follower 58 and carriage 30, and hence of the aircraft itself.

The differential gear cluster 279 is functionally similar to the cluster 278 but in this case is constructed with specifically different gearing to allow for parallel input and output shafts. The cluster 279 is gear-connected to the shaft 288 which drives the longitude lead screw 104 of the disc LD1. It is also connected to shaft 289 which drivingly rotates with longitude lead screw 46, of carriage 30. Since shaft 288 remains stationary, longitude displacements corresponding to motions of the shaft 289 and lead screw 46 will be reflected in corresponding motions of the output shaft 281.

Electrical signals representing the movements of the shaft 281 are developed by a transducer in the form of center tap potentiometer P4. One end of the shaft 281 is directly connected to movable arm 290 of the potentiometer P4. The resistance element of the potentiometer P4 is connected in parallel with that of P3 and its center tap terminal 291 is connected in common with the center tap 286 of the potentiometer P3. The initial position of the arm 290 is so adjusted that when follower 58 of locator disc LD1 is positioned on the center of rotation of disc LD1, the arm 290 is at the center tap position of potentiometer P4. As the follower 58, carriage 30 and displayed area of the chart are displaced in longitude from the reference point incident to depicting the position of the aircraft, the arm 290 of potentiometer P4 will be displaced correspondingly from the center tap position. The voltage increment sensed by the arm 290 with respect to the center tap terminal 291 is thus indicative of the longitude displacement of the follower 58 and carriage 30 and hence of the aircraft.

The magnitude of the reference voltage is adjusted by the calibrating device 178 to match the scale of the projected chart. The voltage increments sensed at the potentiometers P3 and P4 thus accurately indicate latitude and longitude of the aircraft and may be transmitted to an external ground station receiver for air traffic control. Such a receiver may, for example, feed this information into a computer to automatically track all the aircraft in a given area.

The latitude-longitude coordinate reference means has been described above in a situation where the base coordinate reference is the navigational reference point at which the disc LD1 is set. It will, of course, be appreciated that a duplicate of this described means may be utilized in connection with the disc LD2, permitting the navigational reference point at which the disc LD2 is set to be used as the base coordinate reference.

(G) CHART SELECTION AND ADJUSTMENT

As already noted, the chart handling means 11 includes an appropriate film frame selection and retrieval device which may be operated manually or by power. An exemplary embodiment of such a device is disclosed and claimed in my copending application Ser. No. 606,960, filed Jan. 3, 1967, and reference may be made thereto for further details. For present purposes, it will suffice to describe such device more generally.

Referring to FIGS. 8 and 9, the film F may be transported in either direction between the reels 26, 26a, and past the viewing aperture 27 by applying a suitable driving torque to the shaft 28. The driving torque may be applied to the shaft 28 manually or by power and, in either case, the torque swings the shiftable gear 29 and its supporting arm 29a to bring the gear 29 into engagement with the drive gearing of the reel 26 or the reel 26a. When the selected film frame has been brought into position at the viewing aperture 27, a clamping mechanism, shown diagrammatically as 19a at the film holder 19, may be actuated to clamp the film F securely between the two opposed glass panels 24. A three position film selector switch SW2 on the front panel 16 sets up the apparatus for film frame selection manually, or through presetting or automatically.

Referring to FIGS. 4 and 9, it will be noted that a driving torque may be applied to the shaft 28 manually by means of knob FM1 which is drivingly fixed to the outer end of the shaft 28. The selector switch SW2 must be on the manual or M position, and the push-button switch SW1 on the front panel 16 must be depressed to release the film clamping mechanism 193, before this can be done. The knob FM1 may be connected to the shaft 28 as by means of a coupling 292 which interfits with a stem 293 on the knob FM1. The coupling 292 may include a resilient element such as a spring biasing the knob FM1 axially outward. Rigidly fixed to the stem 293 of knob FM1 is a switch operating collar 293a adapted to actuate an associated switch 294 when knob FM1 is pressed axially inward. The switch 294 may be connected to the film clamping mechanism in such a manner that the latter becomes engaged when switch 294 is actuated in response to axial inward movement of the knob FM1. The clamping mechanism may readily be released by depressing the push-button switch SW1 on the front panel 16.

In both the pre-set and automatic modes, the drive shaft 28 transports the film under power which is supplied by the reversible motor M10 (FIG. 9). The latter is drivingly connected to the shaft 28 as by means of bevel gears 295, 295a. The motor M10 may be controlled through an appropriate system responsive to a pre-settable retrieval means or to retrieval indicia on the film.

The pre-settable retrieval means comprises a dial control 296 which may be set utilizing coded numerical information from the film as projected on the screen or from an index located elsewhere. When the coded index number of the film frame to be retrieved for viewing is dialed into the control 296, and assuming the film switch is in its pre-set or P position, pressing switch SW1 will cause the film to be released and transported to the area corresponding to the selected code number. At this point, the selected film frame may be given a fine position adjustment by shifting film selector switch SW2 to the M position and manually rotating the knob FM1. The film may then be locked in place by depressing knob FM1.

The automatic retrieval means utilizes coded information adjacent the edge of the film. This information may, for example, be used to relate a local chart to a general area chart, or vice versa. The coding for a given area of the film frame is displaced longitudinally of the film strip and the viewing aperture 27 so that the coding will register with a reading device 297 located in the base of the magazine 25. In operation, film selector switch SW2 is placed in the automatic or A position and switch SW1 is then depressed. The reading device 297 then reads the coded information from the edge of the film, presets a selector (not shown), causing the film to be released and automatically transported to the new film frame as directed by the coded information. When the film has stopped traversing, the user may then position switch SW2 on M and fine adjust the chart with knob FM1. When such adjustment has been completed, knob FM1 is depressed and the film is then clamped in place for normal viewing.

To accommodate the apparatus NC to the various distance scales of the filmed charts displayed on the screen, the calibration device 178 (FIGS. 1, 2 and 4) is utilized. This is done by adjustment of knob 181 with reference to its associated scale 180.

For the purpose of enabling the apparatus to show ground speed and direction of travel at a scale which covers the full operating speed range of the aircraft, the shift mechanism described earlier is utilized (FIGS. 1, 2 and 4). This is done by positioning the shift lever SH at any one of its three operating positions. These are shown on the front panel 16 of the apparatus. The numbers 15, 30 and 60 indicated on the positions of the shift lever SH are used to determine the total scale of nautical miles that the image V will indicate on the screen. For example, when using a radio facility chart with a chart scale of 16 nautical miles per inch, the shift lever SH would be set on the position marked 15. Multiplying the chart scale 16, times 15, it will be noted that the total scale of motion of image V is 240 miles, and therefore the dimension from the center point of reticle A to the edge of the viewed screen represents a speed of 240 nautical miles per hour. Likewise, if the shift lever SH is set on 30, the dimension from the center of reticle A to the edge would represent a speed of 480 nautical miles per hour. Depending upon the speed at which the aircraft is traveling and the chart scale being viewed, the shift lever SH may be adjusted so that speed and direction indicating image V will fall within the area of the viewed screen.

For the purpose of providing a means to view the displayed chart in greater detail with lesser area coverage, or vice versa, a zoom lens 20 has been provided as described earlier herein. This lens may be operated from the front panel 16 by the manipulation of controls 298, 299. Control 298 is a focusing means so that the picture may be brought into sharp focus on the projection screen, and control 299 is a means to adjust the scale of the picture projected or as commonly termed "zoom the picture." Control 299 has a pointer which indicates on scale 299a a multiplier to be used to determine the nautical miles per inch as projected on the screen. For example, when the pointer on control 299 is opposite the number 1, the film is projected on the screen at the chart scale indicated. Thus a chart photographed at 16 nautical miles per inch would be projected at 16 nautical miles per inch. When the pointer of control 299 is set at 2; for example, such a chart would be projected at 32 nautical miles per inch providing four times the area coverage but with less readable detail. Thus a wide area may be viewed for orientation purposes, for example, and the scale of the viewed chart may then be adjusted to show a smaller area in greater detail.

SYNOPSIS OF OPERATION, EMBODIMENT OF FIGS. 1 THROUGH 12

(A) Dual omnimode operation

The pilot's first step in setting up this mode of operation is to select the chart for the area he desires to cover. To do this, he pushes the M button of mode selector switch 199 which lights the projection lamp and displays the film frame at the viewing aperture 27 onto the screen 22 (FIG. 4). He then shifts selector switch SW2 to the preset or P position and adjusts the dial control 296 to the coded index number for the film frame containing the desired chart. By depressing switch SW1, the film is transported and the desired chart is then brought to the screen 22. By shifting selector switch SW2 to the manual or M position and using the manual control knob FM1, the position of the displayed chart on the screen 22 may be further adjusted if desired.

The pilot next selects two reference omnibearing transmitting stations located on the chart at points separated by substantial latitude and longitude differences. Omnibearing receivers OBR1 and OBR2 on board the aircraft are then tuned respectively to the selected omnibearing transmitting stations. A correction for magnetic deviation at the reference station N for the receiver OBR1 is introduced by the use of the setting knob 229, reading deviation on dial 228 at pointer 230. A correction for magnetic deviation at the reference station W for the receiver OBR2 is introduced by the use of setting knob 240, reading deviation on dial 239 at pointer 241.

The next step is the pre-positioning of the bearing duplicating devices, namely locator discs LD1 and LD2, at respective points on the projected chart corresponding to the locations of the reference omnibearing stations N and W. Depressing push-button N of mode selector switch 199 sets up the mode switching relay system MSR as described earlier herein, causing the follower 58 to move toward and automatically center on the axis of rotation of the disc LD1. This is accomplished by rapid traverse or slewing movement of the film carriage and displayed portion of the chart relative to the disc LD1 and the screen 22. When the slewing movement ceases, the reticle A at the center of the screen shows the position of the disc LD1 on the chart. After a short time interval, for example two seconds, the manual joystick switch MSS becomes activated and the latitude and longitude clutches 129, 130 of disc LD1 become engaged. The pilot then uses the switch MSS, and visual observation of the chart, to move the film carriage 30 and the displayed portion of the chart until the location of the reference omnibearing station to which the receiver OBR1 is tuned is brought into register with the reticle A at the center of the screen. A like process is followed for positioning locator disc LD2, such being accomplished by depressing push-button W of mode selector switch 199. The displayed portion of the chart will then automatically slew to a position indicating the location of locator disc LD2 and the follower 62 will center up on the axis of rotation of the disc LD2. At this point, reticle A at the center of the screen shows the position of disc LD2 on the chart. Using the manual switch MSS, and visual observation of the chart, the pilot moves the film carriage 30 and the displayed portion of the chart until the location of the omnibearing reference station to which the receiver OBR2 is tuned is brought into register with the reticle A at the center of the screen. At this point, the pilot depresses the N-W push-button of mode selector switch 199, causing the apparatus to take over the positioning of the projected chart automatically to indicate the instantaneous position of the aircraft at the reticle A.

Assuming that the shift lever SH has been set at a scale in keeping with the operating speed range of the aircraft, the speed and direction indicating mechanism 250 will produce vector image V on the screen 22. The radial position of the image V indicates direction of travel of the aircraft and the speed of travel is indicated by the distance of the image V from the center of the screen.

Assuming also that the apparatus has been calibrated for the scale of the projected chart through use of the knob 181 and dial 180, the pilot may readily ascertain the distance from his present position to each reference omnibearing station. This may be done by shifting selector switch SW4. With switch SW4 in position N, the distance meter will indicate distance to the omnibearing station N to which the receiver OBR1 is tuned. With switch SW4 in the W position, the distance indicator 182 will show the distance to the omnibearing reference station W to which the receiver OBR2 is tuned.

In this mode of operation, the bearing signal from each of the omnibearing receivers OBR1 and OBR2 will continue to position the bearing indicating dials 221 and 232 throughout the flight. However, when the respective bearing lines from each of the omnibearing reference stations N and W to the aircraft, as indicated by receivers OBR1 and OBR2, are within ±5° of the same straight line, the cam mechanism 146 will cause warning lamp 156 to be energized (FIG. 4), advising the pilot that automatic adjustment of the indicated position of the aircraft has temporarily ceased. The displayed chart, however, will continue to move at the rate it was moving when the lamp 156 came on. If the aircraft is traveling in a straight path without a change in velocity, its position with respect to the chart will be indicated by reticle A. When the bearing lines from each of the reference stations N and W to the aircraft as indicated by receivers OBR1 and OBR2, have changed to a situation where they diverge by more than ±5°, the cam mechanism 146 will deenergize warning lamp 156 and automatic aircraft position indication will be resumed. It will, accordingly, be appreciated that when the warning lamp 156 comes on the pilot has the option of changing one of the reference stations or waiting until the divergence in bearing lines exceeds ±5°.

(B) Single omni-DME operation

To set up this mode of operation, the pilot pushes the M button of mode selector switch 199; selects the chart for the area to be covered, positions the chart on the screen, calibrates the apparatus for the scale of the chart, and adjusts the shift lever SH for the operating speed range of the aircraft, all as described above. He then selects a reference omnibearing station N on the chart, tunes omnibearing receiver OBR1 to the reference station, and tunes distance measuring equipment DME to the compatible Tacan equipment of the reference station. He also introduces a correction for magnetic deviation at the reference station N by use of control knob 229.

The pilot next pre-positions the locator disc LD1 at a point on the projected chart corresponding to the location of the reference omnibearing station N. This is done by depressing push-button N of mode selector switch 199, causing the projected chart to slew until reticle A coincides with the position of the last setting on which locator disc LD1 was placed. When the slewing motion has ceased, the pilot manipulates manual joystick switch MSS causing the displayed portion of the chart to move with respect to the reticle A until the location of the reference station N is brought into register with the reticle A. The pilot then depresses push-button ND of mode selector switch 199, causing the apparatus to take over the positioning of the projected chart automatically so that reticle A indicates the instantaneous position of the aircraft.

The vector image V will appear on the screen and its radial position will indicate direction of travel of the aircraft. Its distance from the center of the screen will indicate speed of travel. By placing selector switch SW4 in the N position, the pilot may ascertain on indicator 182 the distance from the aircraft to the reference station N.

(C) Destination, way station, and autopilot signal

Operation in the single omni-DME mode permits use of the apparatus NC to furnish continuous information as to bearing and distance of any selected destination point or way station on the displayed chart. To obtain this information, the pilot depresses push-button W of mode selector switch 199. This causes the displayed portion of the chart to slew until reticle A has assumed a position representing the last position at which locator disc LD2 was placed. The pilot then uses manual switch MSS and moves the displayed portion of the chart until the location of the selected destination point or way station registers with the reticle A at the center of the screen. He then depresses push-button N-D of mode selector switch 199, causing the apparatus to resume automatic positioning of the chart so as to indicate the position of the aircraft at the reticle A. Speed and direction of travel are also indicated by the image V. The pilot then shifts selector switch SW4 to its W position, causing the disc LD2 to be rotated by the bearing drive motor M7 to indicate the bearing to the aircraft from the destination point or way station.

The correction for magnetic deviation at the location of the selected destination point or way station should be made by rotating control knob 240, with deviation being indicated on dial 239 at the pointer 241. Bearing from the destination point or way station will be indicated by dial 232 with respect to true north at the pointer 241 and with respect to magnetic north at the zero point of dial 239. Distance to the destination point or way station may be read on distance indicator 182.

To obtain an autopilot signal for guidance of the aircraft to the selected destination point or way station, the pilots shifts the switch SW4 to its AP position. Signals from the disc LD2 are then routed by relay R for external connection to autopilot equipment. These signals indicate left or right off course movement of the aircraft with respect to the course to the destination point or way station.

GENERAL DESCRIPTION OF APPARATUS, EMBODIMENT OF FIGS. 13 THROUGH 16

Figure 13:
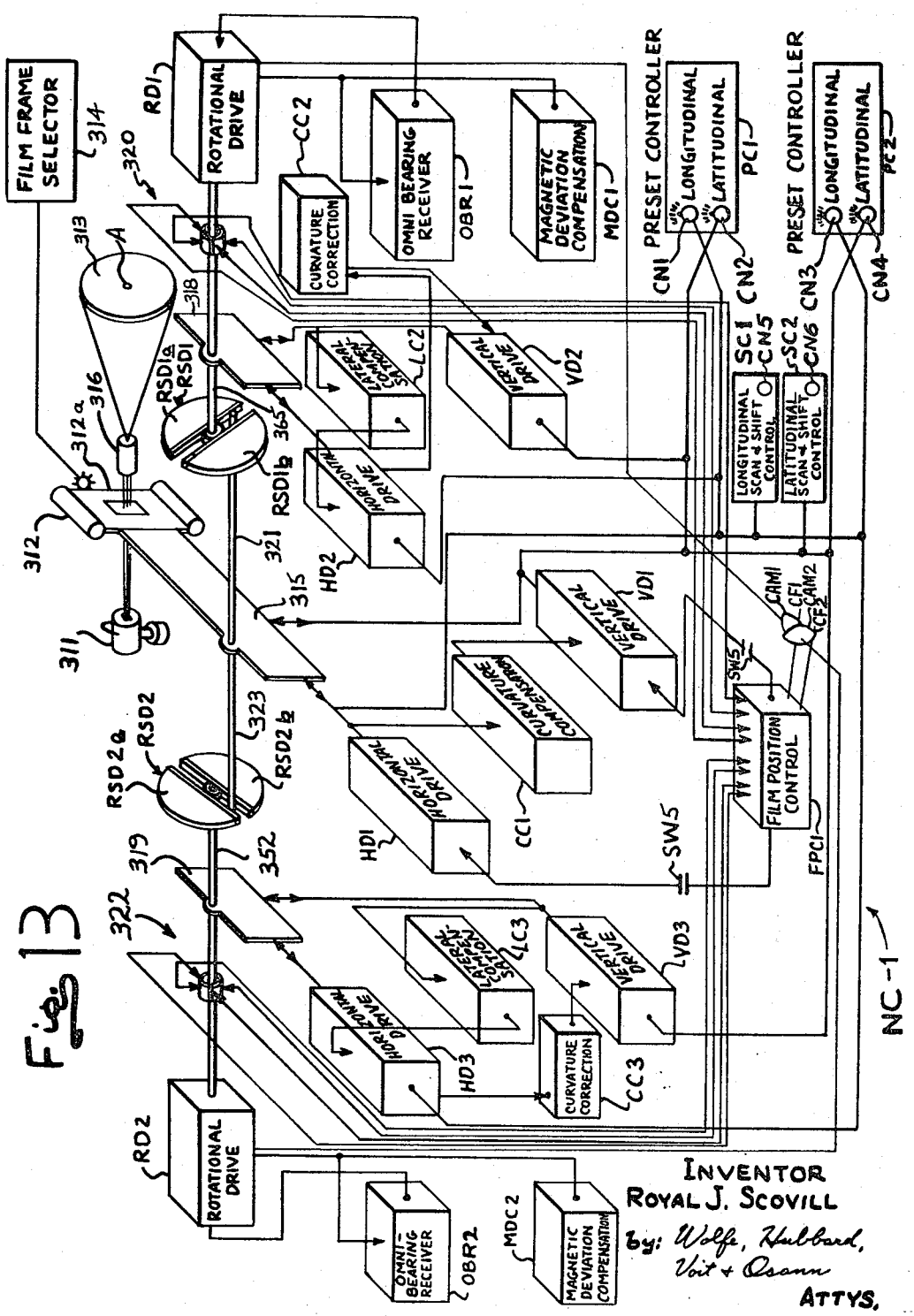
FIG. 13 is a perspective block diagram of a navigation computer apparatus constituting another exemplary embodiment of the invention.

Turning now to FIG. 13, a perspective block diagram of another embodiment of the invention is there shown in the form of a navigation computer apparatus NC-1. In this instance, the apparatus NC-1 is susceptible of use in a vehicle such as an aircraft and utilizes the output voltages of omnibearing radio receivers OBR1 and OBR2 for position reference, as in the dual omni mode described previously herein.

The apparatus NC-1 is adapted to relate geographical location of the reference navigation stations to latitude and longitude coordinates and to condition the device for operation by presetting the locator discs, according to latitude-longitude digital indication of reference station location. During operation, a continuous digital readout of latitude-longitude location of the aircraft is produced. As indicated in FIG. 13, it will be noted that omnibearing receivers OBR1 and OBR2 produce signals which are interpreted by rotational drive units RD1 and RD2 to position their respective locator discs RSD1, RSD2 on the bearing from the reference navigational facility as in the dual omni mode previously described.

In order to facilitate making adjustments within the apparatus NC-1 with regard to magnitude of function which may vary with different frames, i.e., the shortening effect of increasing latitude on arcs of longitude, and to facilitate changing the adjustment for the digital indications of longitude and latitude of the selected omnibearing radio stations, a chart indexing system has been adopted. Each chart in the system comprises a nominal area of 4° longitude by 5° latitude. Index shift mechanisms SC1 and SC2 are provided so that the apparatus NC-1 may be adjusted to the specific index setting of longitude and latitude which applies to the selected chart. Adjustment to the proper setting for a given chart is accomplished by activating index shift mechanism SC1 for longitude and index shift mechanism SC2 for latitude.

For the purpose of providing a visual indication of the position of the aircraft relative to the earth's surface, the apparatus NC-1 has a projecting system which includes a light source 311, a film magazine 312, a projecting lens 316 and a screen 313. In keeping with the present invention, a reference mark or reticle A is provided at the center of the screen 313 for representing the aircraft's position. A film frame selector 314 is associated with the film magazine for selecting a frame of the film 312a in the magazine to be projected upon the screen. A portion of a typical frame of the film is shown in FIG. 16 illustrating a portion of the earth's surface as depicted on an aeronautical chart. The film may, for example, be a strip of 35 millimeter color film.

In the exemplary form of the apparatus NC-1, it will be assumed that the screen 313 has a diameter on the order of 5 inches. Additionally, it will be assumed that the projecting lens 316 is adjustable so that the displayed portion of a selected frame may be preset to a representative diameter of one hundred twenty miles, eighty miles or forty miles. In other words, a portion of the earth's surface having a diameter of one hundred twenty, eighty or forty miles may be selectively displayed on the screen 313.

A portion of the earth's surface printed on a selected film frame is projected on the screen 313 as determined by the position of the film frame relative to the light source 311 and projecting lens 316. The film magazine 312 is mounted on a carriage 315 which in turn is mounted to allow for vertical and horizontal movement thereof. Accordingly, the portion of the selected frame projected onto the screen 313 may be changed by imparting vertical and/or horizontal movement to the supporting carriage 315. Since the center point A of the screen 313 represents the position of the aircraft, it follows that the displayed position of the aircraft relative to the earth's surface may be varied by imparting horizontal and/or vertical movement to the film carriage 315.

For the purpose of imparting horizontal movement to the film carriage 315, a horizontal drive unit HD1 has been incorporated in the apparatus NC-1 (FIG. 13). The horizontal drive unit causes the film carriage 315 to be moved a distance and at a rate in the horizontal direction which is proportional to the magnitude of a control signal applied thereto. In like manner, a vertical drive unit VD1 has been provided for imparting vertical movement to the carriage 315, the amount and rate of vertical movement likewise being proportional to the magnitude of a control signal applied to the vertical drive unit. Thus, the displayed portion of the earth's surface is changed in the longitudinal (east-west) direction when unit HD1 is rendered operative whereas it is changed in the latitudinal (north-south) direction when unit VD1 is rendered operative.

For the purpose of correcting the position of a film frame in the latitudinal direction to compensate for the curvature on the charts of the latitude parallels in the Lambert conformal conic projection, a curvature compensator CC1 has been provided. In response to operation of the horizontal drive unit HD1, the curvature compensator CC1 is rendered operative to impart vertical movement to the film carriage 315. As a result, in response to horizontal movement being imparted to the film carriage 315, compensating vertical movement is also imparted thereto to compensate for the curvature of the chart. Thus movement in response to a pure longitudinal signal will adjust the position of the film with respect to the projection axis an amount equal to the curvature of the filmed chart and such movement will appear on the screen with no latitudinal change of position.

In keeping with the present invention, means are provided for responding to the voltage signals produced by the receivers OBR1 and OBR2 to selectively apply control signals to the horizontal drive unit HD1 and the vertical drive unit VD1 whereby these units are rendered operative. More specifically, such means are adapted to respond to the receiver voltage signals to simulate the bearing of the aircraft to the selected tuned stations, and to control the operation of the drive units HD1 and VD1 in response to such signals. Consequently, the selected film frame is moved relative to the light source 311 and the projecting lens 316 so that the portion thereof displayed on the screen 313 is changed. In other words, the displayed portion of the earth's surface is moved relative to the aircraft representing reticle A so that the reticle continuously represents the instantaneous aircraft position.

Figure 14:
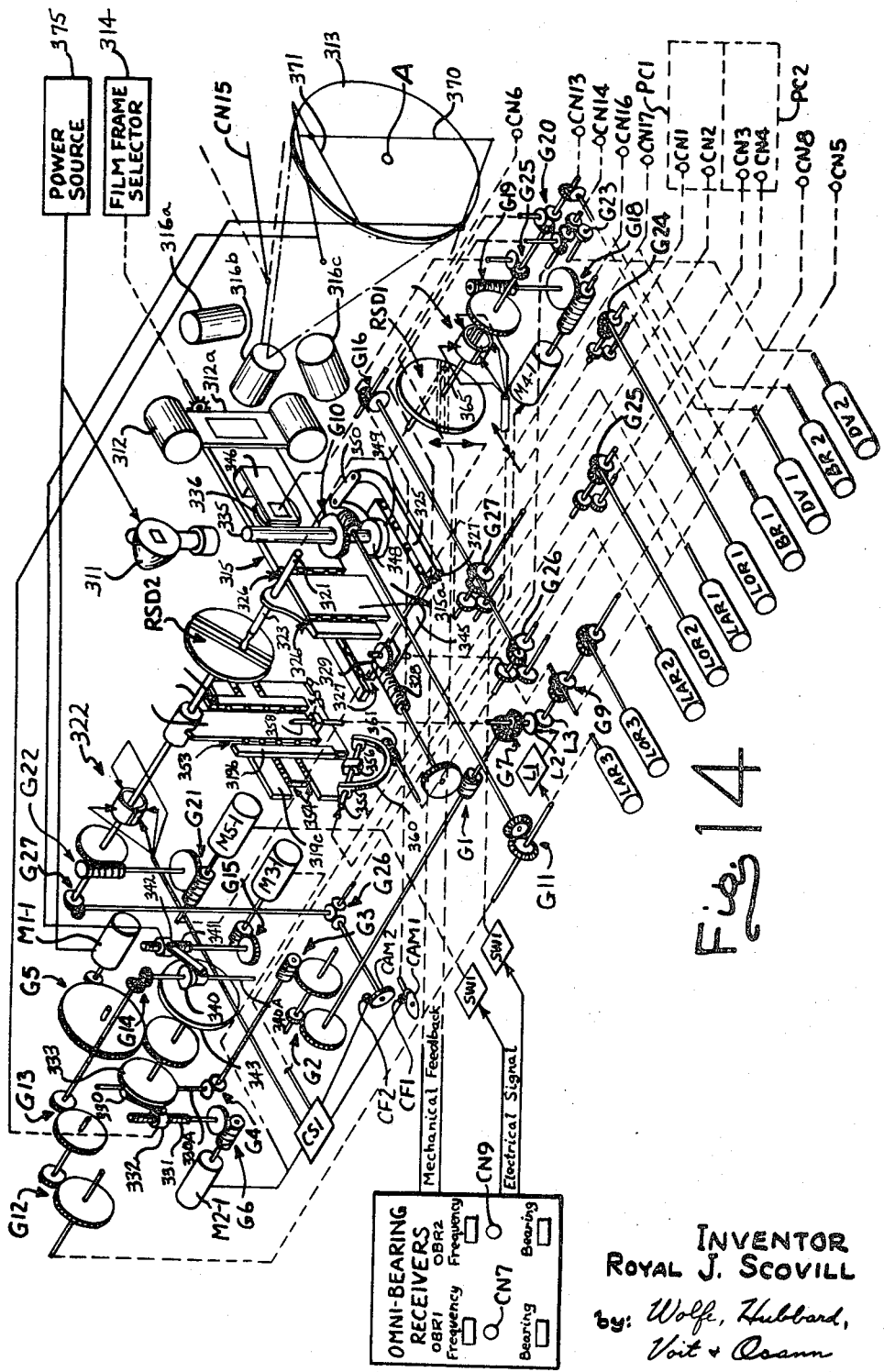
FIG. 14 is a perspective schematic diagram of the apparatus shown in FIG. 13.

For simulating the positions of the omnibearing radio stations selected for reference, a pair of locator discs, referred to in this case as radio station discs RSD1 and RSD2, is provided (FIGS. 13 and 14). The axes of these discs simulate the exact positions of the radio stations to which the receivers OBR1 and OBR2 have been tuned. The disc RSD1 is mounted on a carriage 318 which in turn is slidably mounted for horizontal and vertical movement. In like manner, the disc RSD2 is mounted on a carriage 319 which also is slidably mounted for horizontal and vertical movement. For the purpose of presetting the positions of the carriages 318 and 319 whereby the axes of the discs RSD1 and RSD2 are prepositioned to simulate the reference radio station positions, the apparatus includes presetting means responsive to the operation of preset controllers PC1 and PC2. The preset controllers include longitudinal and latitudinal control knobs which may be preset by the pilot to the longitudinal and latitudinal readings of the selected radio stations whereby the respective axes of the discs RSD1 and RSD2 are prepositioned to simulate the respective positions of the stations.

In the exemplary arrangement, the presetting means responsive to operation of the preset controller PC1 includes a horizontal drive unit HD2 which responds to presetting of the longitudinal control knob CN1 and a vertical drive unit VD2 which responds to presetting of the latitudinal control knob CN2. The horizontal drive unit HD2 and the vertical drive unit VD2 respectively preset the position of the carriage 318 in the horizontal and vertical directions. Additionally a curvature compensating means CC2 is included to compensate for curvature of the latitude parallels on the chart. The compensation means CC2 is activated by longitudinal motion and functions in the same manner as curvature compensator CC1 in the positioning of film carriage 315. Additionally, a lateral compensation unit LC2 is provided to correct for physical movement of the disc RSD1 in the longitudinal direction as a result of the shortening effect at higher latitudes. The lateral compensation unit LC2 responds to operation of the vertical drive unit to alter the subsequent operation of the horizontal drive unit whereby the horizontal movement imparted to the carriage 318 is factored by the cosine of the latitudinal position of the simulated radio station position. As a result, the axis of the disc RSD1 is preset to a position which simulates the position of the selected radio station on the projected chart to which the preset controller PC1 is preset. In like manner, a horizontal drive unit HD3, a vertical drive unit VD3, a curvature compensating means CC3, and a lateral compensation unit LC3 have been provided for responding to the presetting of the longitudinal and latitudinal control knobs CN3 and CN4 in the preset controller PC2 to preposition the carriage 319. Accordingly, the disc RSD2 is prepositioned so that the axis thereof also simulates the position of a selected radio station.

Each of the radio station discs RSD1 and RSD2 is constructed so that it is slotted along a selected diameter, dividing it into two conductive segments (FIGS. 13 and 14). For example, the disc RSD1 is divided into segments RSD1a and RSD1b. These segments are beveled along the diametrical slot or groove, with each segment defining one side of the slot. The two segments RSD1a and RSD1b are electrically insulated from each other and, in turn, are electrically connected to a two-pole commutator 320.

For the purpose of causing the commutator 320 to be selectively energized, a follower member 321, which is energized by a voltage source, is mounted on the film magazine carriage 315 for movement in unison therewith and is associated with the disc RSD1. The follower member 321 is mounted on the carriage 315 so that, in its normal position, it exerts a force against disc RSD1, and rides the slot touching each segment RSD1a and RSD1b. Follower 321 may be deflected along its axis as it rides out of the slot and will return to the normal projecting position when follower 321 is repositioned in the slot by horizontal and/or vertical movement of film carriage 315. In operation of the apparatus, the disc diameter parallel to the diametrical slot between segments RSD1a and RSD1b is to simulate the position of a bearing line passing through the selected radio station and the aircraft, i.e., is to coincide with the bearing line. When such coincidence occurs, the follower 321 touches each of the conducting segments. When such coincidence does not occur, the follower 321 makes electrical contact with one of the conducting segments so that the commutator 320 is energized on one half only.

In response to the unbalanced energization of the commutator 320, an electrical signal is transmitted to a film position control unit FPC1 which responds thereto to apply control input signals to the horizontal drive unit HD1 or the vertical drive unit VD1. As a result, the drive units HD1 and VD1 are rendered operative to impart horizontal or vertical movement to the carriage 315 whereby the projected portion of the selected film is moved relative to the aircraft representing reticle A. Additionally, the follower 321 is moved with the carriage 315 relative to the disc RSD1. When the projected portion of the earth's surface has been moved so that the reticle A corresponds to the position of the aircraft relative to the earth's surface, the follower 321 is then positioned touching both of the conducting segments RSD1a and RSD1b of the disc RSD1 so that both halves of the commutator 320 are energized.

For the purpose of assigning the control of horizontal and vertical movement of the film carriage 315 to either RSD2 or RSD1, a double cam arrangement including a pair of elliptical cams CAM1 and CAM2 has been provided. Cam CAM1 is rotated in cooperation with the rotational drive of radio station disc RSD1 and CAM2 is rotated in cooperation with the rotational drive of radio station disc RSD2. In cooperation with the surface of each of these cams is a cam follower CF1 which follows the surface of cam CAM1 and CF2 which follows the surface of cam CAM2. The cams and cam followers are adjusted so that the follower with the greatest displacement from the axis of rotation of the cam selects, for example, the horizontal drive to be controlled by its associated radio station disc. Likewise, the cam with the lesser displacement from its horizontal axis selects the vertical drive to be controlled by its associated radio disc. Thus the cam and follower means described provide the most advantageous horizontal and vertical drive means from the position of the radio station discs as determined by the omni-bearing receiver signal.

For the purpose of causing the disc diameter between the conducting segments RSD1a and RSD1b of the disc RSD1 to simulate the bearing between the selected radio station and the aircraft, a rotational drive unit RD1 is mechanically associated with the disc RSD1 for imparting rotational movement thereto. The rotational drive unit RD1 is electrically connected to the omni-bearing receiver OBR1 for receiving voltage signals from the receiver which represent changes in the bearing between the transmitting station and the aircraft. The rotational drive unit imparts rotational movement to the disc RSD1 in accordance with the magnitude of the voltage signal produced by the receiver OBR1 so that the disc diameter is positioned to simulate the bearing. Additionally, the rotational drive unit is mechanically coupled to the receiver OBR1 for feed-back to reposition the bearing adjustment of the receiver toward a zero output voltage level so that the receiver continuously produces a voltage signal representative of the change in bearing between the aircraft and the tuned station.

A magnetic deviation compensation unit MDC1 is associated with omni disc RSD1 for off-setting the bearing indicated from the receiver OBR1 with respect to magnetic north to a bearing with respect to true north so the position indicating apparatus may use this input to position the radio station disc. In other words, the magnetic deviation compensation unit MDC1 is provided to allow for presetting the apparatus so that the bearing indication from the receiver OBR1 between the transmitting station and the aircraft with respect to magnetic north is offset by the deviation. The associated portion of the appartus indicates bearing between the transmitting station and the aircraft with respect to true north and uses this bearing for positioning of the chart since all of the charts are oriented to the film frame with true north as a vertical reference.

In like manner, the disc RSD2 includes a pair of conducting segments RSD2a and RSD2b parallelly spaced along a diameter which is positioned to simulate (coincide with) the bearing between the associated transmitting station and the aircraft. Additionally, a commutator 322 and a follower member 323 are associated with the disc RSD2 so that a half segment of the commutator 322 is energized when the follower 323 engages one of the conducting portions of the disc. In response to this unbalanced energization of the commutator 322, a control signal is transmitted to the film position control unit FPC1 which in turn transmits control signals to the drive units HD1 and VD1 whereby the position of the carriage 315 is altered to change the portion of the earth displayed on the screen 313. At the same time, the position of the follower member 323 with respect to the disc RSD2 is altered. When the portion of the earth's surface displayed on the screen 313 is such that the reticle A represents the aircraft position relative to the earth's surface, the follower 323 is positioned touching both segments of the disc RSD2 so that the commutator 322 is energized on both halves.

A rotational drive unit RD2 is provided for responding to the output of the omni-bearing receiver OBR2 to position the disc RSD2 so that the disc diameter between the conducting halves coincides with the bearing between the transmitting station and the aircraft. Additionally, rotational drive unit RD2 is mechanically coupled to the receiver OBR2 so that the bearing adjustment is continuously being repositioned whereby the receiver continuously receives an output representative of the exact bearing between the aircraft and the tuned station together with the rate of change in bearing. A magnetic deviation compensation unit MDC2 is associated with the receiver OBR2 which may be preset so that as the receiver indicates bearing with respect to magnetic north, the associated portion of the apparatus indicates bearing with respect to true north and uses this bearing for positioning the chart since all of the charts are oriented with reference to true north.

DETAILED DESCRIPTION OF APPARATUS, EMBODIMENT OF FIGS. 13 THROUGH 16

Referring more specifically to FIG. 14, it will be noted that the projection means in this case comprises three projection lenses 316a, 316b, and 316c mounted on an adjustable bracket so that the lenses may be selectively positioned between the light source 311 and the screen 313. In the present instance, the lenses 316a–316c respectively allow for the projection of an image on the screen 313 having a scale of ⅛ inch, 1/16 inch or 1/24 inch to a nautical mile. Assuming the screen has a 5 inch diameter, the portion of the chart projected on the screen has a representative diameter of forty, eighty or one hundred-twenty nautical miles depending on which lens is interposed between the light source and the screen.

As previously mentioned, film strip is wound in a magazine 312. The latter is a double-reel magazine and the film strip is positioned over locating dowels which engage standard indexing holes in the film to hold each frame in an exact position on the film carriage 315. A clamping mechanism (not shown) holds the selected frame over the dowels and against the film carriage.

In its exemplary form, the film carriage 315 is mounted in ball bearing slides to allow for vertical and horizontal movement of the carriage with reference to a stationary base plate 325. A ball bearing slide 326 allows for vertical movement of the carriage 315 on a carriage support 315a with respect to the base plate 325 and thus allows for latitudinal (north-south) movement of the portion of the earth's surface projected on the screen 313 with respect to the aircraft locating reticle A. In like manner, a ball bearing slide 327 allows for horizontal movement of the carriage support 315a and the carriage 315 with respect to the base plate 325 and thus allows for longitudinal (east-west) movement of the projected portion of the earth's surface on the screen 313 with respect to the aircraft locating reticle A.

Horizontal movement is imparted to the film carriage 315 by means of a drive or lead screw 328 and a worm gear 329. The drive screw is mounted in bearings (not shown) which, in turn, are mounted within the frame of the apparatus NC–1 and the worm gear is mounted on the carriage support 315a. The worm gear may be restrained from rotating by engagement with keeper 345. The drive screw and the worm gear cooperate so that when the worm gear is restrained from the rotation and rotational movement is imparted to the drive screw, the carriage support 315a and thus the carriage 315 are driven to the right or left in the horizontal direction as viewed in FIG. 2 depending upon the direction of rotation of the drive screw. The drive screw and the worm gear may, for example, be so constructed that ten nautical miles of movement is imparted to the projected portion of the earth's surface on the screen relative to the reticle A in response to one revolution of the drive screw. In other words, one revolution is imparted to the drive screw 328 for each ten nautical miles of movement of the aircraft in the longitudinal direction.

Rotational movement is imparted to the drive screw 328 by the previously mentioned horizontal drive unit HD1 which, in its exemplary form, includes transmission gear train G1–G4, suitable interconnecting shafts and a drive roller 330. The drive roller 330 is slidably mounted on a supporting shaft 330a so that the drive roller engages a rotating disc 333 and so that the axis thereof is at a right angle with respect to the axis of the rotating disc. Rotation of roller 330 is transmitted to shaft 330a through a key. The rotating disc 333 is driven at a constant speed through gearing G5 by an electric motor M1–1. The adjusting linkage 332 is threadably supported by the shaft 331 on the one end and rotatably supported by the drive roller 330 on the other end so that the linkage and thus the drive roller 330 may be moved along the shaft 330a by imparting rotational movement to the shaft 331.

The adjusting linkage 332 is actuated by motor M2–1 which drives the shaft 331 through a reduction gear arrangement G6, the linkage moving along the shaft in accordance with the direction of rotation. The motor M2–1 is controllably energized in response to energization of the commutators 320 and 322. The drive roller 330 may thus be positioned to engage the rotating disc 333 at opposite perimeters thereof or at any place along the diameter extending between the opposite perimeters. It will be readily appreciated that the speed at which the drive roller 330 rotates and the direction of such rotation are dependent upon the position of engagement between the drive roller and the associated rotating disc. Additionally, it will be readily appreciated that when the drive roller engages the rotating disc 333 at its axis, no rotational movement is imparted to the drive roller.

In view of the foregoing, it follows that the drive screw 328 is rotated to impart horizontal or longitudinal movement to the film carriage 315 when rotational movement is imparted to the drive roller 330, whereas no rotational movement is imparted to the drive screw 328 when the drive roller 330 engages the axis of the rotating disc 333. Moreover, when rotational movement is imparted to the drive screw 328, it indicates that the aircraft is moving in the longitudinal (east-west) direction relative to the displayed portion of the chart and that the displayed portion of the chart must therefore be moved at a corresponding rate in the horizontal direction relative to the reticle A, but in the opposite direction to the aircraft movement whereby movement of the aircraft is simulated on the viewing screen 313.

Horizontal or longitudinal movement may also be imparted to the film carriage 315 by manual operation of control knob CN5. Control knob CN5 when pushed in, releases keeper 345 through a suitable linkage and permits rotation of worm gear 329 which, in turn, causes movement of film carriage 315 so that the selected film frame is moved in the horizontal direction whereby the displayed chart may be scanned in the longitudinal direction by the pilot. The control knob CN5 is adapted to rotate worm gear 329 through suitable flexible interconnecting shafts.

Keeper lever 345, worm gear 329, and drive screw 328 are also used for the purpose of shifting the axis of projection of the film frame when the course reaches the edge of the chart, to the opposite edge, so that the course may be continued on the adjacent film frame. Keeper lever 345 engages worm gear 329 for example at 180° intervals of rotation. Worm gear 329 is formed with 40 teeth. Therefore 180° rotation or 20 teeth while engaging drive screw 328, impart exactly 200 nautical miles of horizontal movement to the film frame, indexing it approximately 4° of longitude (exactly 4° at 33–40° latitude). As previously set forth, drive screw 328 moves film carriage 315 exactly 10 miles per thread.

Vertical or latitudinal movement may be imparted to the film carriage 315 by means of a drive or lead screw 335 and a worm gear 336. The drive screw 335 is mounted on carriage support 315a, whereas the worm gear 336 is mounted on the film carriage 315. The worm gear may be restrained from rotation by engagement with keeper 345. The drive screw and the worm gear cooperate so that, when the worm gear is restrained from rotation and rotational movement is imparted to the drive screw, the film carriage is moved up or down in the vertical direction relative to the carriage support 315a and thus relative to the base plate 325. The drive screw 335 and the worm gear 336 may also be so constructed that, for example, the displayed portion of the chart is moved ten nautical miles in the latitudinal direction with respect to the aircraft indicating reticle A in response to each revolution of the drive screw. In other words, one revolution is imparted to the drive screw 335 for each ten nautical miles of movement of the aircraft in the latitudinal direction.

The drive screw 335 is rotatably driven by the previously mentioned vertical drive unit VD1 which, in the exemplary arrangement, includes transmission gearing G10–G14, suitable interconnecting shafts and a drive roller 340 which corresponds to the drive roller 330. In like manner, the drive roller 340 is mounted on a supporting shaft 340a so that the drive roller engages a rotating disc 343 and so that the axis thereof is at a right angle with respect to the axis of the rotating disc. The rotating disc 343 is also driven at a constant speed by motor M1–1 through gearing G5. The adjusting linkage 342 is threadably supported by the shaft 341 on one end and rotatably supported by the drive roller 340 on the other end so that the linkage and thus the roller 340 may be moved along the shaft by imparting rotational movement to the shaft 341. Consequently, the drive roller may be positioned to engage the rotating disc at opposite perimeters thereof or at any position along the diameter connecting the opposite perimeters. The speed of rotation and the direction of rotation of the drive roller 340 are dependent upon the position of engagement between the drive roller and the rotating disc.

It follows then that the amount of rotational movement imparted to the drive screw 335 and thus the rate of vertical or latitudinal movement imparted to the film carriage 315 is dependent upon the position of engagement between the drive roller 340 and the associated rotating disc 343, no rotational movement being imparted to the drive screw 335 when the drive roller 340 engages the rotating disc 343 at its axis. Moreover, when rotational movement is imparted to the drive roller, it indicates that the aircraft is moving in the latitudinal (north-south) direction relative to the displayed portion of the chart and that the displayed portion of the chart must be moved at a corresponding rate in the vertical direction relative to the aircraft indicating reticle A but in the opposite direction to aircraft movement whereby movement of the aircraft is simulated on the screen 13.

The adjusting linkage 342 for the drive roller 340 is actuated by a driving motor M3–1 which drives the shaft 341 through a reduction gear arrangement G15. The motor M3–1, like the motor M2–1, is controllably energized in response to energization of the commutators 320 and 322 as will be discussed hereinafter.

Vertical or latitudinal movement may also be imparted to the film carriage 315 by manual operation of control knob CN6. CN6, when pushed in, releases keeper 346 through a suitable linkage and permits rotation of worm gear 336 which, in turn, causes movement of film carriage 315 so that the selected film frame is moved in the vertical direction whereby the displayed chart may be scanned in the latitudinal direction by the pilot. The control knob CN6 transmits rotational movement to worm gear 336 through suitable flexible interconnecting shafts.

Keeper levers 346, worm gear 336, and drive screw 335, are used also for the purpose of shifting the axis of projection of the film frame when the course reaches the edge of the chart, to the opposite edge, so that the course may be continued on the adjacent film frame. Keeper lever 346 engages worm gear 336 for example, at 180° intervals of rotation. Worm gear 336 is provided with 60 teeth. Thus 180° rotation or 30 teeth while engaging drive screw 335, impart exactly 300 nautical miles of vertical movement to the film frame thereby, indexing it exactly 5° of latitude. As noted earlier, drive screw 335 moves film carriage 315 exactly 10 miles per thread.

As previously mentioned, the curvature compensator CC1 is adapted to compensate for the curvature of the latitude parallels in the Lambert conformal conic projection of the earth's surface printed on a selected film frame. Each chart is mounted on the film strip so that the center longitudinal meridian is parallel to and equidistant from a line through the index holes along the edges of the film strip. The latitude parallels in the Lambert conformal conic projection curve upward from this central meridian. The curvature compensator causes the displayed portion of the earth's surface to be moved a proportionate distance in the latitudinal direction in response to changes in the longitudinal direction each side of the center to conform to this curvature. In the examplary apparatus NC-1, the latitudinal or vertical control drive screw 335 is mounted on a bearing 348 which in turn is mounted upon a threaded support 349. The threaded support 349 is mounted on the carriage support 315a and is connected to the base plate 325 through a rotational control lever 350. As horizontal movement is imparted to the carriage support 315a and thus to the film carriage 315, i.e., as longitudinal movement is imparted to the portion of the earth's surface displayed on the screen 313, rotational movement in a clockwise direction is imparted to the threaded support 349 through its cooperation with the rotational control lever 350 as film carriage 315 moves to the left or right of center. As a result, the drive screw 335 is imparted a corresponding vertical movement which is in turn, transmitted to the carriage 315, i.e., latitudinal movement is imparted to the portion of the earth's surface displayed on the screen. Accordingly, compensation is provided for the curvature of the latitude parallels in the portion of the earth's surface printed upon the selected film frame as horizontal movement is imparted thereto.

As previously set forth, the radio station discs RSD1 and RSD2 are mounted upon carriages 318 and 319 for movement therewith so that the axes of the discs may be prepositioned to simulate the positions of selected transmitting stations. It will be readily appreciated that the details of the supporting carriages are identical. Accordingly, only the details for the supporting carriage 319 will be set forth herein. The disc RSD2 is connected to the carriage 319 through a connecting shaft 352 which is secured to the disc RSD2 at its axis. The carriage 319 includes a vertically movable support 319a, a horizontally movable support 319b and a stationary base 319c which are mounted within the apparatus housing. The vertically movable support 319a is mounted on the horizontally movable support 319b through ball bearing slides 353 which allow the vertical support 319a to be moved in the vertical direction relative to the horizontal support 319b and thus relative to the base 319c. On the other hand, the horizontally movable support 319b is mounted on the base 319c through ball bearing slides 354 which allow for the horizontal support 319b and the vertical support 319a to be moved in the horizontal direction with respect to the stationary base 319c. As a result, the radio station disc RSD2 may be moved in the horizontal and vertical directions to preposition the axis of the disc so that it simulates the position of a selected transmitting station.

The support 319a may be moved vertically by means of a drive screw 358 which cooperates with a threaded support 359. Curvature compensator CC2 provides compensation for the curvature of the charts and functions in an identical manner to curvature compensator CC1 previously described. Compensation is provided through the threaded support 359 to drive screw 358. Thus, horizontal movement of support 319b imparts a vertical movement to support 319a which in turn, is transmitted to radio station disc RSD2. Accordingly compensation is provided for the curvature of the latitude parallels in the selected chart as horizontal movement is imparted to radio station disc RSD2. When rotational movement is imparted to the drive screw 358, the support 319a is caused to move in the vertical direction so that the radio station disc RSD2 is positioned in the vertical direction to simulate the latitudinal position of the selected radio transmitting station. For the purpose of imparting horizontal movement to the horizontal support 319b, a drive screw 355 has been provided which cooperates with a nut 356 that cooperates in a slide imparting horizontal movement to support 319b but moving freely in a vertical direction. When rotational movement is imparted to the drive screw 355, horizontal movement is imparted to the supports 319b and 319a so that the radio station disc RSD2 is positioned in the horizontal direction to simulate the longitudinal position of the selected radio transmitting station. In order to correct the movement of the radio station disc RSD2 in the longitudinal direction for the shortening effect on degrees of longitude at increasing latitudes, the horizontal movement drive screw 355 is positioned on a gear segment 360 which cooperates with a compensating drive screw 361. The compensating drive screw 361 and the vertical positioning drive screw 358 are simultaneously rotated so that the horizontal movement imparted to the disc RSD2 through rotational movement of the drive screw 355 is factored by the cosine of the latitudinal position of the disc axis to correct movement in the horizontal or longitudinal direction for the shortening thereof at increasing latitudes.

Rotational movement of the drive screws 355, 358 and 361 may be effected by use of the previously mentioned manually operable control knobs CN3 and CN4 of the preset controller PC2. For the purpose of furnishing an indication to the pilot of the adjustment of the radio station disc RSD2 with respect to the selected film frame, drive screw 355 is connected to longitudinal reading indicator LOR2 through differential drive G25 and suitable shafting. Thus, longitudinal movement of radio station disc RSD2 caused by rotation of the drive screw 355, is recorded on the reading indicator LOR2. Operation of control CN5 which activates the longitudinal scan and shift control SC1 by release of keeper 345 and rotation of worm gear 329, shifts the drive point of drive screw 335 on worm gear 329 in the longitudinal direction. Such rotation is likewise connected to differential G25 through suitable chain drive. Thus, longitudinal movement of film carriage 315 is recorded on the reading indicator LOR2. By manipulation of control knob CN3 adjusting the drive screw 355 and control knob CN5 adjusting the drive point, the axis of radio station disc RSD2 with respect to the film frame 315a may be preset by the pilot to simulate the longitude of the selected transmitting station. Likewise drive screw 358 is connected to latitudinal reading indicator LAR2 through differential drive G26 and suitable shafting. Thus latitudinal movement of radio station disc RSD2 caused by rotation of drive screw 358 is recorded on reading indicator LAR2. Operation of control knob CN6 which activates the latitudinal scan and shift control SC2 by release of keeper 346 and rotation of worm gear 336 shifts the drive point of drive screw 335 on worm gear 336 in the latitudinal direction. Such rotation is likewise connected to differential G26 through suitable drive. Thus, the latitudinal movement of film carriage 315 is recorded on the recording indicator LAR2. By manipulation of control knob CN4 adjusting the drive screw 358 and control knob CN6 adjusting the drive point, the position of radio station disc RSD2 with respect to the film frame 315a may be preset by the pilot to simulate the latitude of the selected transmitting station. In like manner, the corresponding controls associated with radio station disc RSD1 are preset by the pilot to the latitude and longitude of the selected transmitting stations thus disc RSD1 simulates the location of the second selected transmitting station with respect to the film frame 315a.

As set forth earlier herein, when the disc RSD2 is being prepositioned to simulate the position of a selected transmitting station, the associated follower 323 engages one of the conducting portions of the disc. As a result, the commutator 322 is energized on one half so that an electrical signal is transmitted therefrom to a two position control switch arrangement CS1. When the control switch is in its first position, the signal from the commutator 322 is transmitted through the horizontal pair of commutator brushes to the motor M2–1 so that the motor is energized to vary the position of the "horizontal" drive roller 330 relative to the axis of the rotating disc 333. Consequently, rotational movement is imparted to the drive screws 328, so that horizontal movement is imparted to the film carriage 315. Accordingly, the position of the displayed portion of the earth's surface is varied in the longitudinal direction with respect to the aircraft representing reticle A on the screen 313. Moreover, the follower 323 is moved relative to the disc RSD2 until the follower engages both conducting portions of the disc, and its therefore positioned in the diametrical slot of the disc. At this time, the follower 323 simulates the position of the aircraft relative to the simulated position of the associated, selected transmitting station and the commutator 322 transmitting a signal which calls for no change in rate of longitudinal drive. Conversely, when the control switch is in its second position, the signal from the commutator 322 is transmitted through the vertical pair of commutator brushes to the motor M3–1 so that the motor is energized to vary the position of the "vertical" drive roller 340 relative to the axis of the rotating disc 343. Consequently, rotational movement is imparted to the drive screw 335 so that vertical movement is imparted to the carriage 315. Accordingly, the position of the displayed portion of the chart is varied in the latitudinal direction with respect to the aircraft representing reticle A until the follower 323 engages both conducting portions of the disc RSD2.

In like manner, when the disc RSD1 is being prepositioned, the commutator 320 is energized causing a similar, but reverse, operation to take place. This is, when the control switch CS1 is in its first position, the motor Mc–1 is energized, whereas, when the control switch is in its second position, the motor M2–1 is energized. Accordingly, the rate of movement of the follower 321 will be varied relative to the disc RSD1 until it simulates the movement of the aircraft relative to the simulated position of the associated, selected transmitting station. During actual operation of the position indicating apparatus, it will be apparent that the commutators 320 and 322 are simultaneously energized so that vertical and horizontal movement is imparted to the film carriage together with rate of change of this movement, until commutators 320 and 322 indicate no change in rate of vertical or horizontal movement is required. At this latter time, the axes of the followers 321 and 323 simulate the positions of the aircraft with respect to the axes of the discs RSD1 and RSD2. Additionally, it will be readily apparent that one of the radio station discs controls movement of the film carriage in the horizontal direction, whereas the other disc controls movement of the film carriage in the vertical direction, depending upon the position of the control switch CS1.

For the purpose of selectively controlling the positioning of the control switch CS1, a double cam arrangement including a pair of elliptical cams CAM1 and CAM2 has been provided for selecting the most advantageous discs for controlling horizontal and vertical movement of the film carriage 315. The cam CAM1 is mechanically coupled to a supporting shaft 365 of the disc RSD1 through gearing G25 and suitable interconnecting shafts so that the cam is rotated as the disc is rotated. Likewise, the cam CAM2 is mechanically coupled to the shaft 352 of the disc RSD2 through gearing G26 and G27 and suitable interconnecting shafts so that the cam is rotated as the disc is rotated. Cam followers CF1 and CF2 ride on the outer surfaces of the respective cams CAM1 and CAM2 for controlling the positioning of the control switch CS1 which may be of the "snap-action" type. The relationship between the control switch and the cam followers is such that (1), when cam follower CF1 is on a higher point on cam CAM1 than cam follower CF2 is on cam CAM2, the control switch is placed in its first position whereby the electrical signal from commutator 322 is transmitted to motor M2–1 to control horizontal movement of carriage 315, whereas the electrical signal from commutator 320 is transmitted to motor M3–1 to control vertical movement of carriage 315 and (2), when the cam follower CF2 is on a higher point on cam CAM2 than cam follower CF1 is on cam CAM1, the control switch is placed in its second position whereby the electrical signal from commutator 322 is transmitted to motor M3–1 to control vertical movement of carriage 315, whereas the electrical signal from commutator 320 is transmitted to motor M2–1 to control horizontal movement of carriage 315.

In the exemplary apparatus NC–1, the receiver OBR1 is provided with control knob CN7 for tuning the receiver to the frequency of a first selected transmitting station and the receiver OBR2 is provided with corresponding control knob CN9 for tuning the receiver to the second selected transmitting station. As previously mentioned, the receivers OBR1 and OBR2 produce control signals which permit the adjustment of the bearing indicator between the transmitting stations and the aircraft. Additionally, as previously mentioned, the diametrical slots between the conducting halves of the discs RSD1 and RSD2 simulate the position of the bearing lines passing through the selected transmitting stations and the aircraft.

For the purpose of responding to the control signal produced by the receiver OBR1 to rotationally adjust the position of the disc RSD1 so that the diametrical slot thereof coincides with a bearing line passing through the selected transmitting station and the aircraft, a motor M4–1 has been provided. The motor M4–1 is energized in response to the receiver control signal and imparts rotational movement to a shaft 365, which supports the disc RSD1, through transmission gearing G18 and G19 and suitable interconnecting shafts. Additionally, the motor M4–1 is mechanically couped to a bearing indicating adjustment device in the receiver OBR1 so that the bearing indicating adjustment is continually being repositioned i.e., rebalanced, as the disc RSD1 is rotated. As a result, a zero control signal is produced by the receiver when the diametrical slot of the disc RSD1 conicides with the bearing line between the selected transmitting station and the aircraft. Thus, the control signal produced by receiver OBR1 represents an exact indication of the bearing from the selected transmitting station together with a rate of change of this bearing. To accomplish such rebalancing, the shaft 365 is mechanically coupled to the receiver OBR1 through differential gearing G20 and suitable interconnecting shafts.

In like manner, a motor M5–1 is provided for imparting rotational movement to the shaft 352 which supports the disc RSD2, the motor being connected thereto through transmission gearing G21 and G22 and suitable interconnecting shafts. The shaft 352 is likewise mechanically coupled to the receiver OBR2 through differential gearing G23, and suitable interconnecting shafts so that the bearing indicating adjustment in the receiver OBR2 is also being continuously repositioned, i.e., rebalanced. Accordingly, the control signal produced by the receiver OBR2 represents an exact indication of bearing from the selected transmitting station together with a rate of change of this bearing.

As rotational movement is imparted to the discs RSD1 and RSD2, it will be apparent that the commutators 320 and 322 are energized causing the motors M2–1 and M3–1 to be selectively energized. Consequently, horizontal and/ or vertical movement is imparted to the film carriage 315 until the follower members 321 and 323 engage both conducting portions of the discs RSD1 and RSD2. At this time, the selected film frame is so positioned that the reticle A on the screen 313 represents the exact instantaneous position of the aircraft relative to the earth's surface.

In response to movement being imparted to the previously mentioned adjustable linkage 332 associated with the longitudinal direction control drive roller 330, a vertical wire 370, which is positioned between the screen 313 and the selected lenses 316a–316c, is driven through suitable means to the right, center or left of the reticle A. As a result, a vertical shadow is cast upon the display shown on the screen 313. The position of the shadow is indicative of the speed and direction of aircraft travel in the longitudinal direction. A similar horizontal wire 371 is provided which is also driven through suitable means in response to movement being imparted to the adjustable linkage 342 associated with the latitudinal direction control drive roller 340. The horizontal shadow cast upon the display by the horizontal wire indicates the speed and direction of aircraft travel in the latitudinal direction. The distance of the point of intersection of the horizontal and vertical shadows cast upon the display from the center indicates the speed of the aircraft with respect to the earth. Likewise, the bearing of the point of intersection from the center of the display indicates the direction of travel of the aircraft. The reticle is suitably marked so that the pilot may interpret this information.

In some instances, it may be desirable to limit the shadow image projected on the screen to just the point of intersection of the horizontal and vertical shadows mentioned above. This may readily be accomplished by suspending a small target at the end of a rigid wire located generally axially of the cone of projected light. The wire may be fixed to the center one of a pair of gimbal elements mounted axially of the projected light cone. One gimbal element may be angularly displaced, through a suitable linkage, in proportion to the speed of latitudinal displacement and the other gimbal element may be angularly displaced through a similar linkage, in proportion to the speed of longitudinal displacement.

SYNOPSIS OF OPERATION, EMBODIMENT OF FIGS. 13 THROUGH 16

Referring more particularly to FIGS. 14 and 15, operation of the apparatus NC–1 may be initiated by rotating control knob CN11 on the front panel from the off position; energizing the apparatus from the power source 375. The pilot then selects the desired film frame containing the chart for the area over which the aircraft is flying. This is done by use of control knob CN12 which operates the film frame selector 314 and results in projecting a portion of the desired chart on the screen 313. The area of the chart projected on the screen is then adjusted by selection of one of the projecting lenses 316a–316c through control knob CN15. The brightness of the projected picture may also be controlled by means of the knob CN11.

It might be noted at this point that the apparatus NC–1 includes a control knob CN19 which is used to selectively energize the apparatus drive units. The knob CN19 may be turned to any one of the following positions: "Off"; "C" in which charts may be changed and the shift mechanism may be activated; "A" wherein radio station A which activates ratio station disc RSD1 may be changed; "B" wherein radio station B which activates radio station disc RSD2 may be changed; "Auto" which is the normal operating position and "S" in which the chart selected may be scanned by the pilot.

The pilot then selects two omni stations within the area covered by the selected film frame and/or a perimeter area 60 nautical miles wide adjacent to the nominal edge of the film frame. Radio station discs RSD1 and RSD2 are then prepositioned by the pilot to simulate the positions of the selected stations. This is accomplished by adjusting latitudinal reading indicator LAR1 to a latitude reading within the nominal limits of the chart selected, by manipulation of control knob CN6 which causes activation of the shift mechanism. Likewise, longitudinal reading indicator LOR1 must be adjusted to a longitudinal reading within the nominal limits of the chart selected, by manipulation of control knob CN5 which causes activation of the shift mechanism. Final adjustment to preposition discs RSD1 is then accomplished by rotation of control knob CN1–2. Control knob CN1–2 corresponds to the control knobs CN1 and CN2, shown in FIG. 14. When the control knob CN1–2 is pushed in and turned, omni disc RSD1 may be set to the latitudinal reading for the selected transmitting station as visually indicated on latitudinal reading indicator LAR1 and the disc RSD1 will be simultaneously positioned to simulate the latitudinal position of the selected transmitting station position. When the control knob CN1–2 is pulled out and turned, radio station disc RSD1 may be set to the longitudinal reading for the selected transmitting station as visually indicated on a longitudinal reading indicator LOR1.

The pilot then presets the longitudinal and latitudinal readings for the second selected transmitting station into the apparatus. Adjustment of control knob CN5 and control knob CN6, which activates the shift mechanism as described in positioning omni disc RSD1, will at the same time, have adjusted the setting of omni disc RSD2 so that final adjustment is all that is required. For this purpose, a control knob CN3–4 has been provided which corresponds to the control knobs CN3 and CN4, shown in FIG. 14. When the control knob CN3–4 is pushed in and turned, radio station disc RSD2 may be set to the latitudinal reading for the selected transmitting station as visually indicated on a latitudinal reading indicator LAR2. When the control knob CN3–4 is pulled out and turned, radio station disc RSD2 may be set to the longitudinal reading for the selected transmitting station as visually indicated on a longitudinal reading indicator LOR2. Control knobs CN13 and CN14 are set to the magnetic deviation for the selected transmitting stations as indicated on deviation reading indicators DV1 and DV2. As previously mentioned, it is necessary to compensate for magnetic deviation so that the bearing indicated by the receivers with respect to magnetic north is corrected to a true north indication to correspond with the true north orientation of the chart in the display. The bearings between the aircraft and the selected transmitting stations, with respect to true north, are indicated on bearing indicators BR1 and BR2 respectively associated with the receivers OBR1 and OBR2.

The omni receivers OBR1 and OBR2 are then tuned to the selected transmitting stations. Control knob CN19 may then be set to the position "Auto" which will connect the transmitted signals from the receiver OBR1 and OBR2 to the proper circuits in the apparatus. In response to tuning of the receiver OBR1 to one of the selected transmitting stations, a control signal is transmitted from the receiver OBR1 to the motor M4–1 causing the motor to be energized so that rotational movement is imparted to the disc RSD1 until the diameter along the slot thereof simulates, i.e., coincides with the bearing between the aircraft and the selected transmitting station. In response to tuning of the receiver OBR2 to the other selected transmitting station, a control signal is transmitted from the receiver OBR2 to the motor M5–1, causing the motor to be energized so that rotational movement is imparted to the disc RSD2 until the diameter along the slot thereof simulates, i.e., coincides with the bearing between the aircraft and the second selected transmitting station. The pilot may manually change the bearing adjustment of the receivers OBR1 and OBR2 by rotating control knob CN19 to position S and pushing in and turning the control knobs CN16 and CN17, the bearing selector automatically returning to the actual bearing position when the control knobs are subsequently pulled out. Pushing in of control knobs CN16 and CN17 interrupts the control signal from receiver OBR1 to motor M4-1 and receiver OBR2 to motor M5-1 thereby deactivating this rotational movement. Control knob CN19 may then be reset to the position "Auto."

As horizontal, vertical and rotational movements are imparted to the discs RSD1 and RSD2, it will be apparent that the followers 321 and 323 will be moved into engagement with one or the other conducting portions of the discs. As a result, the commutators 320 and 322 will be energized so that signals are transmitted therefrom and through the control switch CS1 to selectively energize the motors M2-1 and M3-1. In response thereto, the drive rollers 330 and 340 are moved relative to the axis of the associated rotating discs 333 and 343. Consequently, rotational movement is imparted to the drive screws 328 and 335 so that horizontal and vertical movement is imparted to the film carriage 315. Accordingly, the portion of the earth's surface displayed on the screen 313 is moved relative to the aircraft representing reticle A until the followers 321 and 323 engage both conducting portions of the discs RSD1 and RSD2. At this time, the commutators 320 and 322 transmit a signal so that the motors M2-1 and M3-1 are deenergized. It follows that the rollers 330 and 340 engage the face of the associated rotating discs 333 and 343 so that no further change in rate of rotational movement is imparted to the drive gears 328 and 335.

Subsequently, as the aircraft continues along its flight, control signals will be produced by the receivers OBR1 and OBR2 in accordance with changes in the bearing with respect to the associated transmitting stations. In response to the control signals, the motors M4-1 and M5-1 are energized, causing rotational movement to be imparted to the radio station discs RSD1 and RSD2. As a result, the followers 321 and 323 are moved into engagement with only one conductive portion of the discs RSD1 and RSD2 causing the commutators 320 and 322 to be energized in an unbalanced manner whereby energizing signals are selectively transmitted to the motors M2-1 and M3-1. At the same time, the bearing indicating adjustments of the receivers OBR1 and OBR2 are repositioned so that the receivers continue to produce outputs indicative of the exact bearings of the associated transmitting stations together with indications of the rate of change thereof. In response to energization of the motors M2-1 and M3-1, the drive rollers 330 and 340 are moved relative to the associated rotating discs 333 and 343. As previously mentioned, the direction and speed of rotational movement is imparted to each of the drive rollers 330 and 340 in accordance with its relative position along a vertical diameter of the associated rotating discs 333 and 343. As this variable rotational movement is imparted to the rollers 330 and 340, corresponding variable rotational movement is imparted to the drive screws 328 and 335 so that variable horizontal and/or vertical movement is imparted to the film carriage 315. As a result, the projected portion of the earth's surface shown on the screen 313 is moved relative to the aircraft representing reticle A.

In view of the foregoing, it will be apparent that the chart of the earth's surface printed upon a selected film frame is continuously moved relative to the aircraft representing reticle A so that the reticle A continuously represents the position of the aircraft relative to the earth's surface.

As the aircraft continues its course and the pilot desires to change reference omni radio stations, he may do so by first rotating control knob CN19 to position "A" for changing receiver OBR1, or to position "B" for changing receiver OBR2. In these positions the signal is interrupted from the radio station disc to the appropriate film carriage drive adjusting motor, M2-1 or M3-1. Thus, control from this source is suspended for the time of changing stations. Upon completion of the change, i.e., tuning of the receiver to the new station and presetting of the appropriate radio station discs to the latitude and longitude of the new station through rotation of control knobs CN1-2 or CN3-4, control knob CN19 may be readjusted to position "Auto" at which time the newly selected station will be used as a reference. Thus, the course of the aircraft may be traced across the chart by using successive radio stations as the pilot selects. Additionally, it will be readily appreciated that the film frames may be easily changed as the aircraft flies from an area shown on one film frame to an area shown on another film frame.

As previously mentioned, the control knob CN6 allows for moving the display in the latitudinal direction so that the portion of the earth's surface printed on the selected film frame may be scanned by the pilot. In like manner, the control knob CN5 is provided for allowing the pilot to scan the selected film frame in the longitudinal direction as previously set forth. For the period of scanning the film, while control knobs CN5 and CN6 are activated, control knob CN19 must be on position "S" so that the signals from radio station discs RSD1 and RSD2 are interrupted and therefore do not introduce an erroneous change into the horizontal and/or vertical movement of film carriage 315.

A digital readout of the latitude and longitude of the aircraft is continuously presented by latitudinal reading indicator LAR3 and longitudinal reading indicator LOR3. Control knob CN8 may be used to adjust longitudinal reading indicator LOR3 to the proper meridian reading as the reticle A crosses a meridian line on the chart. The drive to this indicator is a close approximation and is produced by the longitudinal movement of carriage 315 factored by an input of latitude through L1 which positions the point of engagement of disc L2 and roller L3 (FIG. 14).

I claim as my invention:

1. A navigation computer apparatus for aircraft and other vehicles comprising, in combination,
   (a) a plurality of film charts depicting prescribed sections of the earth's surface,
   (b) a support for said film charts,
   (c) a screen having a stationary mark thereon representing the vehicle position,
   (d) means for projecting a portion of a selected chart on said screen,
   (e) means for moving said film chart support in the general plane of the selected chart and along latitude and longitude coordinate axes in said plane,
   (f) a first radio receiver tuned to a reference radio signal,
   (g) a second radio receiver tuned to a second reference radio signal,
   (h) means for simulating the position of the source of each said reference radio signal on the selected chart,
   (i) means for simulating the bearing line between each of said radio signal sources and the vehicle with respect to the selected chart and for actuating said chart support moving means so as to depict the position of the vehicle at said stationary mark on said screen, and
   (j) means responsive to changes in the bearing line between each of said radio signal sources and the vehicle for actuating said chart support moving means so that said mark continuously represents the position of said vehicle.

2. A navigation computer apparatus as set forth in claim 1, wherein said reference radio signal sources are a pair of selected, spaced apart, omnibearing transmitting stations.

3. In a vehicle position indicating apparatus for use with radio navigation systems, the combination which comprises,
(a) a plurality of film charts pictorially depicting prescribed sections of the earth's surface,
(b) a magazine housing said film charts,
(c) a carriage for supporting said magazine,
(d) a screen having a stationary mark thereon representing the vehicle position,
(e) means for positioning a selected chart relative to said magazine,
(f) means for projecting a portion of the selected chart on the screen so that the viewable portion is enlarged,
(g) driving means operable to cause the carriage to be moved in the vertical and horizontal directions so that the portion of the chart projected on the screen is varied,
(h) means including a pair of radio receivers tuned respectively to signals from a pair of preselected radio stations, and
(i) physical simulation means responsive to changes in bearing of the radio stations with respect to the vehicle for causing the driving means to be rendered operative until the vehicle representing mark depicts the position of the vehicle relative to the earth's surface projected on the chart.

4. In vehicle position indicating apparatus for use with radio navigation systems, the combination which comprises,
(a) means for producing a pictorial representation of a portion of the earth's surface,
(b) a viewing screen having a stationary mark thereon representing the vehicle position,
(c) means for projecting a portion of the visual representation of the earth's surface on the screen,
(d) means responsive to changes in bearing of the vehicle with respect to two selected radio transmitting stations for changing the portion of the earth's surface projected on the screen and thus varying the position of the projected portion of the earth's surface relative to the mark so that the mark continuously represents the position of the vehicle relative to the earth's surface,
(e) means for projecting a vertical linear shadow on the screen representative of the vehicle's longitudinal speed and direction, and
(f) means for projecting a horizontal linear shadow on the screen representative of the vehicle's latitudinal speed and direction, the intersection of the horizontal and vertical shadows being representative of the vehicle's actual speed and direction with respect to the earth's surface.

5. In vehicle position indicating apparatus for use with radio navigation systems, the combination which comprises,
(a) means for producing a pictorial representation of a portion of the earth's surface,
(b) a viewing screen having a stationary mark thereon representing the vehicle position,
(c) means for projecting a portion of the visual representation of the earth's surface on the screen,
(d) means responsive to changes in bearing of the vehicle with respect to two selected radio transmitting stations for changing the portion of the earth's surface projected on the screen and thus varying the position of the projected portion of the earth's surface relative to the mark so that the mark continuously represents the position of the vehicle relative to the earth's surface, and
(e) means for projecting a target image on the screen representative of the longitudinal and latitudinal speed and direction of the vehicle with respect to the earth's surface.

6. In a vehicle position indicating apparatus as set forth in claim 5, the combination wherein said image projecting means is actuated by said means responsive to changes in bearing.

7. In vehicle position indicating apparatus, the combination which comprises,
(a) a strip film containing a pictorial representation of a portion of the earth's surface,
(b) a viewing screen having a stationary mark thereon representing the vehicle position,
(c) means for projecting onto the screen a portion of the pictorial representation of the earth's surface,
(d) a first radio receiver tuned to a first selected transmitting station for producing a control signal having a magnitude representative of a change in bearing between the vehicle and the first transmitting station,
(e) a second radio receiver tuned to a second selected transmitting station for producing a control signal having a magnitude representative of a change in bearing between the vehicle and the second transmitting station,
(f) means for simulating the positions and bearing lines of said selected transmitting stations with respect to said projected portion of the earth's surface,
(g) means responsive to the control signals for changing the portion of the earth's surface projected on the screen and thus for moving the projected portion relative to the mark on the screen so that the mark continuously represents the position of the vehicle relative to the earth's surface, and
(h) feedback means coupled to the receivers and responsive to changes in the projected portion of the earth's surface for altering the settings of the receivers for zero control signals so that the control signals are continuously representative of changes in bearing.

8. In vehicle position indicating apparatus, the combination which comprises,
(a) a film frame having a pictorial representation of a portion of the earth's surface printed thereon,
(b) a carriage for supporting the film frame,
(c) a viewing screen having a stationary mark thereon representing the vehicle position,
(d) means for projecting a portion of the pictorial representation on the screen,
(e) a first radio receiver tuned to a first selected transmitting station for producing a first control signal having a magnitude representative of a change in bearing between the vehicle and the first transmitting station,
(f) a second radio receiver tuned to a second selected transmitting station for producing a second control signal having a magnitude representative of a change in bearing between the vehicle and the second transmitting station,
(g) first means for simulating with respect to the film frame displayed the position of the first transmitting station and the bearing between the vehicle and the first transmitting station,
(h) means responsive to the first control signal for altering the bearing,
(i) second means for simulating with respect to the film frame displayed the position of the second transmitting station and the bearing between the vehicle and the second transmitting station,
(j) means responsive to the second control signal for altering the second bearing, and
(k) means responsive to changes in the simulated bearings for imparting horizontal and/or vertical movement to the carriage so that the portion of the earth's surface projected on the screen is changed and thus is moved relative to the mark whereby the mark continuously represents the position of the vehicle relative to the earth's surface.

9. In vehicle position indicating apparatus, the combination which comprises, (a) a film frame having a pictorial representation of a portion of the earth's surface printed thereon,
(b) a carriage for supporting the film frame,
(c) a viewing screen having a stationary mark thereon representing the vehicle position,
(d) means for projecting a portion of the pictorial representation on the screen,
(e) a first radio receiver tuned to a first selected transmitting station for producing a first control signal having a magnitude representative of a change in bearing between the vehicle and the first transmitting station,
(f) a second radio receiver tuned to a second selected transmitting station for producing a second control signal having a magnitude representative of a change in bearing between the vehicle and the second transmitting station,
(g) first means for simulating the position of the first transmitting station and for simulating the bearing between the vehicle and the first transmitting station,
(h) means responsive to the first control signal for altering the first simulating means to alter the simulated bearing,
(i) second means for simulating the position of the second transmitting station and for simulating the bearing between the vehicle and the second transmitting station,
(j) means responsive to the second control signal for altering the second simulating means to alter the simulated bearings,
(k) means for presetting the simulating means to simulate the positions of the selected transmitting stations, and
(l) means responsive to changes in the simulated station positions and simulated bearings for imparting horizontal and/or vertical movement to the carriage so that the portion of the earth's surface projected on the screen is changed and thus is moved relative to the mark whereby the mark continuously represents the position of the vehicle relative to the earth's surface.

10. In vehicle position indicating apparatus, the combination which comprises,
(a) a film frame having a pictorial representation of a portion of the earth's surface printed thereon,
(b) said pictorial representation having lines representing latitude and longitude,
(c) a carriage for supporting the film frame,
(d) a viewing screen having a stationary mark thereon representing the vehicle position,
(e) means for projecting a portion of the pictorial representation on the screen,
(f) a first radio receiver tuned to a first selected transmitting station for producing a first control signal having a magnitude representative of a change in bearing between the vehicle and the first transmitting station,
(g) a second radio receiver tuned to a second selected transmitting station for producing a second control signal having a magnitude representative of a change in bearing between the vehicle and the second transmitting station,
(h) first means for simulating the position of the first transmitting station and for simulating the bearing between the vehicle and the first transmitting station,
(i) means responsive to the first control signal for altering the first simulating means to alter the simulated bearing,
(j) second means for simulating the position of the second transmitting station and for simulating the bearing between the vehicle and the second transmitting station,
(k) means responsive to the second control signal for altering the second simulating means to alter the simulated bearings,
(l) means for imparting horizontal movement to the carriage when energized so that the portion of the earth's surface displayed on the screen is changed and is thus moved in the longitudinal direction relative to the mark,
(m) means for imparting vertical movement to the carriage when energized so that the portion of the earth's surface displayed on the screen is changed and is thus moved in the latitudinal direction relative to the mark,
(n) means responsive to horizontal movement of the carriage for energizing the vertical movement imparting means to compensate for curvature of the latitude lines of said pictorial representation resulting from the curvature of the earth's surface as displayed on the film frame, and
(o) means responsive to changes in the simulated bearings for selectively energizing the horizontal and vertical movement imparting means.

11. A navigational position indicating computer for aircraft and other vehicles and comprising, in combination,
(a) a film frame having a pictorial representation of a portion of the earth's surface thereon,
(b) a carriage for supporting the film frame,
(c) a viewing screen having a stationary mark thereon representing the vehicle position,
(d) means for projecting a portion of the pictorial representation on the screen, a first radio receiver tuned to a first selected transmitting station for producing a first control signal having a magnitude representative of a change in bearing between the vehicle and the first transmitting station,
(e) a second radio receiver tuned to a second selected transmitting station for producing a second control signal having a magnitude representative of a change in bearing between the vehicle and the second transmitting station,
(f) first means for simulating the position of the first transmitting station and for simulating the bearing between the vehicle and the first transmitting station,
(g) means responsive to the first control signal for altering the first simulating means to alter the simulated bearing,
(h) second means for simulating the position of the second transmitting station and for simulating the bearing between the vehicle and the second transmitting station,
(i) means responsive to the second control signal for altering the second simulating means to alter the simulated bearings,
(j) means for imparting movement to the carriage along a first coordinate axis when energized so that the portion of the earth's surface displayed on the screen is changed and is thus moved in the longitudinal direction relative to the mark,
(k) means for imparting movement to the carriage along a second coordinate axis when energized so that the portion of the earth's surface displayed on the screen is changed and is thus moved in the latitudinal direction relative to the mark,
(l) means responsive to latitudinal changes in movement of the carriage for factoring the longitudinal movement imparting means to compensate for changes in latitude resulting from the curvature of the earth's surface as displayed on the film frame, and
(m) means responsive to changes in the simulated bearings for selectively energizing the horizontal and vertical movement imparting means.

12. In vehicle position indicating apparatus, the combination which comprises,
(a) a film frame having a pictorial representation of a portion of the earth's surface printed thereon,
(b) a carriage for supporting the film frame, (c) a viewing screen having a stationary mark thereon representing the vehicle position, (d) means for projecting a portion of the pictorial representation on the screen, (e) a first radio receiver tuned to a first selected transmitting station for producing a first control signal having a magnitude representative of a change in bearing between the vehicle and the first transmitting station, (f) a second radio receiver tuned to a second selected transmitting station for producing a second control signal having a magnitude representative of a change in bearing between the vehicle and the second transmitting station, (g) first means for simulating the position of the first transmitting station and for simulating the bearing between the vehicle and the first transmitting station, (h) means responsive to the first control signal for altering the first simulating means to alter the simulated bearing, (i) second means for simulating the position of the second transmitting station and for simulating the bearing between the vehicle and the second transmitting station, (j) means responsive to the second control signal for altering the second simulating means to alter the simulated bearings, (k) means responsive to changes in the simulated bearings for imparting horizontal and/or vertical movement to the carriage so that the portion of the earth's surface projected on the screen is changed and thus is moved relative to the mark whereby the mark continuously represents the position of the vehicle relative to the earth's surface, and (l) means for providing a digital readout of (1) the longitudinal and latitudinal readings for the simulated transmitting station positions, (2) the longitudinal and latitudinal readings for the center mark on the screen and thus for the vehicle position and (3) the bearing readings for the simulated bearings between the vehicle and the transmitting stations.

13. A navigational position indicating computer for aircraft and other vehicles and comprising, in combination, (a) a film frame having a pictorial representation of a portion of the earth's surface displayed thereon, (b) a carriage for supporting the film frame, (c) a viewing screen having a stationary mark thereon representing the vehicle position, (d) means for projecting a portion of the pictorial representation on the screen, (e) a first radio receiver tuned to a first selected transmitting station for producing a first control signal having a magnitude representative of a change in bearing between the vehicle and the first transmitting station, (f) a second radio receiver tuned to a second selected transmitting station for producing a second control signal having a magnitude representative of a change in bearing between the vehicle and the second transmitting station, (g) a first disc having an axis for simulating the position of the first transmitting station and having two opposed sections separated by a space diameter which simulates the bearing between the vehicle and the first transmitting station, (h) a first commutator for producing an output signal when energized, (i) a first follower member mounted on the carriage for cooperating with the first disc to energize the first commutator when in engagement with one of the opposed sections thereof, (j) means for prepositioning the first disc so that the axis thereof simulates the position of a selected transmitting station, (k) means responsive to the first control signal for imparting rotational movement to the first disc so that the space diameter continuously simulates the bearing between the vehicle and the first transmitting station, (l) a second disc having an axis for simulating the position of the second transmitting station and having two opposed sections separated by a space diameter which simulates the bearing between the vehicle and the second transmitting station, (m) a second commutator for producing an output signal when energized, (n) a second follower member mounted on the carriage for cooperating with the second disc to energize the second commutator when in engagement with one of the opposed sections thereof, (o) means for prepositioning the second disc so that the axis thereof simulates the position of the second transmitting station, (p) means responsive to the second control signal for imparting rotational movement to the second disc so that the space diameter continuously simulates the bearing between the vehicle and the second transmitting station, (q) means responsive to the output signal produced by one commutator for imparting movement to the carriage along one coordinate axis so that the projected portion of the earth's surface is changed and thus is moved in the longitudinal direction relative to the mark, and (r) means responsive to the other commutator output signal for imparting movement to the carriage along another coordinate axis so that the projected portion of the earth's surface is changed and thus is moved in the latitudinal direction relative to the mark.

14. A navigational position indicating computer for aircraft and other vehicles comprising, in combination, (a) a film magazine carrying a film strip wherein each film frame has a pictorial representation of a portion of the earth's surface displayed thereon, (b) a carriage for supporting the film magazine, (c) a viewing screen having a stationary mark thereon representing the vehicle position, (d) means for projecting onto said screen a selected portion of the earth's surface from a selected film frame, (e) means for selecting a desired film frame, (f) a first radio receiver tuned to a first selected transmitting station for producing a first control signal having a magnitude representative of a change in bearing between the vehicle and the first transmitting station, (g) a second radio receiver tuned to a second selected transmitting station for producing a second control signal having a magnitude representative of a change in bearing between the vehicle and the second transmitting station, (h) first means for simulating the position of the first transmitting station and for simulating the bearing between the vehicle and the first transmitting station, (i) means responsive to the first control signal for altering the first simulating means to alter the simulated bearing, (j) second means for simulating the position of the second transmitting station and for simulating the bearing between the vehicle and the second transmitting station, (k) means responsive to the second control signal for altering the second simulating means to alter the simulated bearings, (l) means for presetting the simulating means to simulate the positions of the selected transmitting stations, (m) means responsive to changes in the simulated station positions and simulated bearings for imparting movement to the carriage along two coordinate axes so that the portion of the earth's surface projected on the screen is changed and thus is moved relative to the mark whereby the mark continuously represents the position of the vehicle relative to the earth's surface, and (n) means for repositioning said first and second simulating means upon selection of another film frame so as to coordinate the indicated vehicle position with the pictorial representation thereon.

15. A navigation computer apparatus as set forth in claim 2 including means for simulating and measuring the distance to each omnibearing transmitting station.

16. A navigation computer apparatus as set forth in claim 1 including means to preset the location of said simulating means for the selected transmitting stations with respect to the displayed chart by visual observation of said chart.

17. A navigation computer apparatus as set forth in claim 1 which includes means for generating signals for external use indicative of latitude and longitude coordinate reference of vehicle position with respect to a selected ground location.

18. A navigation computer apparatus as set forth in claim 1 wherein said film charts may be of substantial continuous length and positioned in any incremental location, the specific location selected becoming the film frame of the moment.

19. A navigation computer apparatus as set forth in claim 1 and adapted to utilize filmed charts wherein the placement of specific chart features on the film is independent of the precise location of the sprocket holes in the film.

20. In vehicle position indicating apparatus, the combination which comprises,
 (a) a film frame having a pictorial representation of a portion of the earth's surface printed thereon,
 (b) said pictorial representation having lines representing latitude and longitude,
 (c) a carriage for supporting the film frame,
 (d) a viewing screen having a stationary mark thereon representing the vehicle position,
 (e) means for projecting a portion of the pictorial representation on the screen,
 (f) a radio receiver tuned to a selected transmitting station for producing a first control signal having a magnitude representative of a change in bearing between the vehicle and the first transmitting station,
 (g) a distance measuring receiver tuned to a selected transmitting station for producing a signal having a magnitude representative of the distance between the vehicle and the transmitting stations,
 (h) means for simulating the position of the transmitting stations and for simulating the bearing between the vehicle and the transmitting stations,
 (i) means responsive to the first control signal for altering the first simulating means to alter the simulated bearing,
 (j) means for indicating distance from the simulated position of the transmitting stations to the simulated vehicle position,
 (k) means for producing a second control signal indicative of the difference between the said distance signal indicated by the distance measuring receiver and the said distance signal indicated by the position simulating means,
 (l) means for imparting horizontal movement to the carriage when energized so that the portion of the earth's surface displayed on the screen is changed and is thus moved in the longitudinal direction relative to the mark,
 (m) means for imparting vertical movement to the carriage when energized so that the portion of the earth's surface displayed on the screen is changed and is thus moved in the latitudinal direction relative to the mark,
 (n) means responsive to change in the simulated bearing and means responsive to change in the distance control signal for selectively energizing the horizontal and vertical movement imparting means.

21. A navigation computer apparatus for aircraft and other vehicles and comprising, in combination,
 (a) a film frame having a chart of a portion of the earth's surface displayed thereon,
 (b) a carriage for supporting the film frame,
 (c) a viewing screen having a stationary mark thereon representing the vehicle position,
 (d) means for projecting a portion of the pictorial representation on the screen,
 (e) a first radio receiver tuned to a first selected transmitting station for producing a first control signal having a magnitude representative of a change in bearing between the vehicle and the first transmitting station,
 (f) a second radio receiver tuned to a second selected transmitting station for producing a second control signal having a magnitude representative of a change in distance between the vehicle and the second transmitting station,
 (g) a first disc having an axis for simulating the position of the first transmitting station and having two opposed sections separated by a space diameter which simulates the bearing between the vehicle and the first transmitting station,
 (h) a first follower member mounted on the carriage for cooperating with the first disc to energize a first movement control circuit when in engagement with one of the opposed sections thereof,
 (i) a first distance sensing potentiometer the resistor element of which is located in spaced relation between the opposed sections of said first disc, said resistor element having a voltage gradient from end to end which is indicative of distance with respect to the rotational axis of said first disc,
 (j) an insulated contact pin mounted in the center of said first follower to make contact with said resistor to conduct a signal therefrom indicative of the distance of the first follower from the rotational axis of said first disc,
 (k) means for producing a second movement control signal indicative of the difference between the distance signal of said distance measuring receiver and the distance signal of said contact pin,
 (l) a first cam and contact means responsive to a first bearing simulating means for producing sensing signals indicative of latitude longitude movement control signal assignment of said disc segments and said distance sensing means and means for producing sensing signals indicative of increase decrease orientation of said latitude longitude movement control signals,
 (m) means for prepositioning the first disc so that the axis thereof simulates the position of a selected transmitting station by visual observation of said chart,
 (n) means responsive to the first control signal for imparting rotational movement to the first disc so that the space diameter continuously simulates the bearing between the vehicle and the first transmitting station,
 (o) means to utilize said sensing signals for latitude-longitude movement control signal assignment and said sensing signals for increase decrease orientation of said latitude-longitude movement control signals to connect each movement signal to a film carriage moving means such that each movement signal will cause film carriage motion in the direction to null out said movement signal, (p) means responsive to the output signals produced by the first disc segments as directed by the said signal assignment and orientation means for imparting movement to the carriage along one coordinate axis so that the projected portion of the chart is changed and thus moved in a first coordinate direction relative to the mark, and (q) means responsive to the second movement control signal produced by said distance measuring means for imparting movement to the carriage along another coordinate axis so that the projected portion of the chart is changed and thus is moved in the second coordinate direction relative to the mark.

22. A navigational position indicating computer for aircraft and other vehicles and comprising, in combination, (a) a film frame having a pictorial representation of a portion of the earth's surface thereon, (b) a carriage for supporting the film frame, (c) a viewing screen having a stationary mark thereon representing the vehicle position, (d) means for projecting a portion of the pictorial representation on the screen, (e) a first radio receiver tuned to a first selected omnibearing transmitting station for producing a first control signal having a magnitude representative of a change in bearing between the vehicle and the first transmitting station, (f) a second distance measuring radio receiver tuned to a transmitting station associated with the first selected omnibearing transmitting station for producing a second control signal having a magnitude representative of a change in distance between the vehicle and the transmitting stations, (g) first means for simulating the position of the transmitting stations and for simulating the bearing between the vehicle and the first transmitting station, (h) means responsive to the first control signal for altering the first simulating means to alter the simulated bearing, (i) means for imparting movement to the carriage along a first coordinate axis when energized so that the portion of the earth's surface displayed on the screen is changed and is thus moved in the longitudinal direction relative to the mark, (j) means responsive to the second control signal for producing a change in a second movement control signal for imparting movement to the carriage along a second coordinate axis so that the portion of the earth's surface displayed on the screen is changed and is thus moved in the latitudinal direction relative to the mark, (k) and means responsive to changes in the simulated bearing for selecting of the first and second control signals, the one to be assigned to actuate the horizontal movement imparting means while the alternate control signal is assigned to actuate the vertical movement imparting means.

23. A navigational computer apparatus for aircraft and other vehicles as set forth in claim 21 including, (r) a second disc having an axis for simulating the position of a way station or destination point and having two opposed sections separated by a space diameter which simulates the bearing between the vehicle and the way station or destination point, (s) means for prepositioning the second disc by visual observation of said chart so that the axis of the disc simulates the position of a selected way station or destination point, (t) a second follower member mounted on the carriage for cooperating with the second disc to produce a second control signal for imparting rotational movement to the second disc so that the space diameter continuously simulates the bearing line between the vehicle and the way station or destination point, (u) a second distance sensing potentiometer the resistor element of which is located in spaced relation between the opposed sections of said second disc, said resistor element having a voltage gradient from end to end which is indicative of distance with respect to the rotational axis of said second disc, and (v) an insulated contact pin mounted in the center of said second follower to make contact with said resistor to conduct a signal therefrom indicative of the distance of the vehicle from the way station or destination point.

24. A navigation computer apparatus for aircraft and other vehicles comprising, in combination, (a) a plurality of film charts depicting prescribed sections of the earth's surface, (b) a support for said film charts, (c) a screen having a reference mark thereon representing the vehicle position, (d) means for projecting a portion of a selected chart on said screen, (e) means for moving said film chart support in the general plane of the selected chart and along latitude and longitude coordinate axes in said plane, (f) a first radio receiver tuned to a reference radio signal for producing a bearing reference, (g) a second radio receiver tuned to a reference radio signal for producing a distance reference from the source of said first radio signal, (h) means for simulating the position of the source of said reference radio signals on the selected chart, (i) means for simulating the bearing line between the source of said radio signals and the vehicle with respect to the selected chart, (j) means for simulating the distance between the source of said radio signals and the vehicle with respect to the selected chart, (k) means for actuating said chart support moving means in accordance with said bearing and distance simulating means so as to depict the position of the vehicle at said reference mark on said screen, and (l) means responsive to changes in direction of the bearing line and changes in distance between the source of said radio signals and the vehicle for activating said chart support moving means so that said mark continuously represents the position of said vehicle.

25. A navigation computer apparatus as set forth in claim 24, wherein one of said reference radio signals is derived from an omnibearing transmitting station, and the other of said reference radio signals is derived from the distance measuring transmitter situated at said omnibearing station.

26. A navigation computer apparatus as set forth in claim 25, including means for projecting a target image on said screen representative of the longitudinal and latitudinal speed and direction of the vehicle with respect to the earth's surface.

27. A navigation computer apparatus as set forth in claim 25 including means for simulating, measuring and indicating distance and bearing to a selected way station or distance point which may be located at any random position on the displayed chart.

28. A navigation computer apparatus as set forth in claim 25 including means to position a simulating device at the location of a selected way station or destination point at any random position on the displayed chart by visual observation of said chart, and means to measure bearing and distance to said way station or destination point.

29. A navigation computer apparatus as set forth in claim 27 which includes a means for producing a signal for external connection indicating left or right off course movement of the aircraft with respect to the course to said way station or destination point.

30. A navigation computer apparatus as set forth in claim 25 which includes means for adjusting the scale of distance representation to accommodate various distance scales of the filmed charts.

31. A navigation computer apparatus as set forth in claim 24 including means to preset the location of said simulating means with respect to the displayed chart by visual observation of said chart.

32. A method of producing a continuous pictorial indication of the position of a vehicle with respect to the earth's surface and comprising the steps of
    (a) selecting a chart of a prescribed portion of the earth's surface,
    (b) projecting a portion of said chart on a screen,
    (c) selecting reference radio facilities located on the ground within the area covered by the selected chart,
    (d) simulating the position of each said reference radio facility with respect to the selected chart and the vehicle,
    (e) measuring actual changes in the position of each said reference radio facility relative to the vehicle,
    (f) adjusting said simulation in accordance with said changes,
    (g) and continuously moving said chart relative to a reference mark on the screen representing the vehicle in accordance with such adjustment.

33. A method of producing a continuous pictorial indication of the position of a vehicle with respect to the earth's surface and comprising the steps of
    (a) selecting a chart of a prescribed portion of the earth's surface,
    (b) projecting a portion of the selected chart on a screen,
    (c) selecting a first reference radio station within the area covered by the selected chart,
    (d) selecting a second reference radio station within the area covered by the selected chart and spaced in longitude and latitude from said first station,
    (e) simulating the respective positions of said reference radio stations with respect to the selected chart and the vehicle,
    (f) simulating the bearing lines between said reference ratio stations and the vehicle with respect to the selected chart, and
    (g) continuously moving said chart relative to a reference mark on the screen representing the vehicle in accordance with changes in direction of said bearing lines relative to the vehicle.

34. A method of producing a continuous pictorial indication of the position of a vehicle with respect to the earth's surface as set forth in claim 33, and including the step of displaying speed and direction of movement of the vehicle in said pictorial indication as an incident to the movement of said chart.

35. A method of producing a continuous pictorial indication of the position of a vehicle with respect to the earth's surface and comprising the steps of
    (a) selecting a chart of a prescribed portion of the earth's surface,
    (b) projecting a portion of said chart on a screen,
    (c) selecting reference ratio facilities at a given position on the ground within the area covered by the selected chart for producing a bearing reference and a distance reference from said position,
    (d) simulating the position of said reference radio facilities with respect to the selected chart and said vehicle,
    (e) simulating the bearing line between the position of said reference radio facilities and the vehicle with respect to the selected chart,
    (f) simulating the distance between the position of said reference radio facilities and the vehicle with respect to the selected chart, and
    (g) continuously moving said chart relative to a reference mark on the screen representing the vehicle in accordance with changes in direction of said bearing line and changes in said distance.

36. A method of producing a continuous pictorial indication of the position of a vehicle with respect to the earth's surface as set forth in claim 35, and including the step of displaying speed and direction of movement of the vehicle in said pictorial indication in accordance with the continuous movement of said chart.

References Cited

UNITED STATES PATENTS

| | | | |
|---|---|---|---|
| 2,717,735 | 9/1955 | Luck | 343—112 X |
| 2,814,199 | 11/1957 | Waldorf et al. | |
| 2,836,816 | 5/1958 | Allison et al. | 343—112 |

OTHER REFERENCES

S. Romano, "A Miniature Airborne Pictorial Plotter," I.R.E. Transactions on Aeronautical and Navigational Electronics, vol. ANE–2, No. 3, September 1955, TL 693122, pp. 23–25 relied on.

RODNEY D. BENNETT, JR., Primary Examiner

R. E. BERGER, Assistant Examiner

U.S. Cl. X.R.

235—150.27

FO-1050
(5/69)

UNITED STATES PATENT OFFICE

CERTIFICATE OF CORRECTION

Patent No. 3,475,754        Dated October 28, 1969

Inventor(s) Royal J. Scovill

It is certified that error appears in the above-identified patent and that said Letters Patent are hereby corrected as shown below:

Col. 7, line 25, delete "and handling";
Col. 8, line 18, delete "film magazine" and substitute
    --projection axis--;
Col. 8, line 31, delete "and film magazine 25";
Col. 8, line 34, delete "magazine";
Col. 8, line 35, delete "25 and".

In the claims:

--3. In a vehicle position indicating apparatus for use with radio navigation systems, the combination which comprises,
- (a) a plurality of film charts pictorially depicting prescribed sections of the earth's surface,
- (b) a magazine housing said film charts,
- (c) a carriage for supporting [said magazine] a selected chart,
- (d) a screen having a stationary mark thereon representing the vehicle position,
- (e) means for positioning [a] said selected chart relative to said [magazine] carriage,
- (f) means for projecting a portion of [the] said selected chart on the screen so that the viewable portion is enlarged.
- (g) driving means operable to cause the carriage to be moved in the vertical and horizontal directions so that the portion of the chart projected on the screen is varied,
- (h) means including a pair of radio receivers tuned respectively to signals from a pair of preselected radio stations,
- (i) and physical simulation means responsive to changes in bearing of the radio stations with respect to the vehicle for causing the driving means to be rendered operative until the vehicle representing mark depicts the position of the vehicle relative to the earth's surface projected on the chart. --

Signed and sealed this 23rd day of March 1971.

(SEAL)
Attest:

EDWARD M.FLETCHER,JR.            WILLIAM E. SCHUYLER, JR.
Attesting Officer                Commissioner of Patents